(12) United States Patent
Klinker et al.

(10) Patent No.: US 7,606,160 B2
(45) Date of Patent: Oct. 20, 2009

(54) SYSTEM AND METHOD TO PROVIDE ROUTING CONTROL OF INFORMATION OVER NETWORKS

(75) Inventors: Eric Klinker, San Jose, CA (US); Jeremy Johnson, Oakland, CA (US)

(73) Assignee: Internap Network Services Corporation, Atlanta, GA (US)

( * ) Notice: Subject to any disclaimer, the term of this patent is extended or adjusted under 35 U.S.C. 154(b) by 456 days.

(21) Appl. No.: 11/589,313

(22) Filed: Oct. 27, 2006

(65) Prior Publication Data

US 2007/0140128 A1    Jun. 21, 2007

Related U.S. Application Data

(63) Continuation of application No. 10/040,902, filed on Dec. 28, 2001, now Pat. No. 7,133,365.

(60) Provisional application No. 60/350,186, filed on Nov. 2, 2001.

(51) Int. Cl.
H04L 12/26 (2006.01)
(52) U.S. Cl. .................. 370/238; 370/252
(58) Field of Classification Search .................. 370/238, 370/252, 253
See application file for complete search history.

(56) References Cited

U.S. PATENT DOCUMENTS

| | | |
|---|---|---|
| 5,598,532 A | 1/1997 | Liron |
| 5,724,513 A | 3/1998 | Ben-Nun et al. |
| 5,781,534 A | 7/1998 | Perlman et al. |
| 5,870,561 A | 2/1999 | Jarvis et al. |
| 5,898,668 A | 4/1999 | Shaffer |
| 5,933,425 A | 8/1999 | Iwata |
| 5,953,312 A | 9/1999 | Crawley et al. |
| 5,974,237 A | 10/1999 | Shurmer et al. |
| 6,047,326 A | 4/2000 | Kilkki |
| 6,047,331 A | 4/2000 | Medard et al. |
| 6,055,571 A | 4/2000 | Fulp et al. |
| 6,064,677 A | 5/2000 | Kappler et al. |
| 6,078,957 A | 6/2000 | Adelman et al. |
| 6,097,699 A | 8/2000 | Chen et al. |
| 6,130,890 A | 10/2000 | Leinwand et al. |
| 6,154,778 A | 11/2000 | Koistinen et al. |

(Continued)

FOREIGN PATENT DOCUMENTS

EP    1017203    7/2000

(Continued)

OTHER PUBLICATIONS

Labovitz et al., "Delayed Internet Routing Convergence", IEEE, Jun. 2001, pp. 293-306, vol. 9, No. 3.

*Primary Examiner*—Melvin Marcelo
(74) *Attorney, Agent, or Firm*—Kilpatrick Stockton LLP

(57) ABSTRACT

A system and method for controlling routing of data. It is determined whether at least one data flow is active, the at least one data flow having an ingress portion of a current ingress path to a first point from a second point and an egress portion of a current egress path to the second point from the first point. Another data flow is routed via a next ingress portion of a next path to the first point from the second point.

18 Claims, 30 Drawing Sheets

U.S. PATENT DOCUMENTS

| | | |
|---|---|---|
| 6,181,679 B1 | 1/2001 | Ashton et al. |
| 6,185,635 B1 | 2/2001 | O'Loughlin et al. |
| 6,226,751 B1 | 5/2001 | Arrow et al. |
| 6,249,801 B1 | 6/2001 | Zisapel et al. |
| 6,252,848 B1 | 6/2001 | Skirmont |
| 6,256,314 B1 | 7/2001 | Rodrig et al. |
| 6,262,976 B1 | 7/2001 | McNamara |
| 6,275,470 B1 | 8/2001 | Ricciulli |
| 6,292,464 B1 | 9/2001 | Elahmadi et al. |
| 6,363,053 B1 | 3/2002 | Schuster et al. |
| 6,363,056 B1 | 3/2002 | Beigi et al. |
| 6,374,300 B2 | 4/2002 | Masters |
| 6,393,486 B1 | 5/2002 | Pelavin et al. |
| 6,400,681 B1 | 6/2002 | Bertin et al. |
| 6,404,769 B1 | 6/2002 | Kapoor |
| 6,405,219 B2 | 6/2002 | Saether et al. |
| 6,466,984 B1 | 10/2002 | Naveh et al. |
| 6,496,477 B1 | 12/2002 | Perkins et al. |
| 6,549,781 B1 | 4/2003 | O'Byrne et al. |
| 6,574,195 B2 | 6/2003 | Roberts |
| 6,625,150 B1 | 9/2003 | Yu |
| 6,658,457 B2 | 12/2003 | Nishikawa et al. |
| 6,665,702 B1 | 12/2003 | Zisapel et al. |
| 6,678,248 B1 | 1/2004 | Haddock et al. |
| 6,690,649 B1 | 2/2004 | Shimada |
| 6,724,722 B1 | 4/2004 | Wang et al. |
| 6,728,265 B1 | 4/2004 | Yavatkar et al. |
| 6,738,349 B1 | 5/2004 | Cen |
| 6,760,314 B1 | 7/2004 | Iwata |
| 6,785,237 B1 | 8/2004 | Sufleta |
| 6,801,502 B1 | 10/2004 | Rexford et al. |
| 6,831,890 B1 | 12/2004 | Goldsack et al. |
| 6,831,893 B1 | 12/2004 | Ben Nun et al. |
| 6,842,783 B1 | 1/2005 | Boivie et al. |
| 6,857,025 B1 | 2/2005 | Maruyama et al. |
| 6,904,020 B1 | 6/2005 | Love et al. |
| 6,947,379 B1 | 9/2005 | Gleichauf et al. |
| 6,954,431 B2 | 10/2005 | Roberts |
| 7,065,482 B2 | 6/2006 | Shorey et al. |
| 7,133,365 B2 | 11/2006 | Klinker et al. |
| 7,164,657 B2 | 1/2007 | Phaal |
| 7,185,079 B1 | 2/2007 | Bainbridge et al. |
| 7,222,190 B2 | 5/2007 | Klinker et al. |
| 7,269,157 B2 | 9/2007 | Klinker et al. |
| 2001/0021176 A1 | 9/2001 | Mimura et al. |
| 2001/0037387 A1 | 11/2001 | Gilde et al. |
| 2002/0010765 A1 | 1/2002 | Border |
| 2002/0010792 A1 | 1/2002 | Border et al. |
| 2002/0040400 A1 | 4/2002 | Masters |
| 2002/0057699 A1 | 5/2002 | Roberts |
| 2002/0075813 A1 | 6/2002 | Baldonado et al. |
| 2002/0078223 A1 | 6/2002 | Baldonado et al. |
| 2002/0103846 A1 | 8/2002 | Zisapel et al. |
| 2002/0105909 A1 | 8/2002 | Flanagan et al. |
| 2002/0105911 A1 | 8/2002 | Pruthi et al. |
| 2002/0110084 A1 | 8/2002 | Butt et al. |
| 2002/0141378 A1 | 10/2002 | Bays et al. |
| 2002/0145981 A1 | 10/2002 | Klinker et al. |
| 2002/0163884 A1 | 11/2002 | Peles et al. |
| 2002/0184393 A1 | 12/2002 | Leddy et al. |
| 2002/0186661 A1 | 12/2002 | Santiago et al. |
| 2003/0002443 A1 | 1/2003 | Basso et al. |
| 2003/0012145 A1 | 1/2003 | Bragg |
| 2003/0016627 A1 | 1/2003 | MeLampy et al. |
| 2003/0074449 A1 | 4/2003 | Smith et al. |
| 2003/0076840 A1 | 4/2003 | Rajagopal et al. |
| 2003/0079005 A1 | 4/2003 | Myers et al. |
| 2003/0086422 A1 | 5/2003 | Klinker |
| 2003/0088529 A1 | 5/2003 | Klinker |
| 2003/0088671 A1 | 5/2003 | Klinker et al. |
| 2003/0118029 A1 | 6/2003 | Maher et al. |
| 2003/0133443 A1 | 7/2003 | Klinker et al. |
| 2003/0214913 A1 | 11/2003 | Kan et al. |
| 2004/0196787 A1 | 10/2004 | Wang et al. |
| 2004/0258226 A1 | 12/2004 | Host |

FOREIGN PATENT DOCUMENTS

| | | |
|---|---|---|
| EP | 1063818 | 12/2000 |
| JP | 11027327 | 1/1999 |
| JP | 2001024699 | 1/2001 |
| WO | WO-98/58474 | 12/1998 |
| WO | WO-99/27684 | 6/1999 |
| WO | WO-02/084951 | 10/2002 |
| WO | WO-03/040874 | 5/2003 |
| WO | WO-03/040947 | 5/2003 |
| WO | WO-03/041342 | 5/2003 |
| WO | WO-2004/040423 A3 | 5/2004 |

US 7,606,160 B2

SYSTEM AND METHOD TO PROVIDE ROUTING CONTROL OF INFORMATION OVER NETWORKS

This application is a continuation of U.S. Pat. No. 7,133,365 entitled "SYSTEM AND METHOD TO PROVIDE ROUTING CONTROL OF INFORMATION OVER NETWORKS," which claims priority from U.S. Provisional Application No. 60/350,186 entitled "SYSTEM AND METHOD TO ASSURE NETWORK SERVICE LEVELS AND BANDWIDTH MANAGEMENT WITH INTELLIGENT ROUTING," filed on Nov. 2, 2001, and incorporated herein by reference for all purposes. In addition, U.S. patent application entitled "SYSTEM AND METHOD TO ASSURE NETWORK SERVICE LEVELS WITH INTELLIGENT ROUTING," having U.S. patent application Ser. No. 09/833,219, filed on Apr. 10, 2001, and U.S. Patent Application entitled "SYSTEM AND METHOD TO PROVIDE ROUTING CONTROL OF INFORMATION OVER DATA NETWORKS," having U.S. patent application Ser. No. 10/013,809 filed on Dec. 7, 2001 are incorporated herein by reference for all purposes.

BACKGROUND OF THE INVENTION

The present invention relates generally to routing of data over networked communication systems, and more specifically to controlled routing of data across networks, by modifying an ingress path into or an egress path from a local source network, or both.

One traditional technique used to control routing of information over data networks, such as the Internet, uses two or more data network connections to form a multi-homed local source network. These multiple connections increase the bandwidth or throughput of the amount of data capable of traversing the networks from an originating local source network or source address to a remote destination. With increased bandwidth, performance and reliability of Internet traffic is improved. The multi-homed connections to the Internet generally are across several different network service providers.

Conventional multi-homing schemes typically use Border Gateway Protocol (BGP) to direct traffic across one or more network service providers' links. Using traditional multi-homing with BGP effectuates route control by making changes to a routing table such that only outbound traffic from the source network to a remote destination is modifiable.

One drawback of using conventional multi-homed route control is that inbound traffic from the remote destination to the source network is not available for route control using conventional BGP multi-homed techniques. For example, route control is realized by first determining the next hop of a remote destination address and then by changing that next hop address. Although the path from which data traffic leaves the multi-homed destination can be controlled, there is little control of the inbound path into which traffic enters a multi-homed local source network.

Additionally, multi-homing with BGP is a complicated endeavor. There is a need for a wide variety of complicated routing policies to implement BGP multi-homing and thus require specific BGP expertise. Many entities using local source networks that would benefit with multi-homing, however, do not have the necessary expertise to effectively utilize BGP multi-homing. Furthermore, multi-homing deployed in a only small number of destination sites on a data network, such as the Internet, requires injecting long prefix address blocks into one or more network service providers. This means that global routing tables needed for route control are becoming cumbersome because they are growing in size at an alarming rate on the Internet. This has the effect of hindering network performance by bogging down backbone routers as well as other network equipment.

To address the problems of traditional BGP multi-homing, a conventional approach uses network address translation ("NAT") along with a multi-homing scheme. In this conventional method, two or more blocks of address space from an upstream service provider (e.g., upstream from an originating local source network) are used in a NAT-based routing policy. The NAT policy directs traffic into a particular service provider to avoid problematic providers.

One drawback to this approach is that network path diversity is not guaranteed. Since an upstream service provider advertises only a particular small address block used, the data traffic is certain to enter the multi-homed site via the provider of the original NAT source address space. Another drawback means that multi-homing with NAT must be fairly static. That is, without knowing the history of routing information with NAT, NAT-based multi-homing cannot change a specific NAT source address in the middle of a TCP flow because it would disrupt that flow and cause service outages. The requirement that multi-homing be static with NAT prevents NAT from being used in any sort of intelligent routing or route control system today. Since intelligent routing or route control systems are limited to BGP and hence outgoing route control only, they are only applicable to content distribution (e.g., asymmetric data flows between a source and a destination) where the majority of the traffic is outbound from a multi-homed destination or source.

Therefore, conventional multi-homing with NAT is not suitable to control routing of symmetric data traffic between a local source and remote destination, such as VPN, voice, video, or business applications such as customer relationship management programs (CRM), supply chain management software, or any application where the traffic flows in a bi-directional manner. Thus, traditional route control systems are not capable of influencing the inbound path of the network alone, or both the inbound and outbound paths.

BRIEF SUMMARY OF THE INVENTION

There is a need in the art for a system and a method to overcome the above-described shortcomings to effectively and efficiently control routing of data over multiple networks. Accordingly, there is a need to provide data network users, such as Internet users, with control over routing of data by optimizing egress data paths from a local host associated with a local source address, ingress date paths into the local host, or both.

In one embodiment according to the present invention, a method facilitates controlling routing of data. The method comprises determining at least one data flow is active, the at least one data flow having an ingress portion of a current ingress path to a first point from a second point and an egress portion of a current egress path to the second point from the first point; and routing another data flow via a next ingress portion of a next path to the first point from the second point.

In another method according to the present invention, a system facilitates controlling routing of data through one or more data networks. The system comprises a flow inspector designed to receive local network data traffic from or to a local source address, the flow inspector configured to determine that at least one data flow of the local network traffic is active; an information base coupled to the flow inspector to receive data representing one or more flows that are active, the information base configured to provide a current ingress portion of a current ingress path for the at least one active flow from a second point to first point; and a data director coupled to the information base to receive the local network data traffic and data representing a next ingress portion of a next ingress path, the data director configured to route data via the current ingress portion for active flows and to route data via the next ingress portion for next data flows.

DETAILED DESCRIPTION OF THE SPECIFIC EMBODIMENTS

Detailed descriptions of various embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, method, process or manner.

Figure 1A:
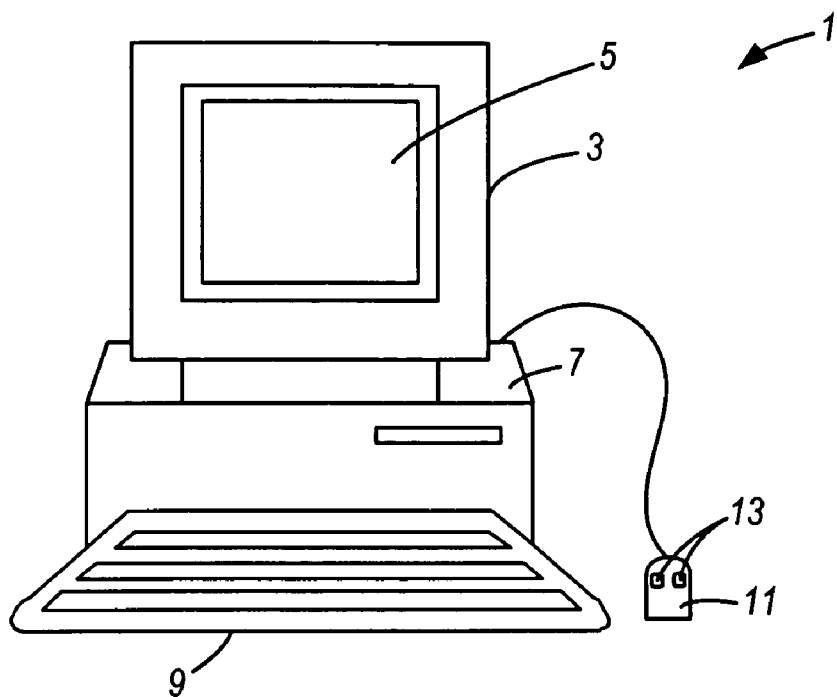
FIG. 1A is an exemplary computer system for presenting to a user a user interface suitable to practice an embodiment of the present invention.
Figure 1B:
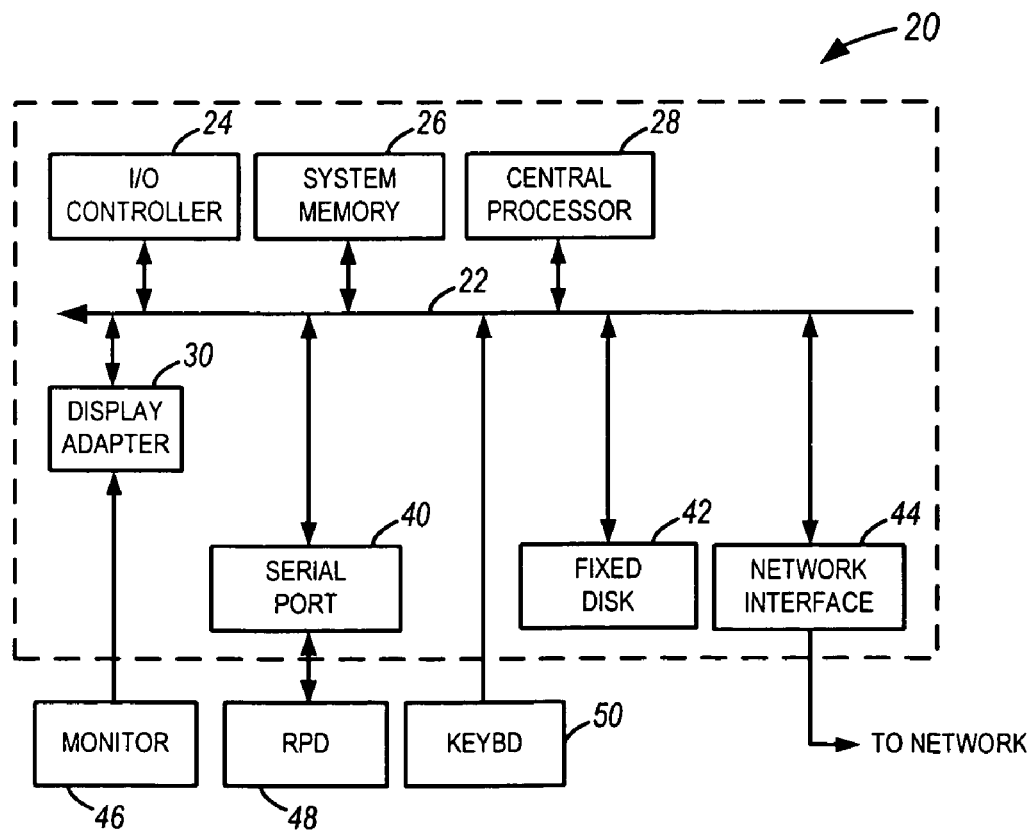
FIG. 1B shows basic subsystems in the computer system of FIG. 1A.
Figure 1C:
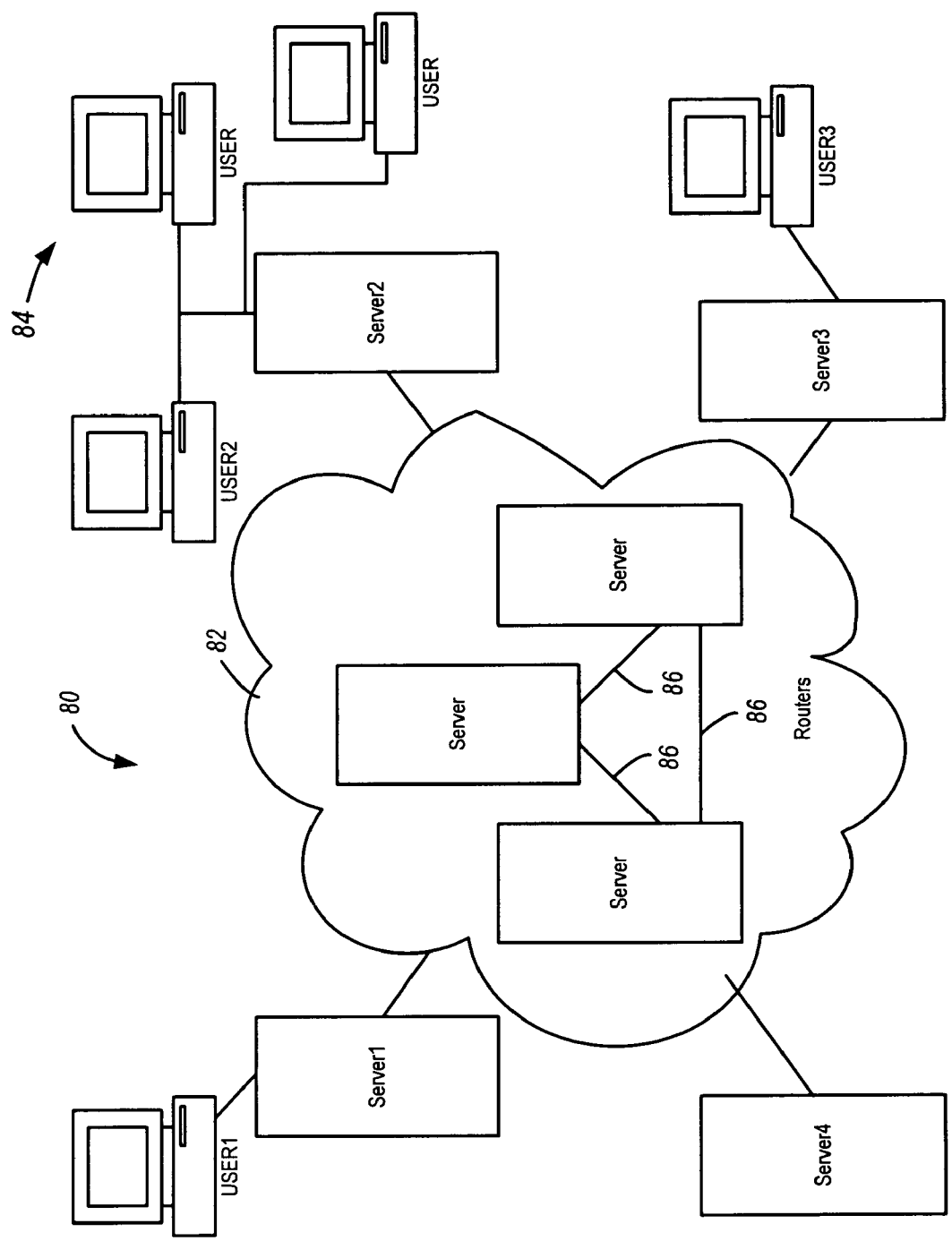
FIG. 1C is a generalized diagram of one exemplary computer network suitable for use with the present invention.

FIGS. 1A, 1B and 1C illustrate basic hardware components suitable for practicing a specific embodiment of the present invention. FIG. 1A is an illustration of an exemplary computer system 1 including display 3 having display screen 5. Cabinet 7 houses standard computer components such as a disk drive, CD-ROM drive, display adapter, network card, random access memory (RAM), central processing unit (CPU), and other components, subsystems and devices. User input devices such as mouse 11 having buttons 13, and keyboard 9 are shown. Other user input devices such as a trackball, touch-screen, digitizing tablet, voice or visual recognition, etc. can be used. In general, the computer system is illustrative of but one type of computer system, such as a desktop computer, suitable for use with the present invention.

Computers can be configured with many different hardware components and can be made in many dimensions and styles (e.g., laptop, palmtop, pentop, server, workstation, mainframe). Any hardware platform suitable for performing the processing described herein is suitable for use with the present invention.

FIG. 1B illustrates subsystems that might typically be found in a computer such as computer 1. In FIG. 1B, subsystems within box 20 are directly interfaced to internal bus 22. Such subsystems typically are contained within the computer system such as within cabinet 7 of FIG. 1A. Subsystems include input/output (I/O) controller 24, System Memory (or random access memory "RAM") 26, central processing unit CPU 28, Display Adapter 30, Serial Port 40, Fixed Disk 42, Network Interface Adapter 44 (e.g., Network Interface Card, or NIC), which in turn is configured to communicate with a network, such as by electrical, radio, or optical means known in the art. The use of bus 22 allows each of the subsystems to transfer data among subsystems and, most importantly, with the CPU, where the CPU might be a Sparc™, an Intel CPU, a PowerPC™, or the equivalent. External devices can communicate with the CPU or other subsystems via bus 22 by interfacing with a subsystem on the bus. Thus, Monitor 46 connects with Display Adapter 30, a relative pointing device (e.g. a mouse) connects through a port, such as Serial Port 40. Some devices such as Keyboard 50 can communicate with the CPU by direct means without using the main data bus as, for example, via an interrupt controller and associated registers.

As with the external physical configuration shown in FIG. 1A, many subsystem configurations are possible. FIG. 1B is illustrative of but one suitable configuration. Subsystems, components or devices other than those shown in FIG. 1B can be added. A suitable computer system also can be achieved using fewer than all of the sub-systems shown in FIG. 1B. For example, a standalone computer need not be coupled to a network so Network Interface 44 would not be required. Other subsystems such as a CD-ROM drive, graphics accelerator, etc. can be included in the configuration without affecting the performance of the system of the present invention.

FIG. 1C is a generalized diagram of a typical network that might be used to practice an embodiment of the present invention. In FIG. 1C, network system 80 includes several local networks coupled to computer data network 82, such as the Internet, WAN Wide Area Network (WAN), or similar networks. Network systems as described herein refer to one or more local networks and network service providers that make up one or more paths from a source to a destination and vice versa. Network systems, however, should be understood to also denote data networks that include one or more computing devices in communication using any networking technology. Although specific network protocols, physical layers, topologies, and other network properties are presented herein, the present invention is suitable for use with any path-diverse network (e.g., a multi-homed network interconnected to other networks), especially those networks that employ Internet Protocol (IP) for routing data, such as flows having one or more packets of information according to the protocol. Furthermore, although a specific implementation is not shown in FIG. 1C, one having ordinary skill in the art should appreciate that a flow control system according to the present invention can be deployed within one or more data networks 82 or configured to operate with network system 80.

In FIG. 1C, computer USER1 is connected to Server1, wherein the connection can be by any network protocol, such as Ethernet, Asynchronous Transfer Mode, IEEE standard 1553 bus, modem connection, Universal Serial Bus, etc. The communication link need not be a wire but can be infrared, radio wave transmission, etc. As depicted, Server1 is coupled to the data network 82, such as the Internet or, for example, any other data network that uses IP for data communication. The data network is shown symbolically as a collection of server routers 82.

The exemplary use of the Internet for distribution or communication of information is not strictly necessary to practice the present invention but rather is merely used to illustrate a specific embodiment. Further, the use of server computers and the designation of server and client machines are not crucial to an implementation of the present invention. USER1 Computer can be connected directly to the Internet. Server1's connection to the Internet is typically by a relatively high bandwidth transmission medium such as a T1 line, a T3 line, Metro Area Ethernet, or the like, although it might be connected in a similar fashion as with USER1. Similarly, other computers 84 are shown utilizing a local network (e.g., Local Area Network, or LAN) at a different location from USER1 Computer. The computers' at 84 are coupled via Server2 to the Internet. Although computers 84 are shown to include only a single server (e.g., Server2), two or more servers can be connected to the local network associated with computers 84. The USER3 and Server3 configuration represent yet a third network of computing devices.

Figure 1D:
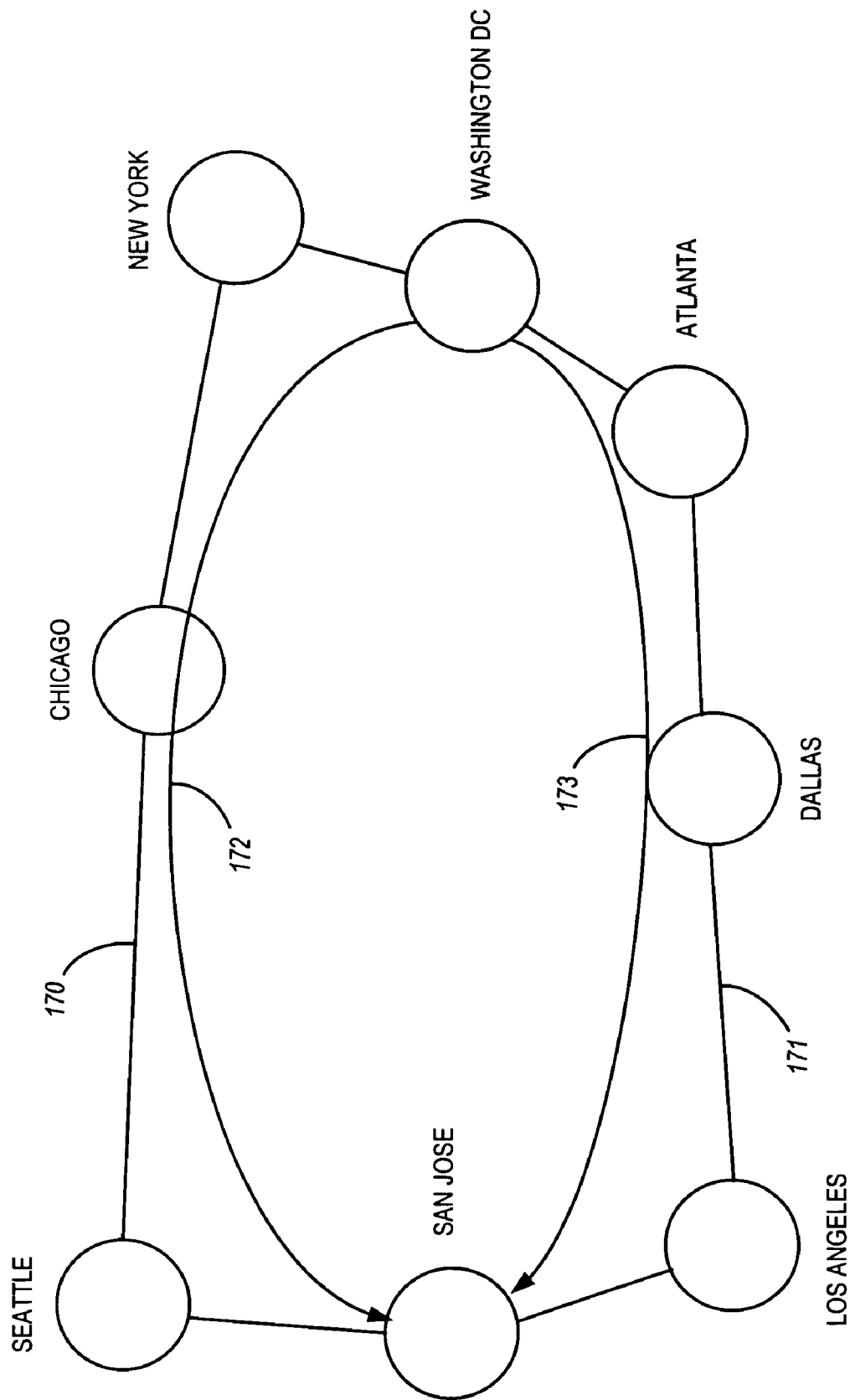
FIG. 1D depicts a typical data network using multi-path.

FIG. 1D shows the effects of typical multi-path (e.g., ECMP) techniques on a route control system using active calibration alone. Two possible paths exist between Washington D.C. and San Jose for a given network service provider. The first path 170 traverses New York, Chicago and Seattle. The second path 171 traverses Atlanta, Dallas and Los Angeles. Suppose that the cost of using either of the paths is equal in the routing protocol. Most router vendors, when presented with two equal costs paths, will load share traffic between them making sure that paths in the same flow will follow the same route. The path selection process is vendor-specific and generally relies on known source and destination IP addresses. Unless the source IP address and destination IP address are the same, the traffic may take a different equal-cost path. The implications for path calibration are that the active probes sent across the network between Washington D.C. and San Jose may take the northern path through Chicago 172 while the customer's traffic may take the southern path through Dallas 173, because while the destination IP address is the same, the source IP address is different. Thus, the path measured may not be the path that is actually taken by the customer's traffic. The present invention, among other things, intelligently controls routes containing data traffic using a system and technique to assure service levels of customer data traffic in accordance with the present invention.

Figure 1E:
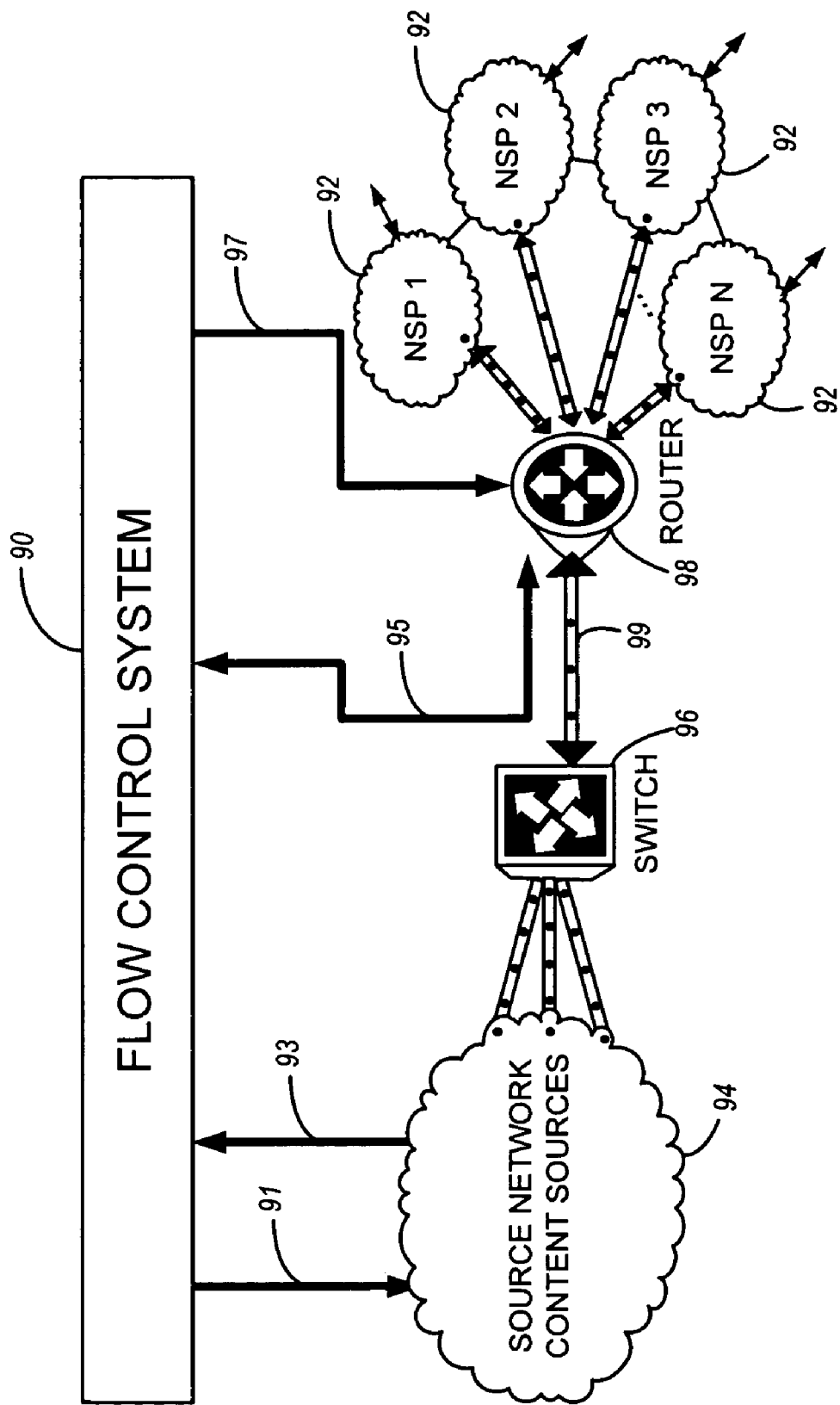
FIG. 1E illustrates a simplified data network and flow control system in accordance with a specific embodiment of the present invention.

FIG. 1E illustrates an exemplary data network within a portion of a network system 80 of FIG. 1C including NSPs 92, and a flow control system in accordance with a specific embodiment of the present invention. Exemplary flow control system 90 is configured to communicate with one or more network elements of the data network. Although flow control system 90 is shown external of and in communication with the elements of source network 94, switch 96, and router 98, flow control system 90 can be wholly embodied in any of the elements shown, or alternatively, can be distributed, in portions, over each of the elements. In another embodiment, flow control system 90 resides on one or more servers or network elements within exemplary source network 94.

An exemplary data network includes one or more source networks 94. A source network 94 typically is a local network including one or more servers owned and operated by application service providers, managed service providers, content delivery networks, web hosting companies, individual enterprises, corporations, entities and the like. Such service providers typically communicate information to users that are further removed from the multi-homed NSPS 92, such as NSP 1, NSP 2, NSP 3, . . . and NSPn. In one example, NSPS 92 are coupled to a source network or source point as to be considered a first set of data networks. These NSPs, or first set of data networks, are in turn coupled to a second set of networks, wherein the second set is connected to multiple other networks, thus establishing one or more paths from a source to a destination. A path as described herein can be a route from a source to a destination that is divided into segments, each segment residing wholly within a provider.

The multiple connections between router 98 and multiple network service providers 92 provide an operator of source network 94 a means with which to direct data traffic according to the best performing network service provider. Switch 96 operates to transfer bi-directional data 99, such as IP data, bi-directionally from source network 94 to router 98. Although a single router and switch are shown, one having ordinary skill in the art will appreciate that either additional routers and switches or other suitable devices can be substituted according to another embodiment of the present invention. Moreover, switch 96 need not be used to practice the subject invention. In a specific embodiment, router 98 includes one or more routers running an exemplary protocol, such as BGP (e.g., BGP4, such as Cisco™ or Juniper implementations™), for example, and preferably has route visibility across multiple network service providers.

In an embodiment of flow control system 90, system 90 operates to measure end-to-end (i.e., source-to-destination and destination-to-source) data traffic 95 in terms of flow characteristics, such as performance, cost, bandwidth, and the like. Flow control system 90 also generates statistics associated with data paths across multiple network service providers in real-time, or near-real-time. Such statistics are communicated to source network 94 for providing network engineering personnel, for example, with report information 91 such that immediate reports are created to provide information related to route-change activity, traffic performance as delivered to selected destinations and transit provider usage (i.e., bandwidth), cost, and the like.

In one embodiment according to the present invention, a local computing device uses report information 91 from system 90 to generate visual and graphical representations on, for example, a user-friendly interface (UI) where the representations are indicative of data traffic along one or more paths (e.g., paths between a source and a destination). Network personnel, or any entity responsible for flow control, with access to source network 94 then can provide control information 93 to flow control system 90 to modify system operation by, for example, changing data traffic flow from a under-performing current, or default, path to a better performing path. Intervention by network personnel, however, is not necessary for flow control system 90 to operate in accordance with the present invention.

Flow control system 90 further functions to compare specific data traffic flows (i.e., both uni- and bi-directional traffic flows outbound from and inbound into the data network) to determine whether a particular traffic flow meets one or more rules of an associated flow policy. A flow policy, as referred to herein, includes a set of one or more rules that is associated with a particular data traffic flow related to particular system user (e.g., as denoted by an IP address prefix).

A rule, or criterion, is a minimum level, a maximum level or a range of values that defines acceptable routing behavior associated with a traffic flow characteristic. For example, a rule can set: the maximum acceptable cost, with or without regard to network service provider cost; the maximum load or bandwidth usage associated with traffic flows through specific providers; a range of acceptable (or non-acceptable) service providers; the maximum acceptable latency or loss over one or more paths across multiple network service providers; acceptable ranges of performance for each NSP, such as maximum burst limits, minimum performance commitments and range of costs (i.e., cost structures with regards to time of day, type of traffic, etc.); and any other data flow characteristic that can influence the measurement or the control of data traffic.

Flow control system 90 further operates to detect when one or more rules, or flow policies, are violated and then takes remedial action. That is, flow control system 90 enforces policies associated with data traffic flow by correcting detrimental deviations in performance (i.e., service level assurance), costs or bandwidth (i.e., load in terms of percent capacity available per path). Flow control system 90 makes such corrections based on real- or near-real time traffic analysis, local path diversity (i.e., modifying one or more egress paths from a data network), and visibility into downstream available paths. For example, for a destination related to a specific traffic flow, flow control system 90 directs, or re-directs, traffic to one or more alternative paths to resolve a particular flow's deviation in terms of flow characteristics, from its flow policy.

Figure 2:
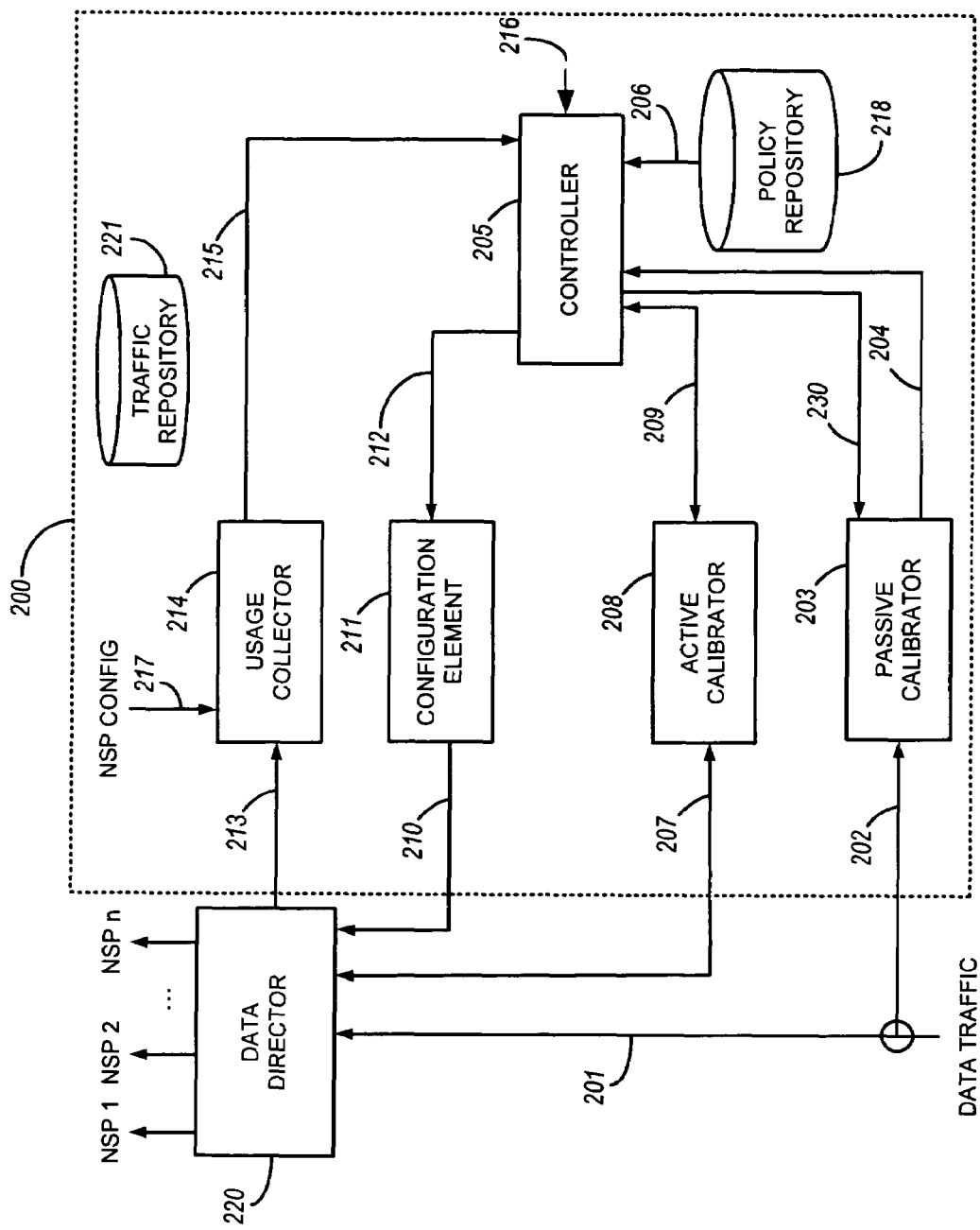
FIG. 2 is a simplified block diagram of one embodiment of a flow control system according to one embodiment of the present invention.

FIG. 2 illustrates a specific embodiment of flow control system 90 of FIG. 1D. In another embodiment, flow control system in FIG. 2 is a reactive flow control system. That is, a reactive flow control system is designed to react to policy violations indicating sub-standard routing of data traffic over one or more data networks or service providers (i.e., addresses pass-fail criteria) rather than optimizing performance at some targeted level of acceptable operation.

Flow control system 200 includes controller 205, passive calibrator 203, active calibrator 208, configuration element 211, and usage collector 214, each of which can be realized in hardware, software, or a combination thereof. For example, controller 205, passive calibrator 203, active calibrator 208, configuration element 211, and usage collector 214 are software modules designed to perform specific processes, as described herein, in accordance with the present invention. Such modules can reside in one or more computing devices, such as the computing devices shown in FIG. 1A, or alternatively, over one or more USER-type machines (i.e., servers) coupled over a data network or network system.

Exemplary passive calibrator 203, active calibrator 208 and usage collector 214 are coupled to controller 205 to, in part, provide flow characteristics of data traffic. Controller 205 receives monitored flow characteristics as well as flow policies to be enforced. Controller 205 is configured to determine if a flow policy is violated, and upon detection of such a violation, to then select a remedial action to resolve the violation. Configuration element 211 is coupled to controller 205 used to receive information to initiate remedial actions and is configured to communicate such actions to data director 220. Thereafter, data director 220 implements the corrective action to resolve the pending violation, for example, by changing the traffic flow from the current path to a better performing path.

Additionally, flow control system 200 includes traffic repository 221 and flow policy repository 218. Exemplary traffic repository 221 and flow policy repository 218 are databases, such as storage devices configured to store a large number of records in one or more data structures. Traffic repository 221 is designed to store and to communicate information related to traffic and route characteristics, and flow policy repository 218 is designed to store and to communicate policy information or rules to govern the performance and cost of each of the data traffic flows. One having ordinary skill in the art of database management should appreciate that many database techniques may be employed to effectuate the repositories of the present invention.

In operation, flow control system 200 of FIG. 2 monitors egress and ingress data flow 201, such as IP data traffic, to determine whether data flow 201 to and from source network is within the performance tolerances set by the associated flow policy. Flow control system 200, in one embodiment, receives data flow 201 by replication, such as by a network switch, by using a splitter, such as an optical splitter, or any other tapping means know to those having ordinary skill in the art. Data flow 202, which is exactly, or nearly exactly, the same as the information contained within data flow 201, is provided to passive calibrator 203.

Passive calibrator 203 monitors the data traffic of data flow 201 and communicates information 204 related to the traffic and traffic performance to controller 205. Controller 205 is configured to receive policy data 206 representing one or more policies that correspond to a particular traffic flow, such as a particular data flow. Moreover, the particular data flow can be associated with a certain user identified by a destination prefix, for example. From policy data 206, controller 205 determines the levels of performance, cost, or utilization that the particular traffic is to meet. For example, controller 205 determines whether a particular traffic flow of data flow 201 is meeting defined performance levels (i.e., service levels) as defined by one or more requirements or criteria, such as inbound and outbound network latency, packet loss, and network jitter.

Active calibrator 208 functions to send and to receive one or more active probes 207, of varying types, into and from the data networks. These probes are designed to measure network performance, including the path taken across one or more available providers (i.e., to determine if a provider is a transit AS rather than peer AS), next hop-in-use, and other network parameters. To activate active calibrator 208, controller 205 sends an active probe request 209 to active calibrator 208. Such a request is required if controller 205 determines that additional information regarding alternative paths or network system characteristics are necessary to better enforce policies in reactive flow control systems or Alternatively, such request may be required to prevent the occurrence of such policy violations in optimized flow control systems.

Usage collector 214 is configured to receive NSP data 217 representing one or more network provider configurations. Generally, such configurations include the number of paths ("pipes") associated with each provider and the size thereof. Additionally, NSP data 217 can relate to a provider's cost or billing structure and can also include each provider's associated set or sub-set of addresses, each provider's billing methods (i.e., byte/min, etc.), etc. Moreover, usage collector 214 is configured to collect usage information 213 from the network elements, such as switches, border routers, provider gear, and other devices used to transport data over data networks. Usage collector 214 is configured to provide controller 205 with provider utilization and billing information 215, which represents aggregated data based upon NSP data 217 and usage information 213. Utilization and billing information 215 includes data that represents cost, billing, utilization, etc., for each network service provider of interest.

One having ordinary skill in the art should appreciate that NSP data 217 can be provided to usage collector 214 in a variety of ways. For example, the data can be provided by the data paths used by the data flows or can be provided by an entity having authority to do so, such a network engineer entering the data into a computing device in source network 94 of FIG. 1E.

Moreover, usage collector 214 is configured to monitor usage characteristics defining a NSP's data traffic capacity, costs, etc. Usage information 213 provided to usage collector 214 includes usage characteristics from network elements, such as switches, border routers, routers, provider gear, and other devices used to transport data over data networks. Usage refers to the data (i.e., raw data such as X Mb samples at time(0)) that represents instantaneous or near instantaneous measurement of characteristics (i.e., usage characteristics) that define, for example, the load and available capacity of each network service provider. "As used herein, Utilization" the usage rate (i.e. the Change in usage over time). For example, suppose the usage collector monitoring NSP1 measures its utilization, or capacity over time, as X Mb at time (0) and Y Mb at time(1). This raw data, or usage, is used to calculate utilization, or usage rate for NSP1 (e.g., Y−X/time (1)−time(0)). Bandwidth is the total capacity of each path or segment of path available for traffic flow. In one embodiment, the usage can be measured in any segment in any path at any number of hops or networks from a first point. Load is typically defines the amount of capacity of a particular path that is used to carry data traffic and can be expressed as load/bandwidth.

Usage collector 214 is designed to generate utilization and billing information 215 based upon usage information 1213 and NSP data 217. Since each of the providers has different cost and billing structures, as well as methods of determining usage costs, usage collector 214 operates to aggregate usage information 213 accordingly to provide controller 205 with utilization and billing information 215.

Usage collector 214 then provides the utilization billing information 215 to controller 205 for each NSP of interest. One having ordinary skill in the art should appreciate that the usage collector can provide additional information based upon the provider usage information, to the controller, as needed to better effectuate route control.

Controller 205 collects information (i.e., aggregated performance and usage characteristics) from each of passive calibrator 203, active calibrator 208, usage collector 214, and optionally traffic repository 221. Based upon the information collected, controller 205 determines a course of action that best alleviates the policy violations in respect to the information represented by policy data 206 that is conveyed to controller 205. Once the coarse of action is determined, controller 205 initiates and sends a network routing change request 212 to configuration element 211. In a specific embodiment, controller 205 also provides data representing one or more alternate data paths that can be used to resolve the policy violation.

Configuration element 211 is designed to communicate routing changes in the network to data director 220. Once configuration element 211 sends one or more routing changes, data director 220 then moves data flow 201 from a current path to another path (e.g., from NSP1 to NSPn or a first path of NSP1 to a second path of NSP1). Data director 220 thus operates to distribute traffic to these destinations across multiple NSP links based on, for example, the cost and performance measured across each link.

In operation, configuration element 211 communicates one or more routing changes 210 with data director 220, for example, by using a routing protocol such as BGP. Configuration element 211 functions to dynamically control routing behavior by modifying the source address of the traffic passing through data director 220. The source address is modified in a way that improves application performance as well as cost requirements.

The following discussion includes more description of each of the elements of exemplary control system 200. Referring back to active calibrator 208, active calibrator 208 provides active mechanisms within system 200 for determining the nature of downstream or upstream paths. This information is typically not available in any conventional protocol used on data networks such as the Internet, and must be collected beyond the information generally available. As shown in FIG. 2, active calibrator 208 is coupled to controller 205 to provide at least a destination prefix that is not meeting the policy requirements, such as minimum performance level. Once received, active calibrator 208 then initiates a calibration process that determines most or all of the available network paths to the destination address as well as performance levels. Controller 205 is designed to select the most suitable probes that active calibrator 208 is to use, based on the particular policy requiring enforcement or correction, and thereafter to initiate active probing of network paths using active calibrator 208.

In one embodiment, active calibration probes are communicated to available network or Internet paths via probe path 207. The returning active calibration probes enter via probe path 207 into active calibrator 208. Active calibrator then forwards probe information 209 to controller 205, which contains performance information including alternate available paths. Controller 205 then determines how best to enforce the specifics of the policy associated with the subject traffic flow. Exemplary active calibrator 208 employs active calibration mechanisms to provide, for example, long term statistics.

In another embodiment according to the present invention, active calibrator 208 resides in data director 220, or alternatively, is integrated into controller 205. There are several proprietary implementations of commercially available routers suitable to practice the present invention. One example of suitable active probes is the RMON probe. Cisco systems uses Service Assurance Agent ("SAA") that is derived from the remote monitoring ("RMON") probes to send out active probes. SAA allows routers to measure and report network-originated application round trip times. Although not every probe mentioned below is available in SAA for network calibration, one skilled in the art would appreciate how each of the following might be implemented to practice one or more embodiments of the present invention.

An exemplary active calibrator 208 can use ICMP (Internet Control Message Protocol) echo request or other ping-type probes, lightweight TCP-based probes, Sting probes, "pathchar" probes, lightweight probes using User Datagram Protocol ("UDP") packets with a predefined TTL (time to live), traceroute probes, or other active probes that are suitable for use by active calibrator 208 in accordance with the present invention.

These probes that are received back by active calibrator 208 of FIG. 2 are sent out by their source addresses. Such probes are all sourced and received on an exemplary stats computer system resident, for example, in the local premises, or as a stats process on a router. In another embodiment, active calibrator and the of its use of probes operate in accordance to probes described in a U.S. patent application, entitled "System and Method to Assure Network Service Levels with Intelligent Routing," having U.S. patent application Ser. No. 09/833,219 and filed on Apr. 10, 2001, which is incorporated by reference for all purposes.

Exemplary passive calibrator 203 of FIG. 2 is configured to receive, without interfering with, network communication data 201, such as customer network traffic or Internet traffic. Network communication data path 201 (i.e., IP data traffic), as monitored by passive calibrator 203, includes the default or currently routed path of the data traffic that is provided to passive calibration element 203 from data director 220. The currently routed path is, for example, the path (e.g., hop-by-hop) between routers that a packet would take, as determined by standard routing protocols. Passive calibrator 203 is coupled (i.e., electrically, optically, by radio waves, etc.) to controller 205 to provide information which indicates whether the specific IP data traffic is within the range of acceptable performance metrics, such as determined by a flow policy. Passive calibrator 203 operates to instantaneously monitor all traffic received via data flow 202 and is designed to overcome the complications of relying solely on active traffic analysis, such as EMCP, as shown with respect to FIG. 1D. When the controller addresses policy violations, for example, passive calibrator 203 operates to overcome the complications of performing only active traffic analysis in the presence of multi-path (e.g., ECMP).

In another embodiment of the present invention, passive calibrator 203 examines the traffic stream in both directions (i.e., ingress and egress) and classifies each of the traffic streams into flows. Traffic flows are monitored within passive calibrator 203 according to the underlying protocol state (e.g., such as regarding TCP sessions) over time. For example, passive calibrator 203 classifies the traffic flow according to round trip latency, percentage of packets lost, and jitter for each of the traffic routes or flows. Such traffic route information is used to characterize the "end-to-end" performance of the paths carrying the traffic flows, which includes flow rates, and is aggregated into a series of network prefixes.

As described above, passive calibrator 203 is coupled to store, fetch and update traffic and route information stored in traffic repository 221 (connection not shown). Exemplary traffic repository 221 is a database configured to store and to maintain data representing traffic and route information that is useful to the end user employing a flow control system, such as system 200 of FIG. 2, as well as the operators of, for example, an network service provider. The data within traffic repository 221 includes long term statistics about the traffic. These statistics will be used for reporting, analysis purposes, and providing general feedback to a user of a flow control system according to the present invention.

Such feedback will comprise, for example, of types of traffic being sent, source addresses, destination addresses, applications, traffic sent by ToS or DSCP ("DiffServ Code Point") setting (which might be integrated into a differentiated billing system), and volume of traffic. These statistics are fed into traffic repository 221 where, for example, a reporting engine or some other analysis process has access to them. The information stored in traffic repository 221 is data representing such traffic route characteristics arranged in any suitable data structure as would be appreciated by one skilled in the art.

Figure 3:
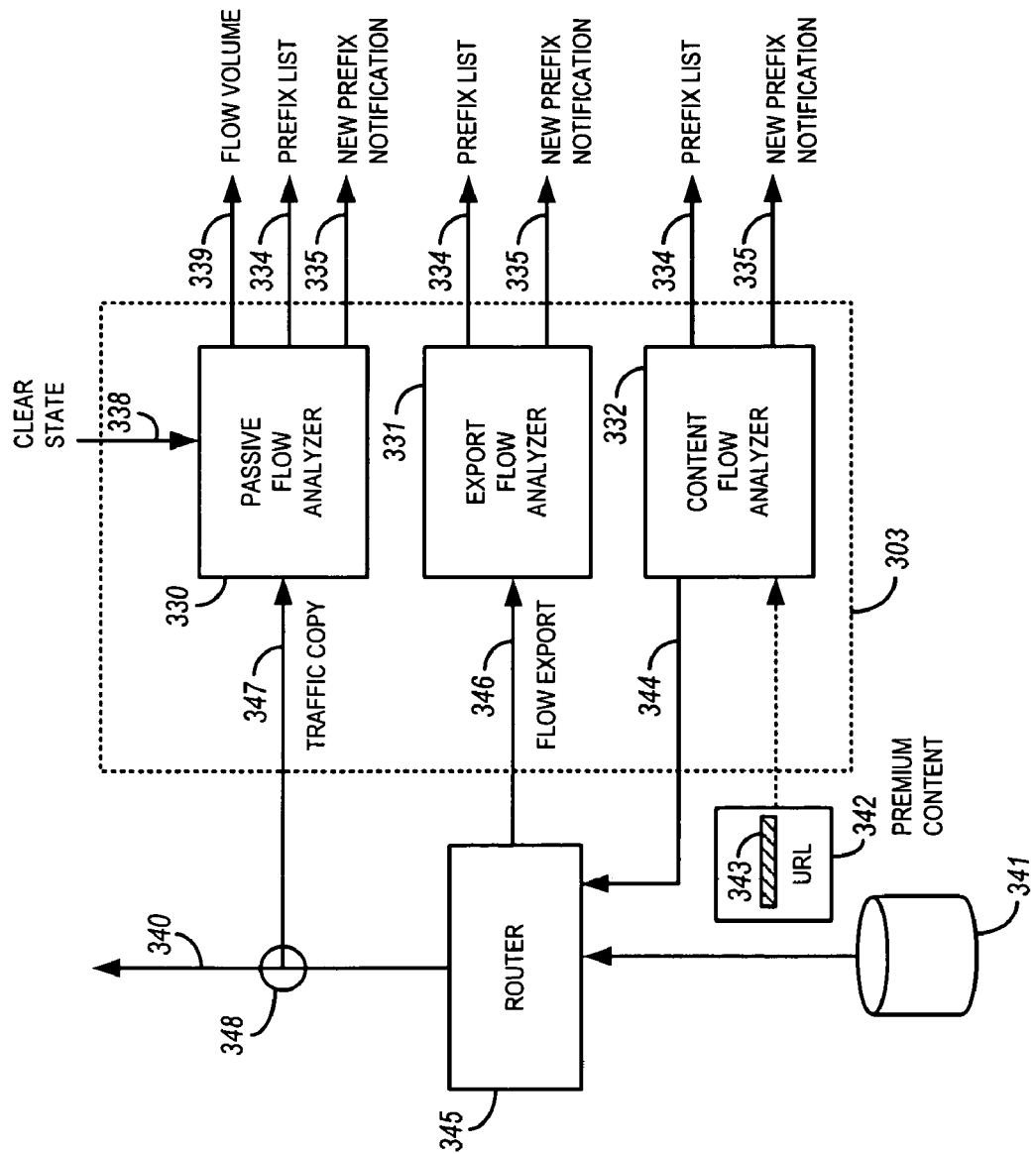
FIG. 3 is a functional block diagram of an exemplary passive calibrator of FIG. 2.

FIG. 3 is a detailed functional block diagram showing exemplary elements of a passive calibrator 303 according to an embodiment of the present invention. Passive calibrator 303 includes, for example, passive flow analyzer 330, export flow analyzer 331, and content analyzer 332.

In one embodiment, passive flow analyzer 330 performs passive analysis on the traffic to monitor current traffic flow characteristics so the controller can determine whether the monitored current traffic flow meets associated policy requirements. Export flow analyzer 331 performs passive analysis on exported flow records from a network device, such as from those devices (e.g., router) that advertise traffic type, source and destination addresses, and other information related to the traffic that it travels across service provider links. An example of such a network device is Cisco's Netflow™ product. In another embodiment, passive flow analyzer 330 operates in accordance to the passive flow analyzer described in the above-mentioned U.S. patent application Ser. No. 09/833,219.

Content Flow Analyzer 332 performs passive analysis of specific elements of data content, such as web site content. Export flow analyzer 331 and content flow analyzer 332 determine a set of relevant prefixes or a prefix list 334 that is associated with a specific user's policy. Prefix list 334 is sent as data representing such prefixes to an active detection process in the controller. Prefix list 334 can be one or more lists or data structures configured to store data representing performance and usage characteristics and are designed to receive a query, for example, by the controller. Once queried, the passive flow analyzer provides the one or more prefix lists, or portions thereof, to the controller for use in determining a policy violation, for determining which routes or path comply with the flow policy, which path is the optimum path for routing data, and the like. An exemplary prefix list can be generated by export flow analyzer 331 and content flow analyzer 332, as well as passive flow analyzer 330.

Figure 17:
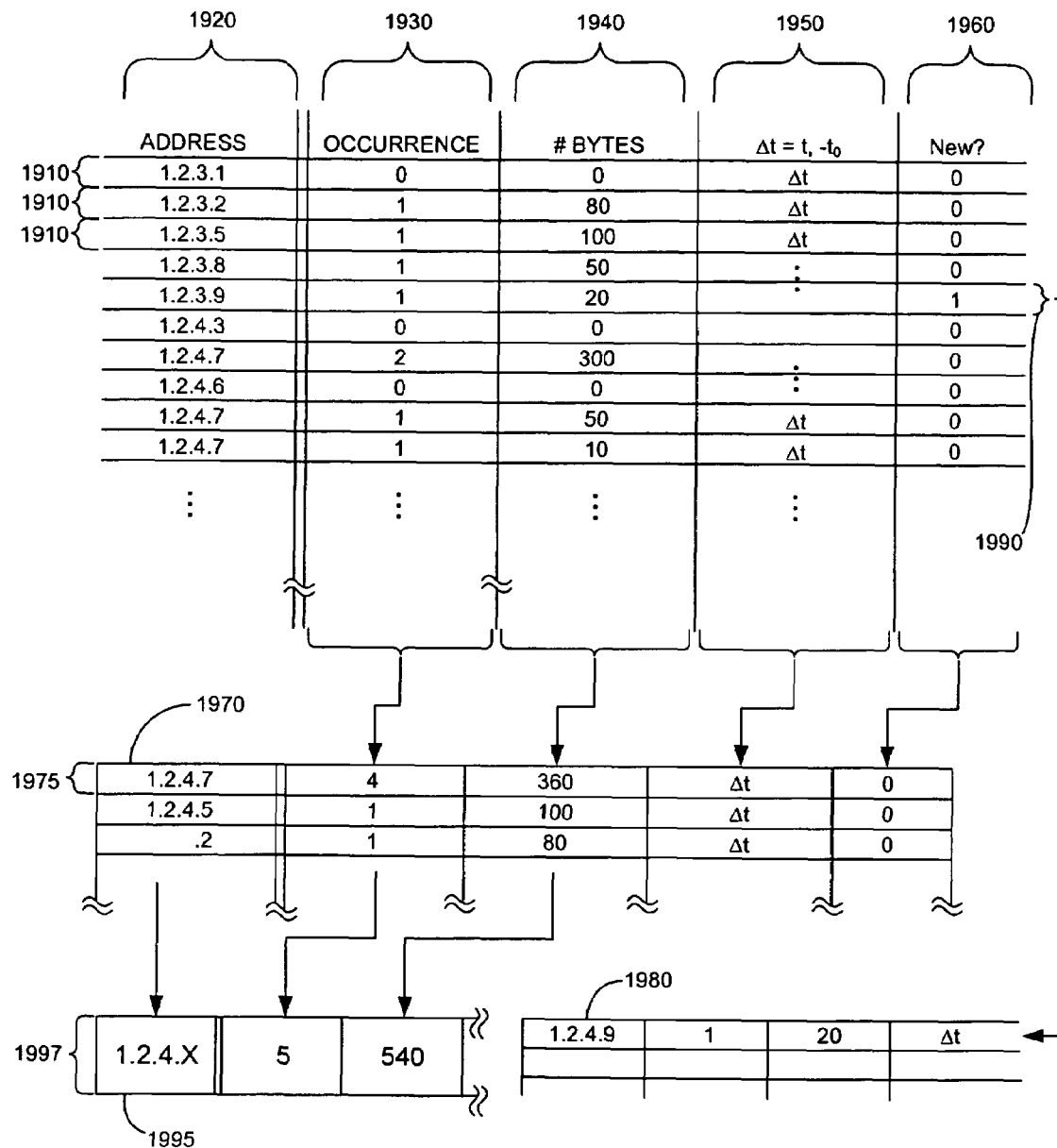
FIG. 17 is a representation of an exemplary address or prefix list according to an embodiment of the present invention.

FIG. 17 shows an exemplary data structure 1900 suitable for providing for one or more of the prefix lists described herein. Data structure, or list, 1900 includes many IP addresses 1920 with many records 1910 associated with each address (e.g., destination) or prefix of variable granularity. Each record 1910 includes an address 1920 (or prefix), a number of occurrences during a time period 1930, number of bytes sampled 1940, time interval in which sampling occurred (Δt) 1950, new prefix flag 1960 (1 represents new prefix, 0 represents old prefix), or the like.

List 1970 includes aggregate flow information for each address 1920 or prefix. For example, record 1975 includes the following data: for address 1.2.4.7, this address was monitored four times during the sampling time interval (Δt)t with a total flow volume of 360 bytes. With record 1990 having a new prefix flag set (i.e., first time this address has been monitored), new prefix list 1980 includes address 1.2.4.9 having one occurrence (first time) over (Δt) interval. One having ordinary skill in the art should appreciate that other relevant data may be monitored and can be stored in list 1900. Moreover, the data representing address, occurrence, number of bytes, time interval, etc., can be used to manipulate the data such in a way that the controller can easily obtain it.

For example, the data stored within a list 1920 can be aggregated or grouped according to address or prefix. As shown in FIG. 17, aggregate list 1995 includes the group of addresses corresponding to 1.2.4.X. For example, the record 1997 of aggregate addresses contains data indicating that the aggregation of addresses had been monitored five times during the time interval and had a total volume of 540 bytes. One having ordinary skill in the art should appreciate that addresses or prefixes can be grouped or aggregated in many ways.

Export flow analyzer 331 and content flow analyzer 332 also are configured to notify controller 205 when a previously unseen prefix has been added to the prefix list 334. New prefix notification signal 335 enables the control element 1005 to establish a new baseline performance for this prefix and to seed the routing table with a non-default route, or alternative route (i.e., non-BGP), if necessary. In one embodiment, export flow analyzer 331 and content flow analyzer 332 provide for monitoring of performance characteristics.

Content flow analyzer 332 is typically used when the main source of traffic flow 340 is web site or other content. Content source 341 can be configured such that special or premium content 342 that must be optimized can be identified by the flow control system by using, for example, an embedded URL 343. URL 343 redirects the client to a small content server running on the content flow analyzer 332. Content flow analyzer 332 receives a request for the small content element, which is generally a small image file (e.g., a 1×1 GIF) and is invisible or imperceptible in relation to the main original content, and responds to the client with the small content element 344. Content flow analyzer 332 then stores or logs this transaction, and by using these logs, content flow analyzer 332 is able to perform aggregation and assemble content prefix list 334. The list 334 is passed along to controller 205, for example, for active service level monitoring and policy enforcement.

Figure 4:
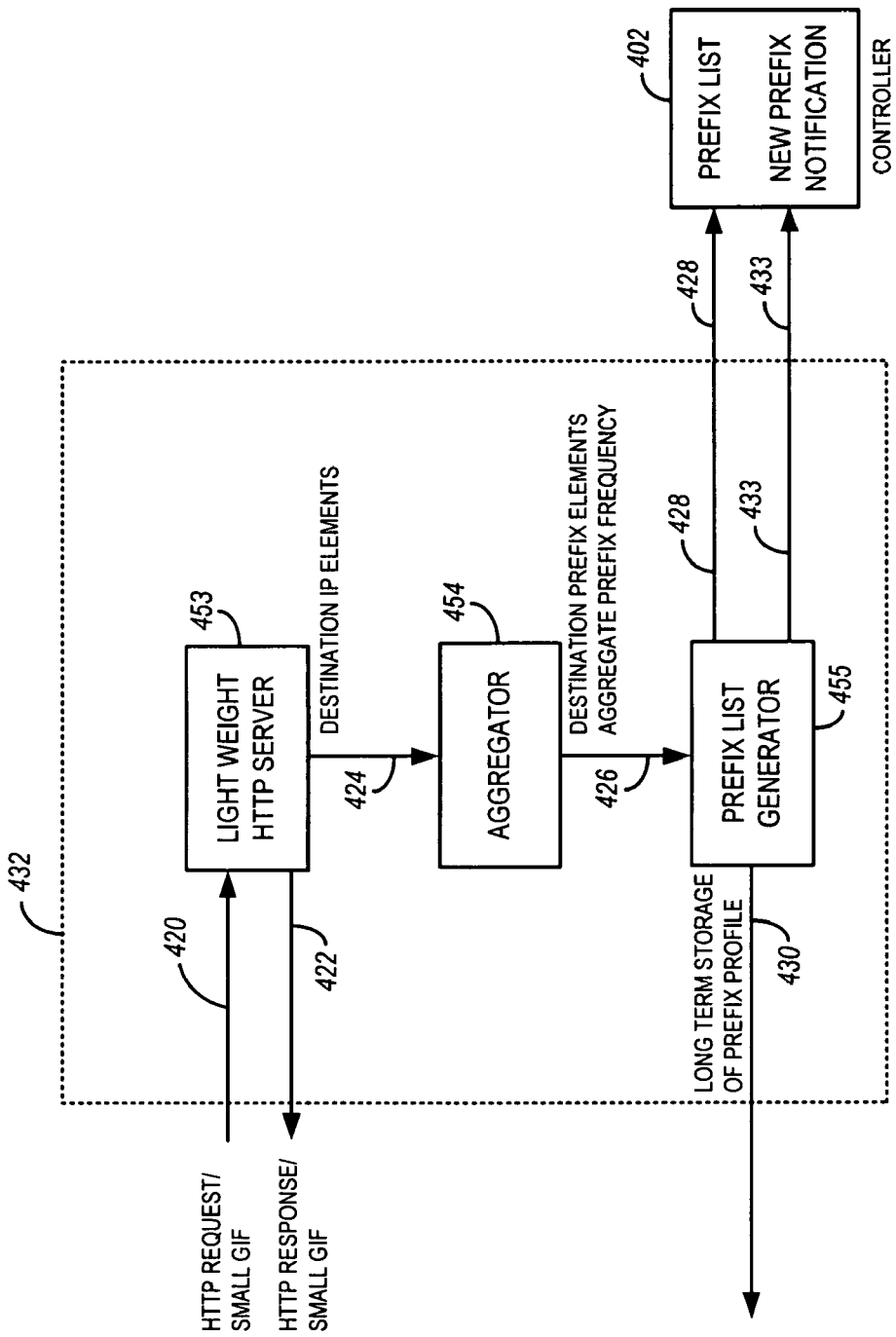
FIG. 4 is a functional block diagram of an exemplary content flow analyzer of FIG. 3.

FIG. 4 illustrates a functional block diagram of an exemplary content flow analyzer 432. Content flow analyzer 432 handles requests 420 for a small element of content, which is, for example, a 1×1 pixel image file that is imperceptible (although it need not be) on the resulting page. The small element is associated with the premium or generally specific pages of a larger set of content. The small element is, for example, a small redirect URL embedded within the content.

The small redirect URL acts to generate an HTTP request 420 in response to the small element of content. Content flow analyzer 432 sees this request 420 and responds 422 to it with, for example, a lightweight HTTP server 453. This server is fast and lightweight, and does nothing other than respond with the image file. The lightweight web server 453 logs the IP address of the client requesting the web page, and sends the one or more addresses to aggregator 454. Aggregator 454 aggregates, or collates, individual IP elements 424 into prefixes of varying granularity (e.g., /8 through /32) and also aggregates the frequency with which each prefix is seen over an interval of time.

That is, aggregator 454 classifies prefixes according to its frequency of occurrence and provides aggregated (i.e., grouped) prefixes 426 to prefix list generator 455. Prefix list generator 455 creates destination prefix list 428 according, for example, to a prefix's importance in relation to the overall operation of the system as defined by the aggregated or grouped prefixes 426. For example, each monitored traffic flow is examined to determine the performance characteristics associated with a destination prefix or address.

Aggregate prefixes 426 are generally classified in terms of flow frequency, and average or total flow volume. Prefix list generator 455 sends an updated to current prefix list 428 to controller 205 of FIG. 2, and also notifies other elements of the system with a new prefix notification signal 432 when a new prefix is observed. Prefix list generator 455 stores the prefix information 430 to persistent storage for reporting and analysis purposes. A new prefix provides an additional alternate path or path segment that was unknown up until a certain point of time. The new alternate path or path segment associated with the new prefix can provide for flow policy compliance, and thus can be used to re-route or alter routing of data to obviate a policy violation.

Referring back to FIG. 3, export flow analyzer 331 operates in conjunction with network elements that can export (i.e., communicate) flow information in a format useable by analyzer 331. One exemplary format is the Cisco NetFlow™ export format. Any network element designed to export flow information, such as router 345 or a layer 2 switch, thus is also configured to passively monitor the traffic it is processing and forwards export records 346 to export flow analyzer 331. Export flow analyzer 331 functions to process export flow records 346, aggregates the flows into prefix elements, and generates prefix list 334. The prefix list is generally a subset of all prefixes observed by the flow control system. A prefix is selected from all prefixes based upon flow volume and flow frequency over an observation period. The selected prefix then is placed into prefix list 334 before the list is passed along to controller 205 of FIG. 2, for example.

Figure 5:
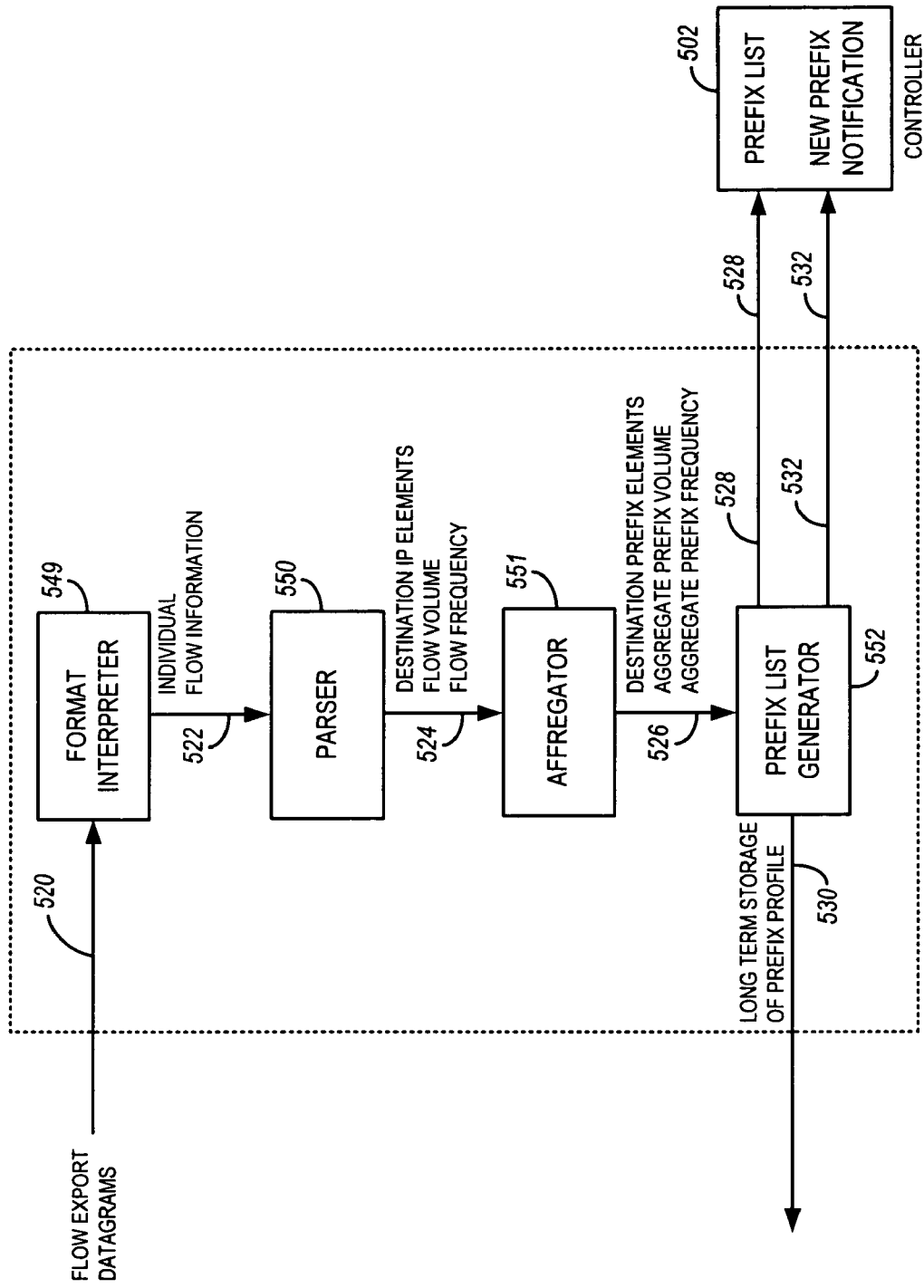
FIG. 5 is a functional block diagram of an export flow analyzer of FIG. 3 in accordance with one embodiment of the present invention.

FIG. 5 is a functional block diagram of exemplary export flow analyzer 531. Export flow analyzer 531 includes format interpreter 549, parser 550 and prefix list generator 552. Format interpreter 549 is configured to receive export flow datagrams 520 from the network elements designed to send them. Format interpreter 549 then communicates individual flow information 522 to parser 550. Parser 550 operates to interpret destination IP elements from the flows monitored by the passive calibrator. Parser 550 also aggregates traffic flow according to total flow volume or transportation rate (e.g., in bytes/time unit) as well as flow frequency of destination addresses, for example, into aggregate elements. Thereafter, parser 550 sends the aggregate elements 524 to aggregator 551. Aggregator 551 then generates prefix-level destination information 526 (i.e., aggregate prefix volume and frequency) at a variety of prefix granularities (e.g., from /8 up through /32). In other words, aggregator 551 determines the frequency, session, or for a specific prefix, the aggregate volume of occurrences related to that prefix, over an observed time interval.

Destination prefix list 528 is generated by prefix list generator 552 by, for example, ranking and organizing traffic flow characteristics related to prefixes in order of relative importance. List 528 contains data representing an aggregation of prefixes and is organized relative to other prefixes, as determined by the system or an entity to ensure policy enforcement. For example, one or more prefixes can be ordered in terms of flow frequency and average or total flow volume in relation to other prefixes available to the overall system. Prefix list generator 552 sends updates to the current prefix list to controller 205 of FIG. 2 and also notifies other elements of the system when a new prefix is observed via a new prefix notification signal 532. Prefix list generator 552 stores all prefix information 530 to persistent storage for reporting and analysis purposes.

Figure 6:
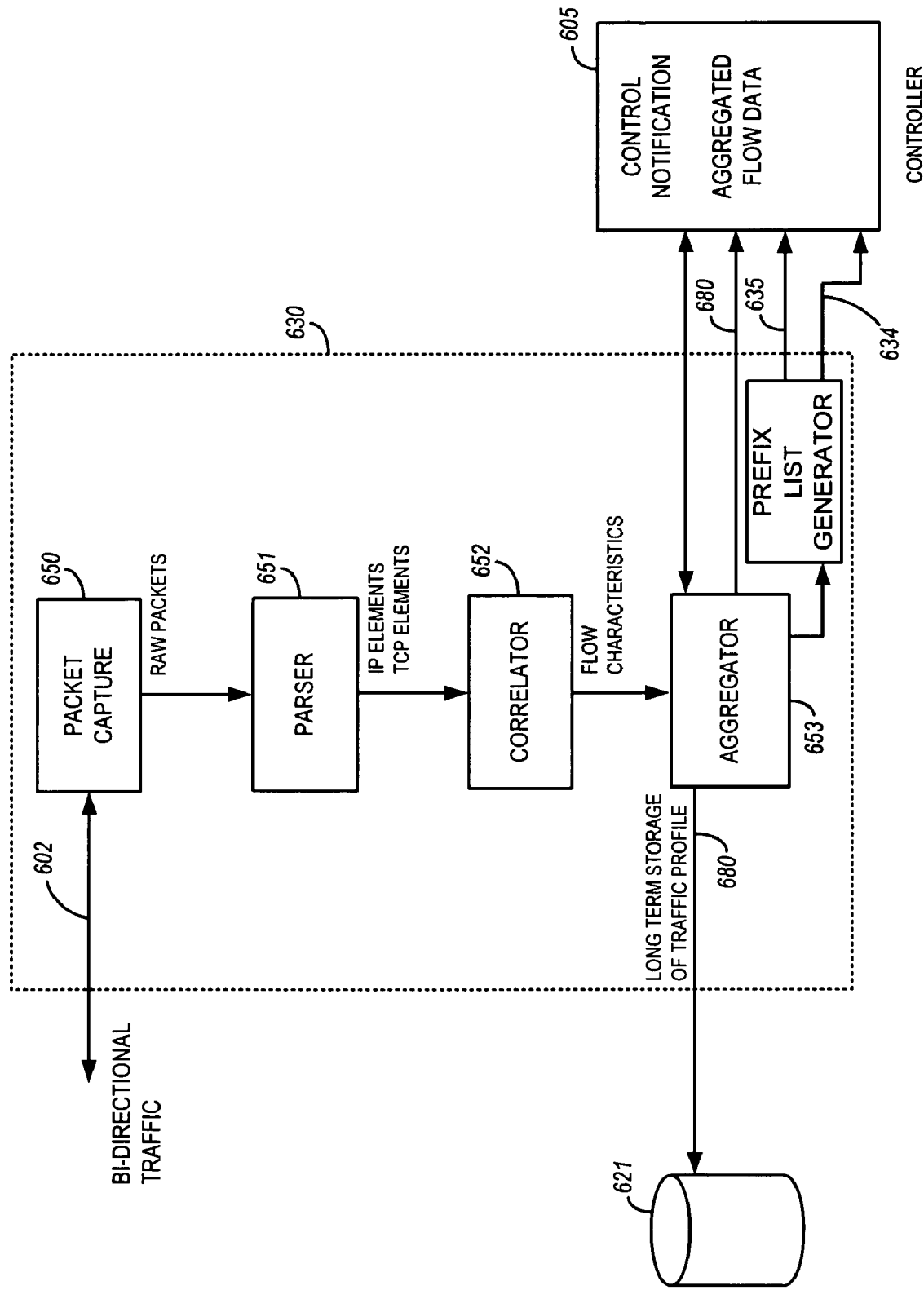
FIG. 6 is a functional block diagram of a passive flow analyzer of FIG. 3 according to one embodiment; of the present invention related to FIG. 7 is a simplified timing diagram determining network performance metrics with an exemplary flow control system located near a client or source.

FIG. 6 illustrates a functional block diagram of an exemplary passive flow analyzer 630 of FIG. 3. In one embodiment, passive flow analyzer 630 is designed to generate prefix list 634 and new prefix notification signal 635 and generates aggregated flow data 680, including network performance and usage statistics grouped into relevant characteristics. For example, prefixes of a certain size can be aggregated, or grouped, from highest traffic volume to lowest as observed over time. The aggregated flow data 680 is communicated to controller 605 and is used by the controller to determine whether the current traffic flow violates or fails to conform to an associated flow policy for a given destination. The passive flow analyzer 630 also functions to store aggregated flow data 680 in traffic repository 621, where it can be used for characterizing historical route and traffic flow performance. In another embodiment of the present invention, a prefix list generator is not included in the passive flow analyzer of FIG. 6.

Passive Flow Analyzer 630 uses a copy of the traffic 602 via a passive network tap or spanned switch port, as shown in FIG. 2, to monitor the network performance for traffic. Passive flow analyzer 630 also can monitor and characterize UDP traffic patterns for detection of anomalous behavior, such as non-periodic traffic flow, or the like. Passive flow analyzer 630 can use various neural network techniques to learn and understand normal UDP behavior for the application in question, and indicate when that behavior has changed, possibly indicating a service level violation which can be verified or explained with well known active probing techniques.

Additionally, passive flow analyzer 630 is designed to be "application-aware" according to how each of the particular traffic flows is classified. Traffic can be classified according to the classifier described in the above-mentioned U.S. patent application Ser. No. 09/833,219. That is, passive flow analyzer 630 can inspect the payload of each packet of traffic 602 to interpret the performance and operation of specific network applications, such as capture and interpretation of the Realtime Transport Control Protocol ("RTCP") for voice over IP ("VoiP"), for example.

In FIG. 6, passive flow analyzer 330 includes packet capture engine 650, packet parser 651, correlation engine 652, and aggregator 653. Packet capture engine 650 is a passive receiver configured to receive traffic (e.g., IP data traffic) coming into and out of the network. Capture of traffic is used to facilitate traffic analysis and for determining whether a current traffic route meets minimum service levels or policy requirements. Packet capture engine 650 is designed to remove one, several or all packets from a traffic stream, including packets leaving the network and entering the network. Packet capture engine 250 operates to remove certain packets up, for example, from the network drivers in the kernel into user space by writing custom network drivers to capture part of a packet. Using DMA, the partial packet can be copied directly into user space without using the computer CPU. Such packets are typically removed according to one or more filters before they are captured. Such filters and the use thereof are well known in the art and can be designed to, for example, remove all types of TCP traffic, a specific address range or ranges, or any combination of source or destination address, protocol, packet size, or data match, etc. Several common libraries exist to perform this function, the most common being "libpcap." Libpcap is a system-independent interface for packet capture written at the Lawrence Berkeley National Laboratory. Berkeley Packet Filter is another example of such a capture program.

Parser 651 is coupled to receive captured raw packets and operates to deconstruct the packets and retrieve specific information about the packet from each in the traffic flow. Exemplary parser 651 extracts information from the IP and TCP headers. Such extracted information from the IP headers includes source and destination IP addresses, DSCP information encoded in the ToS (i.e., "type of service") bits, and the like. DSCP carries information about IP packet QoS requirements. Each DSCP defines the Per Hop Behavior of a traffic class. DiffServ has 64 code points so that it can define 64 different types of traffic classifications. TCP header information includes source and destination port numbers, sequence number, ACK number, the TCP flags (SYN, ACK, FIN etc.), the window size, and the like.

TCP elements parsed from the TCP headers are especially useful in determining whether a policy is being enforced, in terms of performance. An increasing amount of traffic, however, does not rely on TCP and instead uses UDP. UDP does not contain the necessary information to determine service levels according to conventional approaches.

To determine service levels to these destinations, the present invention might employ a statistically relevant amount of collateral TCP traffic going to the same prefix or a series of active probes to the same destinations, or have the analyzer parse deeper into the packet and understand the traffic at the application layer (e.g., layer 7). There are some protocols running on UDP that have very specific requirements that are different from most other data traffic on the network. These protocols are loosely classified as "real-time" protocols and include things like streaming media and Voice over IP ("H.323"). Packet loss and latency, below a certain level, are secondary concerns for real-time protocols.

Most importantly, however, is reducing the variance in inter-packet arrival times (i.e., network jitter). Many real time protocols such as H.323 report the observed jitter in back channel communication known as the RTCP ("Real-Time Transport Control Protocol"), which is used to distribute time-dependent media data via IP multicast with feedback. If passive flow analyzer 630 of FIG. 3 is "application-aware," it can capture and observe the contents of the RTCP and be aware when the underlying network path is not meeting minimum jitter requirements. This could trigger an SLA violation in the same manner that 30% packet loss would.

Correlator 652 operates to interpret and to group the packet elements (e.g., TCP and IP) from the packets to determine the current service level of the flow and then groups the packets into a specific traffic flow. Flows are reconstructed, or grouped, by matching source and destination IP addresses and port numbers, similar to the process of stateful monitoring of firewalls. Correlator 252 determines the current service level by measuring several traffic characteristics during a TCP transaction. For example, correlator 252 determines the round trip time ("RTT") incurred on a network, and hence, this serves as a measure of latency for the network traffic.

Figure 7:
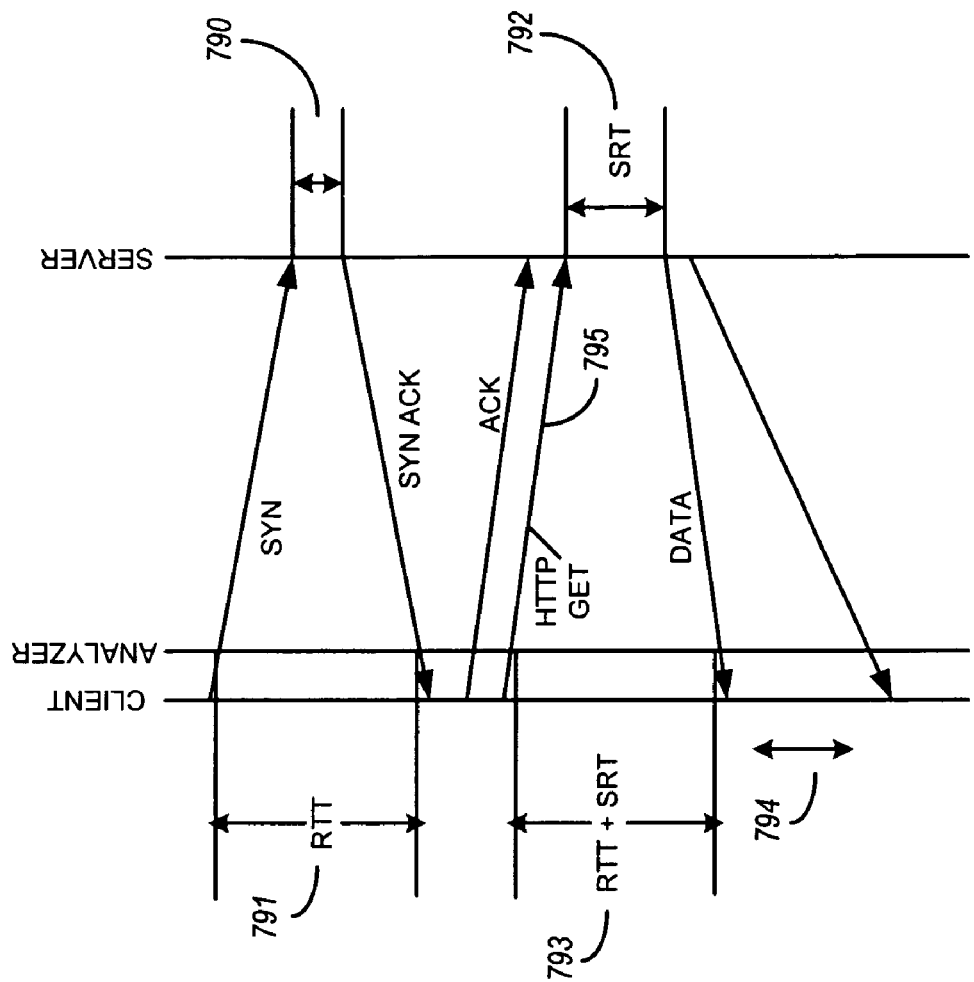
Figure 8:
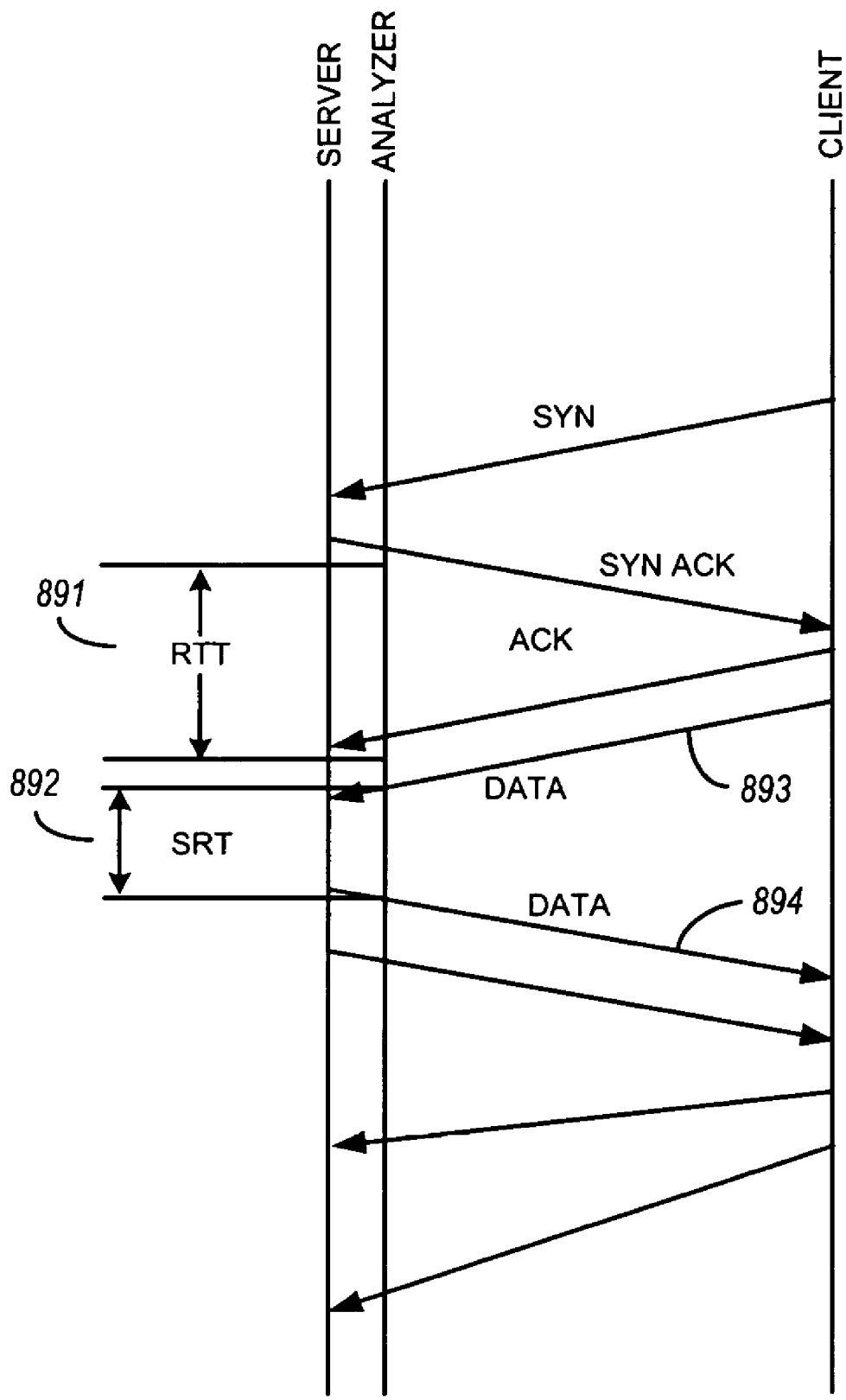
FIG. 8 is a simplified timing diagram of determining network performance metrics with an exemplary flow control system located near a server or destination.

FIG. 7 shows how correlator 652 of passive flow analyzer 630 of FIG. 6, placed near a source (e.g., client having a source address), can determine the network latency (NL) and server response time (SRT) for a TCP traffic stream. FIG. 8 shows how correlator 652 of passive flow analyzer 630 of FIG. 6, placed near a destination (e.g., server having a destination address), can determine the network latency ("NL") and server response time (SRT) for a TCP traffic stream Correlator 652 of FIG. 6 determines NL, for example, by estimating the difference 791 of FIG. 7 in time between a TCP SYN packet and its corresponding TCP SYN ACK packet. The difference in time between SYN and SYN ACK 791 is a rough estimation of the RTT excluding the small amount of time 790 that the server takes to respond to SYN. The SYN ACK packet is handled in the kernel of most operating systems and is generally assumed to be near zero. For each new TCP stream that is initiated from the source, correlator 652 can observe a time instantaneous value for network latency.

Packet loss is calculated, as a percentage, by correlator 652 by maintaining the state of all of the retransmitted packets that occur. From this value, correlator 652 calculates percentage packet loss from a total count of segments sent.

Correlator 652 also determines SRT 792 of FIG. 7, for example, by estimating the delta time (i.e., difference) 793 between, for example, the HTTP GET message 795 and the first data segment received and then by subtracting the previous value for the RTT. This assumes that the previous value for the RTT has not changed beyond an operable range since the TCP handshake occurred. The measurement shown by 794 indicates that measured congestion increases in the path as SRT 792 correspondingly increases. For purposes of this example, it is assumed that the data segments in the initial HTTP GET are sent back to back. In FIG. 7, the passive flow analyzer 630 is deployed close to (i.e., minimal or negligible latency due to geographically different locations) the clients requesting content from the IP data network, such as the Internet.

Correlator 652 also determines SRT 892 of FIG. 8, for example, by estimating the delta time between the HTTP GET message 893 and the first data segment 894. In FIG. 8, the passive flow analyzer 630 of FIG. 6 is deployed on the server end as will occur for most content delivery installations.

Referring back to FIG. 8, SRT 892 determined by correlator 652 depends on its location along the path that the traffic traverses. If passive flow analyzer 630 of FIG. 6 is on the client side, server response time 792 of FIG. 7 can be estimated as the delta in time between the HTTP GET Request message and the first data segment returned minus the RTT observed before the GET Request as shown in FIG. 7. If passive flow analyzer 630 of FIG. 6 is closer to the server side, the estimation is essentially the delta in time between the GET Request and the response as shown in FIG. 8. Congestion estimations are also possible by using the TCP Congestion Window ("cwnd") and by identifying the delta in receive time between segments that were sent back to back by the server, where the TCP congestion window controls the number of packets a TCP flow may have in the network at any time. Correlator 652 is coupled to provide the above determined exemplary flow characteristics to aggregator 653.

Referring back to FIG. 6, aggregator 653 primarily operates to group all flows going to each set of specific destinations together into one grouping. Aggregator 653 uses the service level statistics for each of the individual flows, received from Correlator 652, to generate an aggregate of service level statistics for each grouping of flows that are to go to the same destinations in the data network, such as the Internet. Aggregator 653 is also coupled to traffic storage 621 to store such aggregated (i.e., grouped by address prefix) traffic flow characteristics. Traffic flow characteristics (or traffic profiles) are then used for future statistical manipulation and flow prediction. In a specific embodiment, storage 621 is the equivalent, or the same, as storage 221 of FIG. 2.

The granularity of the destinations is the same as the granularity of changes that can be made in the routing table. Nominally, flow control system of FIG. 2 could install routes with prefixes of any length (i.e., 0/to /32), though the general practice is not to do so. Aggregator 653, therefore, will start aggregating flow statistics at the /32 level (i.e., class C networks) and continue all the way up to the /8 level (i.e., class A networks) into a data structure, such as a patricia or radix trie, or a parent-child data structure, or the like. In this way, it is possible to seek very quickly the necessary granularity of the routing change that needs to be made to ensure the service level is met.

Aggregation techniques employed by aggregator 653 are used to maintain the system 200 of FIG. 2 to acceptable performance service levels, such as determined by one or more flow policy requirements. Since network performance has been shown not to follow conventional statistical distribution, such as Gaussian or Poisson distribution, average calculations for service levels across all flows are not as reliable a measurement of a typical performance behavior during a predetermined time interval. If the service level agreement (SLA) or policy, however, states that the average service level must be maintained, then the outlying occurrences of poor performance will cause the average to be skewed, thus requiring corrective action to restore the minimum service levels being offered. A meaningful way to describe typical service levels being offered across all flows is to use median values, rather than average values. A person having ordinary skill in the arts will appreciate that either technique is possible and will depend on the definition of the service level that must be maintained.

Figure 9:
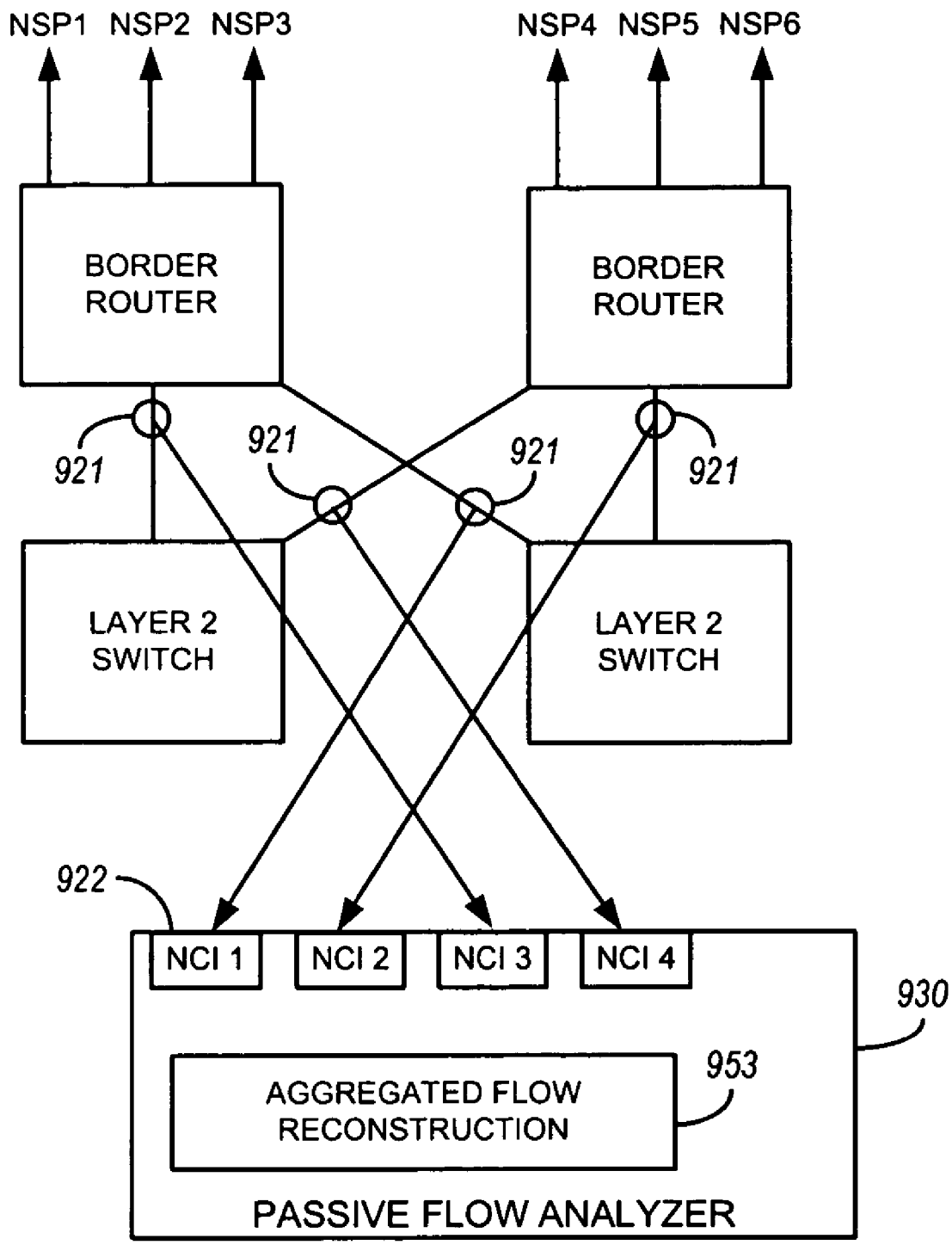
FIG. 9 is a network diagram of an exemplary passive calibrator with distributed packet capture according to another embodiment of the present invention.

FIG. 9 illustrates how passive flow analyzer 930, according to another embodiment of the present invention, is capable of packet capture and flow reconstruction across more than one network interface, each interface represented by a network interface card ("NIC"). In practice, many switch fabrics are constructed by tapping into a single point in the data stream or replicating a single port. The switch does not guarantee that passive flow analyzer 930 will see all of the traffic in both directions. Bi-directional traffic is required for optional flow reconstruction for passive analysis. In FIG. 9, the switch fabric shown must be passively tapped at tap points 921 at four places (as shown) and connected to passive flow analyzer 931 at four different network interface cards (NIC) 922. Passive taps at tap points 921 can be mirrored switch ports or optical/electrical passive taps. Passive flow analyzer 930 has a single or combined aggregated flow reconstruction element 953 that collects captured data from multiple network interfaces in order to perform flow reconstruction.

Figure 10:
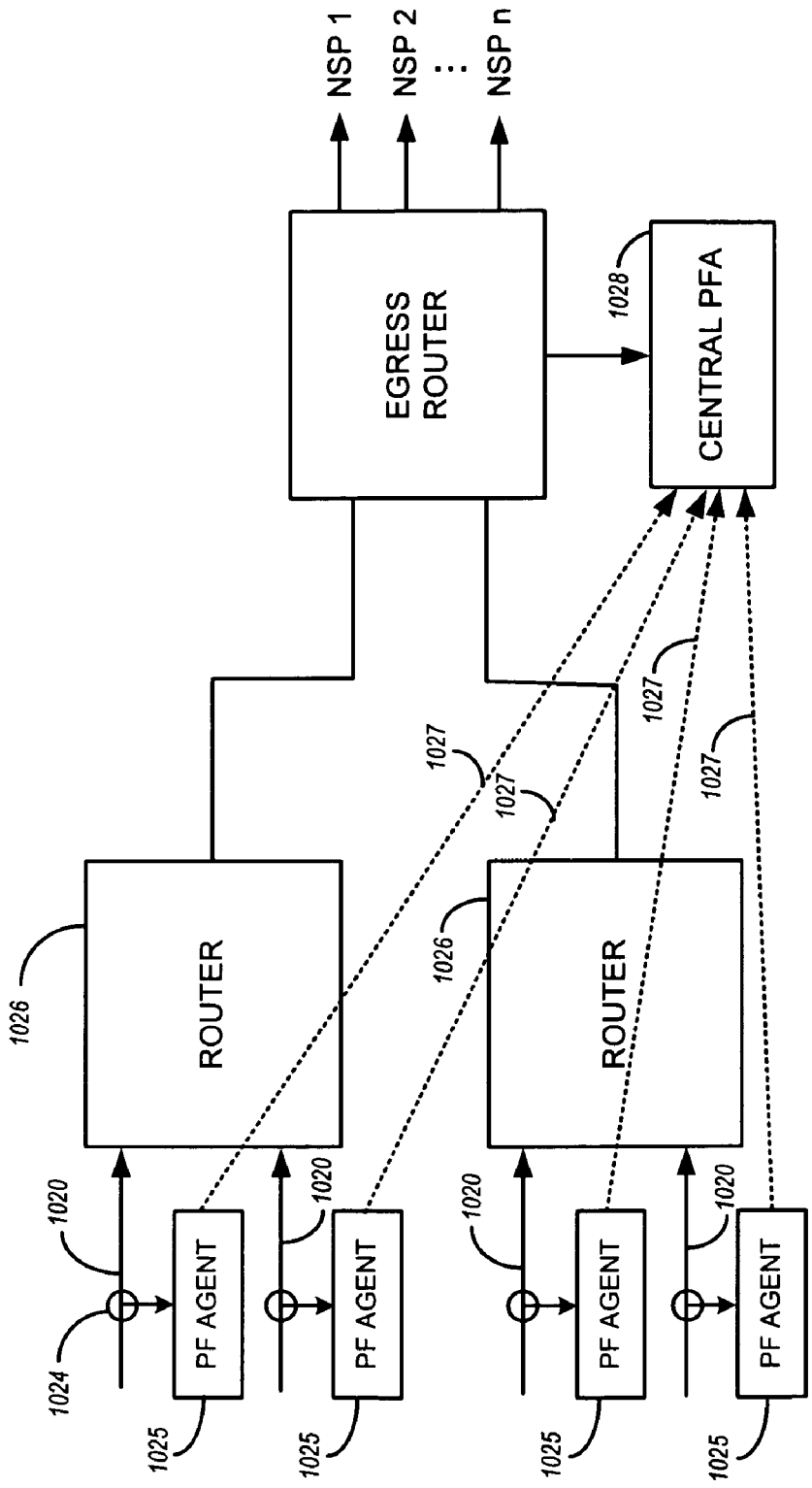
FIG. 10 is a network diagram of distributed passive flow elements according to yet another embodiment of the present invention.

FIG. 10 illustrates yet another embodiment of the present invention where passive flow analyzer 630 of FIG. 6 is distributed in nature. FIG. 10 shows traffic flow 1020 bi-directionally traveling via several local traffic source points. Distributed local passive flow agents 1025 are tapped passively at tap point 1024 into traffic flow 1020. Passive flow agents 1025 are distributed such that each agent monitors and conveys individual flow characteristics. The traffic sources are distributed across a layer 3 infrastructure, for example, and are separated by one or more routers 1026. This arrangement prevents the passive flow analyzer 930 of FIG. 9 from collecting information across the same layer 2 switch fabric as in FIG. 9. Each of the passive flow agents 1025 performs local flow reconstruction and then exports flow data records 1027 over the network to a central passive flow analyzer 1028, performs flow aggregation and service level analysis across all of the distributed passive flow agents 1025.

Figure 11:
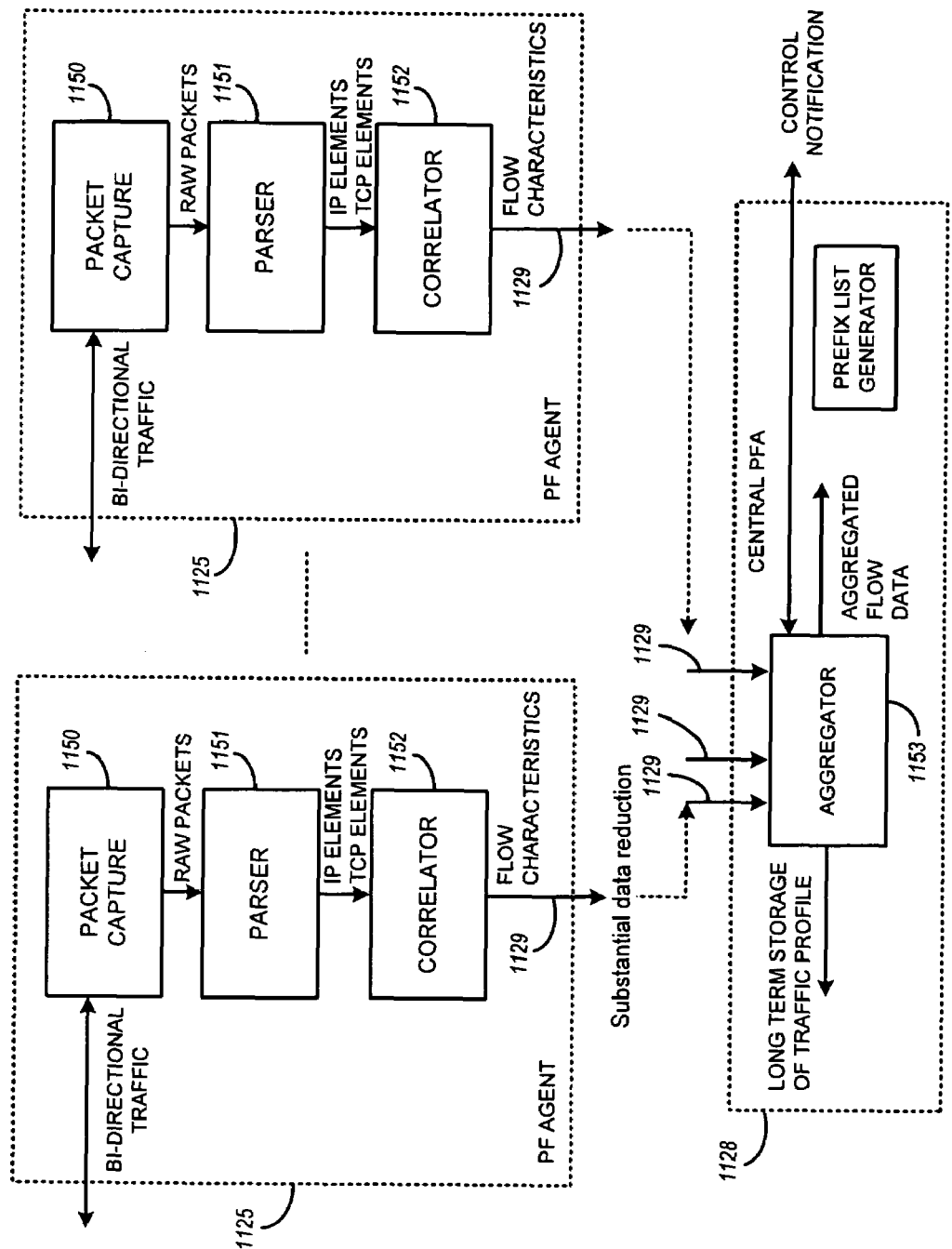
FIG. 11 is a functional block diagram of the distributed passive flow elements of FIG. 10 according to still yet another embodiment of the present invention.

FIG. 11 illustrates a more detailed functional block diagram depicting multiple passive flow agents 1125 separately distributed and a single central passive flow analyzer 1128. Each passive flow agent 1125 includes packet capture 1150, parser 1151 and correlator 1152 functions on each of the local traffic flows. Correlator 1152 exports flow records 1129 with substantial data reduction to central passive flow analyzer 1128. Substantial data reduction is used to reduce the amount of information forwarded to the central passive flow analyzer and can be effectuated by using well-known encoding techniques. Central passive flow analyzer 1128 accepts flow export records 1129 from each passive flow agent 1125, and central aggregator 1153 performs prefix aggregation on each of the exported flows. Thus, the centrally aggregated flow information can be used to determine if a particular policy violation is occurring.

Figure 12:
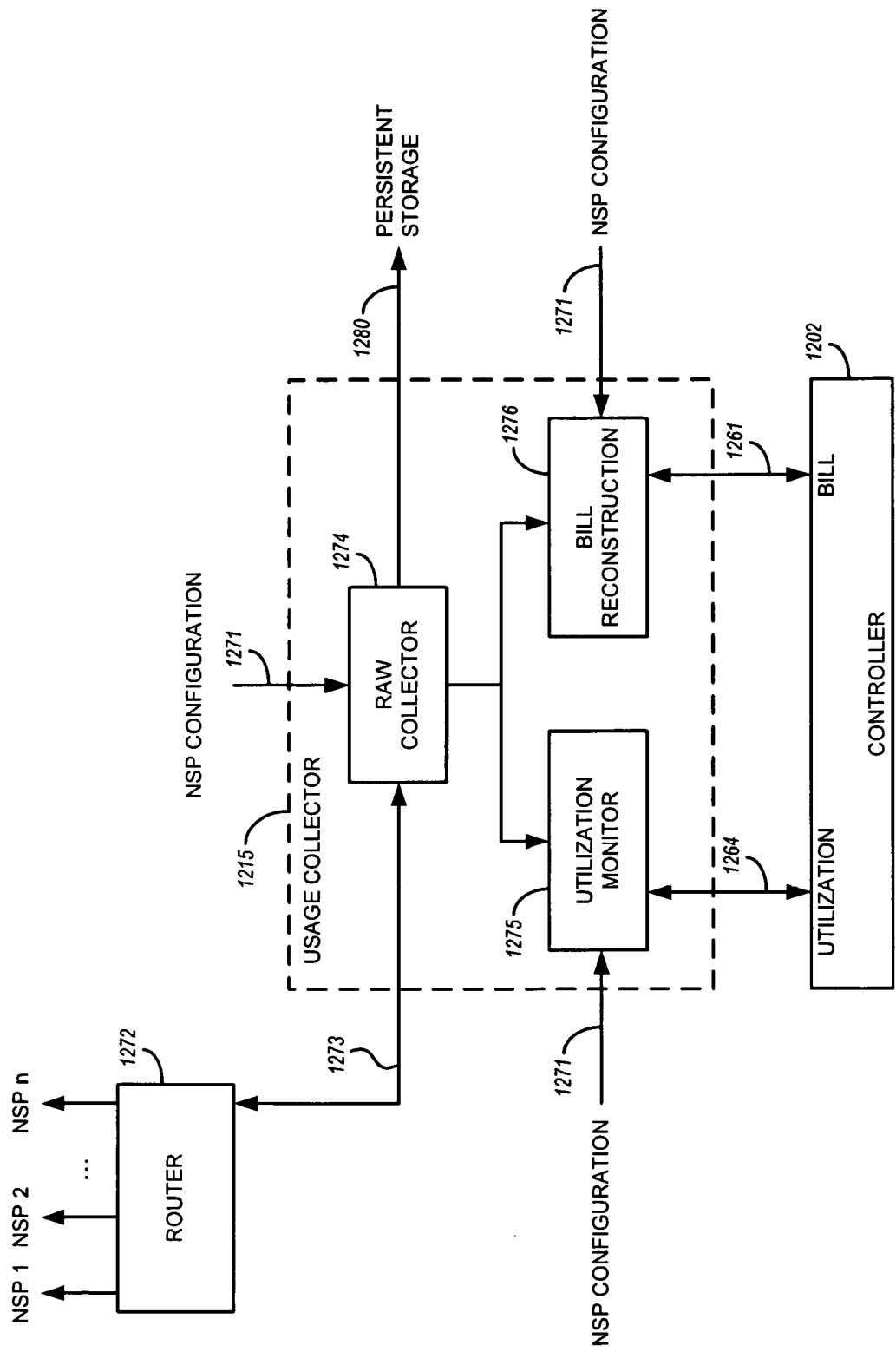
FIG. 12 is a detailed block diagram of an exemplary usage collector according to a specific embodiment of the present invention.

FIG. 12 illustrates a detailed block diagram of usage collector 214 of FIG. 2. Usage collector 1215 operates to collect usage information 1273 from network providers, such as byte counters (i.e., the amount of traffic transmitted to and received from network service providers). Usage collector 1215 uses this information to calculate network service provider utilization, load, etc., of data paths associated with the provider.

Usage collector 1215 also operates to reconstruct provider billing records. Usage collector 1215 accepts provider configuration information 1271 related to each NSP connection. This NSP configuration information 1271 details provider interfaces on the various routers 1272 (e.g., egress routers), provider next-hop IP addresses traceroute probes (to verify the current provider in use with trace probes), billing period start and end dates, circuit bandwidth for calculating the utilization and price per megabit/sec, minimum bandwidth commitment, burstable rates, provider sampling interval, provider billing algorithm, a utilization alarm threshold and the like.

In operation, exemplary raw collector 1274 sends a query 1290 (e.g., SNMP) to collect interface raw byte counters from routers 1272 on each of the provider circuits at a specified sampling interval. Provider circuits include paths, pipes (virtual or physical) T1 and the like. Raw collector 1274 places the raw byte counters 1280 into persistent storage for later reporting and analysis. Raw collector 1274 sends the raw information to two other components: utilization monitor 1275 and bill reconstructor 1276.

Utilization monitor 1275 calculates the ingress and egress circuit utilization for each provider using the raw byte counts and the NSP configuration information 1271. In one example, NSP configuration information 1271 includes the bandwidth of the provider's circuits. Utilization information 264 includes data representing utilization trends for use with short range forecasting models (e.g., ARIMA, exponential smoothing, etc.) such that utilization monitor 1275 can determine whether bandwidth is trending up or down (i.e., increasing or decreasing in size) for a given service provider.

Figure 15:
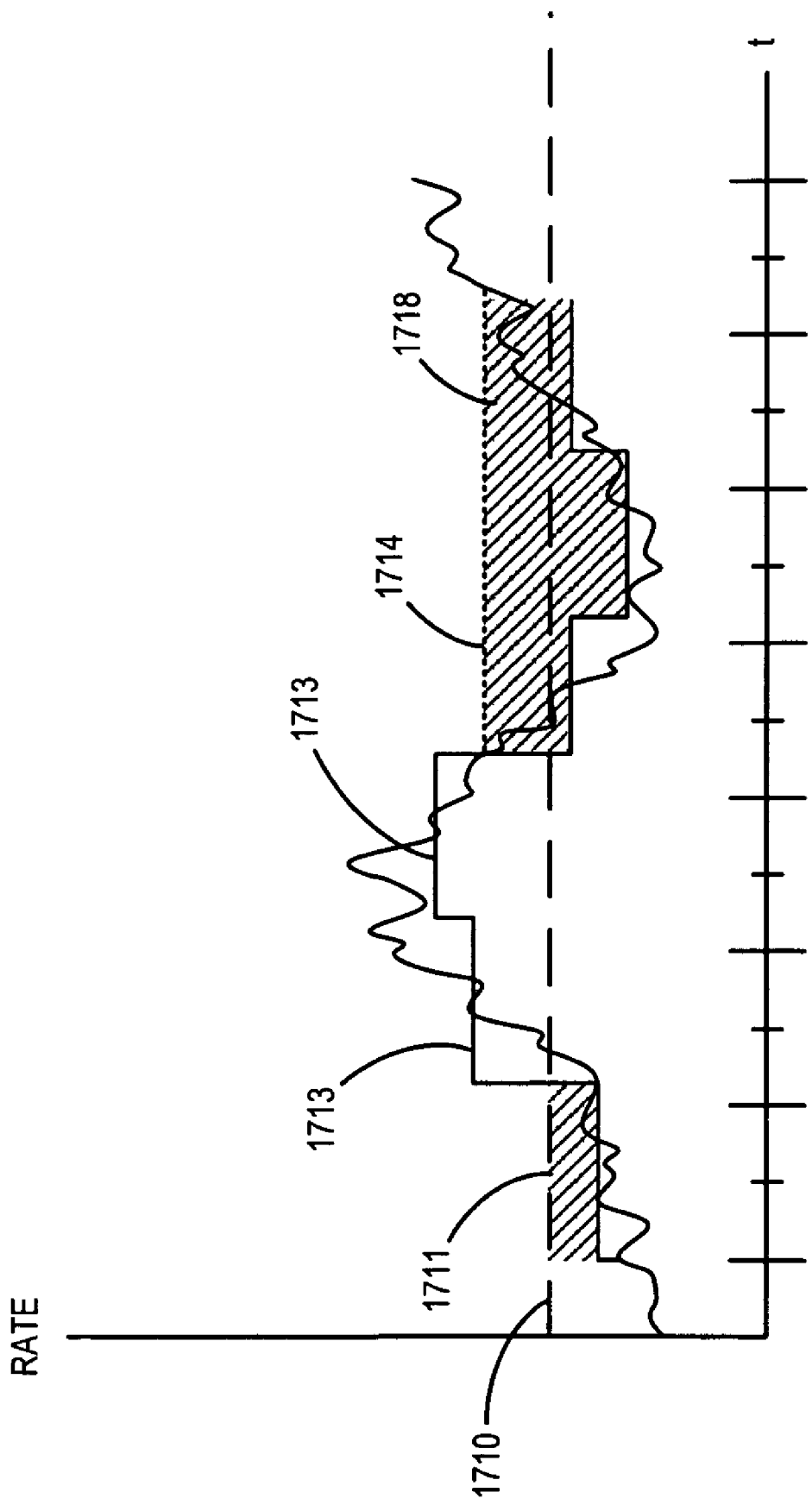
FIG. 15 is a graphical representation illustrating an exemplary method to calculate billable rates in accordance with embodiments of the present invention.

Bill reconstructor 1276 uses the billing information from NSP configuration data 1271 to reconstruct the current provider billable rate for the current billing period. Billing information includes information explaining the methods that specific providers use to calculate costs, such as a billing rate. Such methods of calculating bills for using a network provider are well known in the art Bill reconstructor 1276 applies similar provider billing methods to the raw byte counters from raw collector 1274 to generate the bill and related billing rates, etc. The generated bills, which are mapped into dollar amounts, are typically estimates since the sample times between the provider and usage collector 1215 will not match exactly. Bill reconstructor 1276 will send billing information 1261 to controller 1202 for use in peak avoidance and least cost routing. Peak avoidance is defined as a method of avoiding using a path or path segment at a higher a billing rate, such as shown in FIG. 15. Least cost routing refers to a method of using or defaulting traffic to the least expensive provider.

Additionally the information can be sent to controller 1202 for use in the least cost fix method of selecting the cheapest if performance is of no consequence. That is, controller 1202 uses data from billing message 1261, including billing rates, to determine an alternate route based in part on a route's free bandwidth (i.e., route does not incur additional cost to use), in accordance with the flow policy.

Referring back to FIG. 2, configuration element 211 is coupled to controller 205 and data director 220. Controller 205 provides the best route to reach a destination prefix to configuration element 211. Configuration element 211 operates to change the default routing behavior (i.e., current path) for the destination requiring corrective action. Configuration element 211 changes the routing behavior by, for example, sending a modified routing table of addresses to data director 220.

Once data director 220 receives this information, direct or 220 informs controller 205 that route change has been implemented. Thereafter, controller 205 communicates signal 230 back to passive calibrator 202 to clear its state and to resume monitoring the destination. The destination is monitored to ensure that the updated route of the routing table, or path, meets minimum service levels (e.g., no violations of SLA, or no unacceptable deviations from agreed upon performance metrics as defined by the associated flow policy).

In one aspect, configuration element 211 resides in a route server. In another aspect, configuration element 211 resides in a router and is configured to modify a route map or table. In yet another aspects configuration element 211 is adapted to provide configuration information, or a routing table. In still yet another aspect, the route information is stored within the configuration element 211 according to whether it is related to inbound or outbound traffic.

Figure 13:
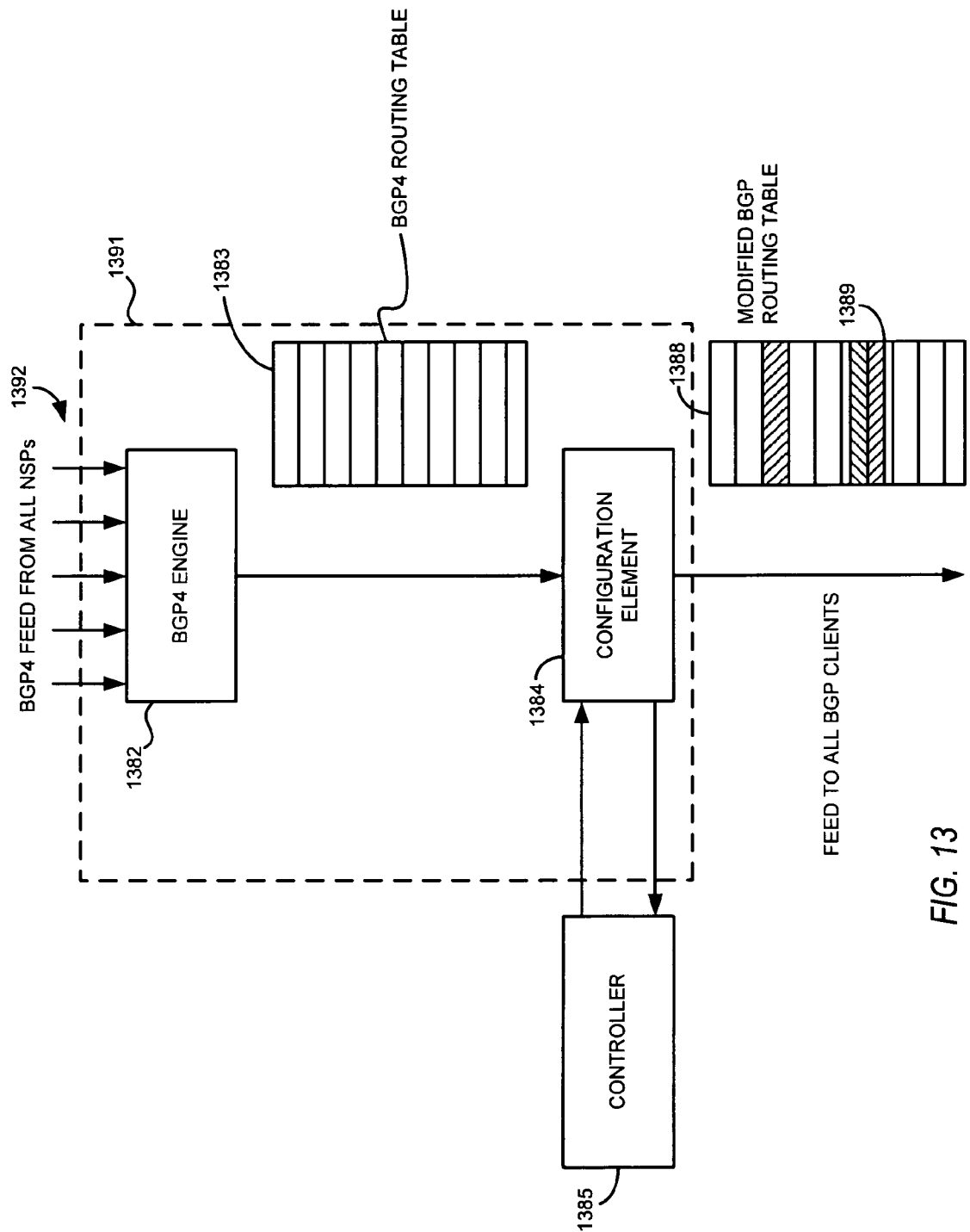
FIG. 13 is a block diagram of a route server using an associated configuration element receiving either multiple BGP4 feeds or at least one iBGP feed according to one embodiment of the present invention.

FIG. 13 shows an example of yet another embodiment of the present invention, where configuration element 211 of FIG. 2 resides in a network element, such as route server 1391. Configuration element 1384 of FIG. 13 operates similarly to other adaptations of configuration elements described herein. That is, configuration element 1384 modulates the current or default routes of data traffic and thus modifies the default routing behavior, for example, in a local deployment (e.g., Point of Presence, or POP). Route server 1391 (RS) receives a full set or sub-set of routing tables from the data networks of interest.

In one embodiment, the routing tables are received into route server 1391 by way of one or more default BGP4 feeds 1392 into BGP4 Engine 1382 from a full set or sub-set of the local transit providers. BGP4 Engine 1382 integrates, or merges, all of the routes into a single BGP4 routing table 1383 of the best available routes. In another embodiment, route server 1391 maintains an iBGP session with all of the internal BGP capable routers rather than maintaining the BGP4 sessions, as shown in FIG. 13. With a single iBGP session there is no need to configure all of the BGP sessions with the network service providers before making route changes.

Configuration element 1384 is designed to receive one or more BGP4 routing tables 1383 from BGP4 engine 1382 and is adapted to receive one or more control signals and data resulting from the control processes of controller 1305. In operation, configuration element 1384 receives, from controller 1305, the necessary routing changes to be implemented in default routing table 1388. Then, configuration element 1384 incorporates one or more changes in modified routing table 1389.

Thus, configuration element 1384 operates to modify BGP4 routing table 1383 and to generate one or more modified BGP4 routing tables 1388. Modified BGP4 routing table 1388 includes changed routing 1389, advertisements of more specific routes, etc. New modified BGP4 routing table 1388 is then fed to all BGP clients in the network, which then is used to guide traffic to the destination.

Controller 205 of FIG. 2 is designed to receive performance characteristics, such as latency, loss, jitter, etc., as monitored by the calibrator elements as well as usage characteristics, such as bandwidth, costs, etc., as monitored by the usage collector. Controller 205 is coupled to policy repository 218 to receive flow policies, which typically include service level agreement (SLA) performance metrics. These metrics, or requirements, are compared against the monitored performance and usage characteristics. If a particular policy is violated (i.e., one or more performance metrics are outside one or more expected ranges or values), controller 205 determines a sub-set of one or more alternate data paths that conform to the associated flow policy. In another example, controller 205 selects a best or optimized path as an alternate data path that best meets the performance requirements and usage requirements, as defined by the policy.

The active calibrator and the passive calibrator provide performance characteristics. Regarding the active calibrator, controller 205 initiates active calibration by request active probing. The active calibrator sends one or more calibration probes on probe path 207 out into the one or more data networks. The returning probes on probe path 207 provide information back to controller 205, which contains the identities of available paths and performance information related thereto.

Regarding the passive calibrator, controller 205 is designed to receive real- or near-real time network performance characteristics (i.e., loss, latency, jitter, etc.) from passive calibrator 230 as a monitor in traffic flows in which it has access. After controller 205 provides a routing change, or update, to configuration element 211, it also communicates a signal 230 to passive calibrator 203 when an updated route change is made to a specific destination. Signal 230 initiates the clearing of the state of passive calibrator 203 so that the calibrator resumes monitoring the specific destination to ensure that the updated route of the routing table, or path, is flow policy compliant. Clear state signal 338 of FIG. 3 depicts the signal that comes from the controller to initiate the resetting of the passive flow analyzer's state.

In one example, controller 205 operates to interpret the aggregated flow data over an interval of time for each of the groupings of destination prefixes. And if a policy violation occurs, controller 205 determines which of the alternate routes, or paths, are best suited for the prefix or traffic type associated with the current traffic flow. Controller 205 then sends the necessary routing changes to configuration element 211. That is, controller 205 resolve policy violations relating to non-compliant network performance characteristics, in accordance with the associated flow policy. This process is repeated until the policy violation is resolved.

In another example, controller 1202 of FIG. 12 is designed to receive real- or near-real-time data representing network usage characteristics from usage collector 1215, such as usage rate, billing rates, etc. Controller 1202 uses this information to resolve policy violations relating to non-compliant usages characteristics, in accordance with the associated flow policy. That is, prior to or during a route change, controller 1202 not only considers the performance of alternate paths, but also whether those alternate paths either avoid peak data traffic over a specific provider's path (i.e., adequate bandwidth related to turn-of-day) or are the least cost paths in view of the flow policies.

To resolve usage-type policy violations, controller 1202 is configured to receive routing tables, for example, to determine which of the current traffic flows or routing of data on certain paths, or path segments thereof, are congested (i.e., loaded) with respect to a particular provider path or paths. Controller 1202 also is designed to receive data representing flow volumes for each of the alternate provider paths to determine which sub-set of flows of a set of traffic flows to or from a given destination prefix are in compliance with the associated flow policy in terms of traffic flow volume.

An exemplary controller of the present thus is designed to obtain information related to the performance and usage of data networks and effectuate corrective action to effectively and efficiently route data over paths or segments of paths that meet at least associated policy requirements.

The following discussion relates to flow policies and the application of such policies in resolving policy violations and in enforcing the policy requirements or metrics. Referring back to FIG. 2, controller 205 is coupled to policy repository 218 for receiving one or more policies. As described above, a policy is a set of rules or threshold values (i.e., maximums, minimums, and ranges of acceptable operations) that controller 205 uses to compare against the actual flow characteristics of a specific traffic flow. For example, a policy is the user-defined mechanism that is employed by controller 205 to detect specific traffic flows that are to be monitored and acted upon if necessary. As an example, a policy can also specify how the particular policy should be enforced (i.e., it includes a hierarchical structure to resolve violations from highest to lowest precedence). Although an exemplary policy includes requirements, or rules, related to detection, performance, cost, and precedence, one having ordinary skill the art should appreciate that less, or additional parameters, can be measured and enforced according the present invention.

Detection is defined as the techniques or mechanisms by which flow control system 200 determines which traffic should be acted upon in response to a policy violation. The traffic flow can be identified, by name, by source or destination addresses, by source or destination ports, or any other known identification techniques. For example, a policy can be associated with only one prefix. That is, system 200 will monitor the traffic flow to and from a specific prefix, and if necessary, will enforce the associated flow policy in accordance with its requirements. Further regarding detection, a policy defined for more specific prefixes can take precedence over more general prefixes. For example, a policy defined for a /24 will take precedence over a /16 even if the /16 contains the specific /24.

Performance is a policy requirement that describes one or more target performance levels (i.e., network/QoS policy parameters) or thresholds applied to a given prefix or prefix list. Although more than one performance-based policy requirement may be defined, in this example only a single policy is applied to a given prefix or prefix list. Exemplary performance requirements include loss, latency and jitter.

Moreover, such requirements can be configured either as, for example, an absolute, fixed value or as an exponentially weighted moving average (EWMA). An absolute value establishes a numerical threshold, expressed as a percentage or in time units over a configurable time window. The EWMA method establishes a moving threshold based on historic sampling that places an exponential weighting on the most recent samples, thereby asserting a threshold that can take into account current network conditions as they relate to historic conditions.

Additionally, process control and statistical quality control techniques can be used to determine when the underlying network performance has changed. These techniques, used effectively in manufacturing, can determine what the upper control limit should be for a given destination at any time, and then notify the system when the 'quality' of the network performance has changed or falls outside these control limits. For example, several absolute thresholds can be used to effectively and imply overcome the non-linearity of the system. Network performance generally falls into one of several operating floors defined by the proximity of the destination (e.g., metro, regional, continental, inter-continental). These operating floors can be defined by the running mean RTT. Each operating region has its own upper control limit or threshold. When the mean RTT falls above the UCL (upper control limit) for several data points, a violation is triggered.

Cost is expressed in the policy definition in terms of precedence and whether the policy is predictive or reactive. Costs are characterized by usage collector 214 of FIG. 2 through bill reconstruction and reconciliation of bandwidth utilization in both aggregate and very granular levels (e.g., by /24 destination network). Cost predictive requirements are used to proactively divert traffic from one provider to another in order to avoid establishing a peak (i.e., "peak avoidance") that may trigger a new or higher billable rate. Cost reactive requirements are used to reactively divert traffic from one provider to another when a minimum commit rate or current billable rate is exceeded.

Typically, both cost predictive and reactive requirements result in a binary decision (i.e., a circuit or path, for example, is either in compliance with or in violation of a flow policy). In the case of predictive cost, the transit circuit is either in compliance, or soon to be violation of a flow policy. Regardless, an action must be taken to resolve the situation, unless cost is preceded by performance (i.e., performance requirements are to be addressed prior to making a cost-based change).

Precedence is a policy requirement that describes one or more target usage or utilization characteristics or levels. Precedence includes provider preference and maximum utilization (i.e., load) requirements. The provider preference requirement is, for example, an arbitrary ranking of providers that is used when an action must be taken, but when two or more transits may be selected in order to enforce the policy. The flow control system can automatically set the provider or path preference requirement if it is not configured explicitly by the system's operator. This requirement is then applied as a tiebreaker in deadlocked situations such that the provider with the highest preference wins the tie and thus receives the diverted traffic flow.

The maximum usage requirement can be used as either may also be used as an actual operational threshold not to be exceeded or as a tiebreaker. Maximum usage is configured, for example, in the transit provider section of the configuration and takes either a percentage argument (i.e., in terms of available bandwidth), or alternatively, can be set as an absolute value in terms of Mb/s (i.e., not to exceed available bandwidth).

The following is an example of a policy used with a controller to determine whether the specific policy is in compliance, and if not, to determine the course of action.

For example, consider the following policy is used for a particular traffic flow:

| Policy Requirement | Precedence | Value or Threshold |
|---|---|---|
| Loss | 10 | 2% |
| Latency | 20 | EWMA |
| Cost | 30 | Predictive |
| Maximum usage | 40 | |
| Provider Preference | 50 | |

Suppose that traffic flow associated with prefix 24.0.34.0/24 is currently carrying traffic at 240 kbits/sec, and is reached via provider 1 of 3. Provider 1 is currently carrying 2 Mbits/sec and has a minimum commit of 5 Mbits/sec.

The controller of the flow control system using the policy can monitor the alternate traffic routes, or paths, and can determine the following flow characteristics as they relate to the providers:

| Requirement | Value for ISP1 | Value for ISP2 | Value for ISP3 |
|---|---|---|---|
| Loss | 5% (violation) | Not available | Not available |
| Latency | 140 ms | Not available | Not available |
| Cost | In compliance | In violation | In violation |
| Max Usage/ as Measured | 5 Mb/s<br>2 Mb/s (compliance) | 5 Mb/s<br>4 Mb/s (compliance) | 5 Mb/s<br>5.5 Mb/s (violation) |
| Latency | 100 ms | 100 ms | 100 ms |

In this case, ISP1 is in a violation state since loss of 5% exceeds the maximum loss requirement of 2% and since loss has been designated with the precedence of 10, with 50 being the lowest. Corrective action must be taken. The policy will be enforced without latency or loss information (i.e., because there is, for example, no visibility into the performance of the other links). In this case, the controller may initiate active probing using the active calibrator to determine whether the other ISPs (including ISP2 and ISP3) are in compliance. Alternatively, the controller might determine the course of action based on the next parameter in the policy where the requirement is known (e.g., cost in this case). Since ISP 2 is in compliance and ISP 3 is not, ISP 2 would be chosen by the controller. If the two were both in compliance, the controller would go to the next ranked requirement, which is MaxUtil. If this is the case, ISP2 is still selected.

In summary, the policy, such as the above exemplary policy, is input into the controller 205 of FIG. 2 and is associated with, for example, a specific prefix. The general detection method (absolute or baseline/historical) can be specified as per prefix, thus specifying hard or absolute thresholds for some destinations that are well known, while using a baseline method for other destinations. The policy also defines the resolution method (e.g. procedure) to be used in the combination with performance metrics that must be met before the violation is considered resolved. Other parameters such as cost and utilization thresholds can be set per prefix. This gives the controller an indication of which prefixes should never be moved for cost or utilization reasons and which prefixes should be moved under any circumstances, in one embodiment.

In order for controller 205 to handle peering connections, controller 205 communicates with the data director 220 to retrieve reachability information (i.e., routing tables) for the specific prefix that is about to be changed. In the case of transit circuits, controller 205 uses active calibrator 207 to determine reachability information (i.e., routing tables) for a given destination by, for example, sending active probes to the destination and then waiting for the response. Although peering connections are often unreachable, it is possible for active probes to succeed since some providers may not effectively filter traffic at a peering point and instead rely on an honor-like system to ensure that only traffic to those advertised destinations is received.

Therefore, in the case of peering, controller 205 must look in the routing table for an advertisement of that destination before moving traffic to a peering connection. Referring to FIG. 15, iBGP feed 1599 includes advertised inactive routes as well as active routes. Otherwise, data director 220 of FIG. 2 can be configured in accordance to route server 1591 of FIG. 13, where eBGP is available from all providers.

Figure 14:
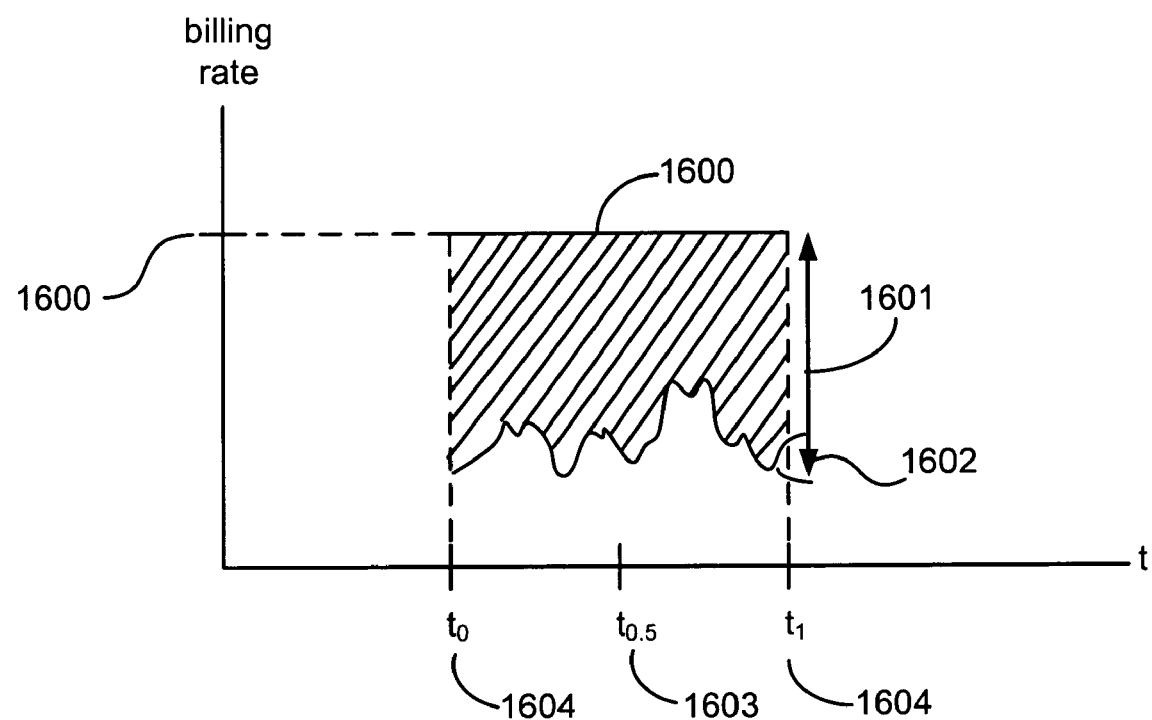
FIG. 14 is a graphical representation illustrating an exemplary method to determine the amount of bandwidth available that can be used without additional cost in accordance to the present invention.

FIG. 14 illustrates how the availability of "free" bandwidth is expressed for a given provider and is measured by usage collector 214 of FIG. 2. Over any given time period from t0 through t1, current usage rate 1602 and the current billable rate 1600 one determined. As shown, time point t0.5 1603 represents an over-sampled time point. Difference 1601 between these two values represents an amount of bandwidth available to be used without incurring any additional cost. The free bandwidth per provider can be used to select a sub-set of compliant providers when a performance-based policy is in violation by the current or default provider. Additionally, this information is used to apply cost- and load-based policies for each provider.

FIG. 15 depicts how usage collector 214 calculates the time-continuous billable rate as shown in FIG. 14. Most providers start out with a minimum commitment level 1710. If the current usage starts out below that commitment, the free bandwidth 1711 is shown. Samples are collected at twice the provider sampling rate to ensure that an accurate rate is being calculated (i.e., this is a conservative estimate and if the rate deviates from the provider rate, it will be higher and represent an overestimation of the billable rate). The small tick marks on the time axis represent the samples collected by the system (i.e., over-sampling). When enough samples are collected, the billable rate, which generally is expressed as the $95^{th}$ percentile of all rate samples, may exceed the minimum commitment as shown by successively higher tiers 1713 of the billable rate in FIG. 15. When the traffic drops back down below this rate, a new billable rate 1714 is set and the system again has free bandwidth 1718 available for use.

Figure 16:
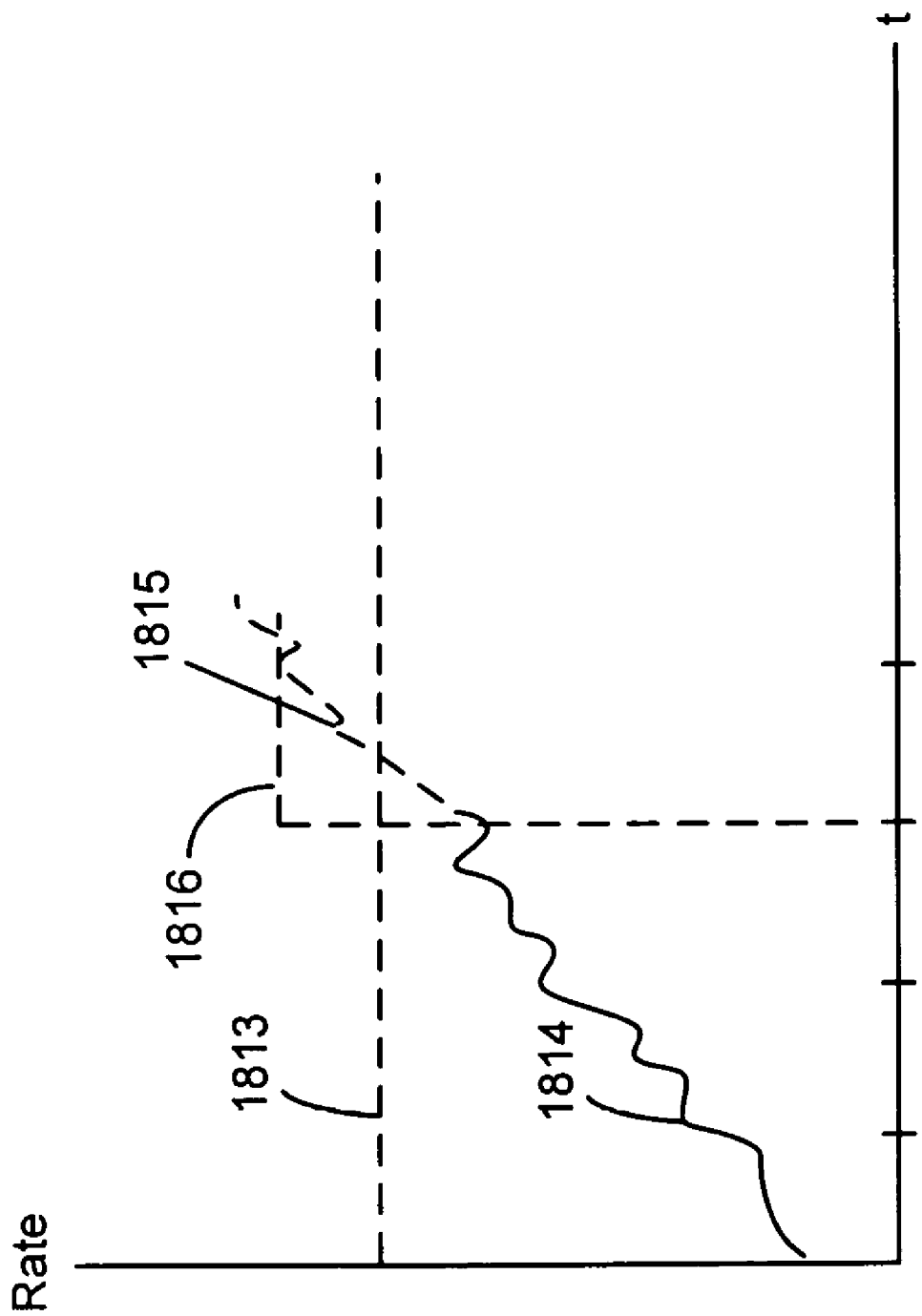
FIG. 16 is a graphical representation depicting an exemplary method of calculating billable rates using short range forecasting in accordance with the present invention.

FIG. 16 shows how an exemplary system 200 will detect a cost-based policy violation. Suppose the cost policy requirement is defined to be an absolute threshold, as shown by 1813. This threshold can be an absolute rate or a set dollar amount to spend (which is converted by the system to an average billable rate). On a sample-by-sample basis, the actual traffic rate 1814 should be such that a new billable rate above 1813 is never established. Using short range forecasting techniques, the traffic rate for the next few samples 1815 can be forecasted, and if this forecast predicts that a new billable rate 1816 will be established, controller 205 of FIG. 2 can react by moving traffic off of this provider.

Figure 18:
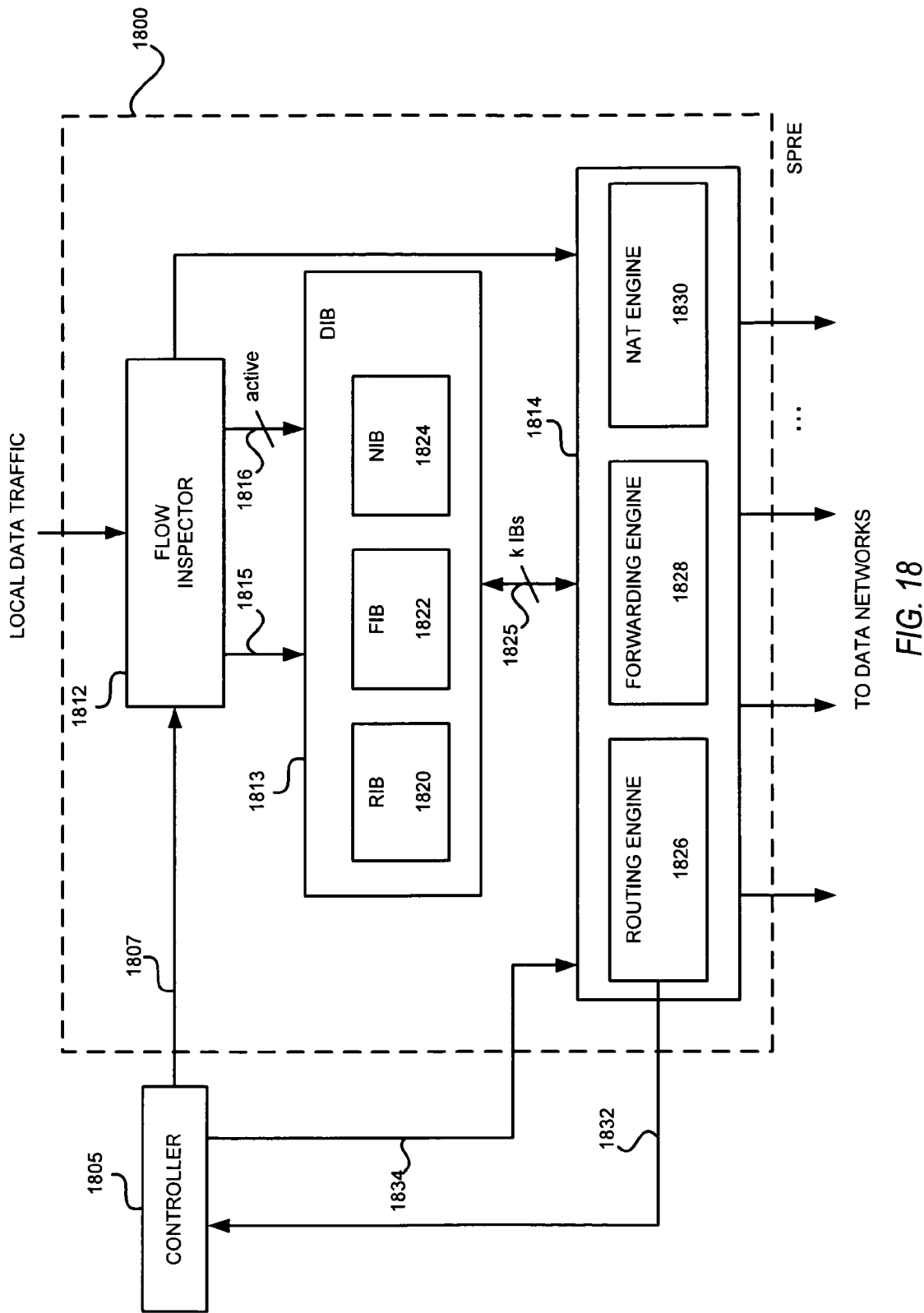
FIG. 18 is an exemplary configuration element according to a specific embodiment of the present invention.

FIG. 18 illustrates a Stateful Policy-based Routing Engine ("SPRE") according to an embodiment of the present invention. SPRE 1800 an example of configuration element 211 of FIG. 2 and is suitably substitutable, such in terms of functionality. SPRE 1800 operates to change the default routing behavior (i.e., current path) of the traffic flow associated with the destination, such as a remote destination address, which requires corrective action. An address can be specified by, for example, its 32-bit IP address, or by a prefix of destinations, such as /24. As a configuration element, exemplary SPRE 1800 is coupled to controller 1805 to receive at least one route that is used to reach a remote destination prefix, as determined by controller 1805. The at least one route is a route that either is a best-fitting route (i.e., a route optimized to best meet all performance and usage requirements) or is one of many routes meeting all traffic requirements of a flow policy.

SPRE 1800 includes flow inspector 1812 and a dynamic information base ("DIB") 1813, where flow inspector 1812 and DIB 1813 are adapted to communicate data with each other, uni- or bi-directionally. DIB 1813 includes one or more information bases (e.g., data tables), such as a routing information base ("RIB") 1820, a forwarding information base ("FIB") 1822, a network address translation information base ("NIB") 1824, or other suitable information bases or data structures used to maintain routes for active flows while implementing a route change. Such information bases are deployed in any storage device or memory known in the art, such as a DRAM, a floppy disk, or the like. Additionally, information bases use any data structure for associating data representing routes to network elements receiving traffic and data flows related to such routes, for example, and like routing or forwarding information used to effectuate routing changes.

DIB 1813 and its constituent information bases are designed to communicate uni- or bi-directionally with controller 1805 and data director 1814. Data director 1814 operates to forward the traffic flow (i.e., one or more data packets associated with a remote data address) originating from the local source address to a data network associated with a path or route that meets or exceeds a specific flow policy. Prior to making a route change, controller 1805 performs a look-up using data director 1814 by initiating a look-up with signal 1834. For example, the controller looks up the current route or path that the data director 1814 uses to route egress and/or ingress traffic. Such route information is typically stored in one or more routing tables and is communicated to controller 1805 as provider look up data 1832. A provider is a data network service provider and has an association stored in the routing table to route data by such associations.

As described herein, a path (or route) generally is an egress path from a first point, such a source address, to a second point, such as a destination address, or an ingress path from the second point to the first point. A path therefore is modified by rerouting the data via an egress portion of the path from the first point to the second point, or alternatively, by rerouting data via an ingress portion of the path to the second point from the first point. One having ordinary skill in the art should appreciate that a portion of a path includes one or more constituent segments of either an egress or an ingress path between the first and second points (i.e., a portion includes every segment of an egress or an ingress path). Also, although a local source address can be associated with a first point and a remote destination address can be associated with a second point, it should be understood that defining a first point as either a source or destination is a matter of convention.

Data director 1814 and its components are discrete network elements or devices and include routing engine 1826, forwarding engine 1826, NAT engine 1826, or the like. Each engine can be associated with at least one information base, and is adapted to forward one or more data flows out into the data networks of the providers and to receive traffic from a remote destination address, regardless of whether the data flows are on the same or different ingress path as the egress traffic, for example.

In operation, SPRE 1800 generally alters the data flow outbound from the local source network where it originates and/or inbound from the remote destination address into the local source network. Exemplary SPRE 1800 employs network address translation ("NAT"), virtual local area network (VLAN), and other suitable data forwarding and networking techniques, some of which is known in the art. Moreover, SPRE 1800 can use any routing protocol suitable for modifying the routing of local data traffic flow, for example, out from a local source network and into one or more network service providers.

NAT is generally used to associate a second set of addresses for public traffic with private traffic. More specifically, when a host on the "private" network sends a packet (e.g., IP packet) to a data network (e.g., the Internet) via a network device using NAT (i.e., NAT-enabled), the network device keeps track of the actual "private" address of that host, but substitutes an assigned "public" address into the packet before it is sent into the data network. When a reply comes back from the data network, the NAT-enabled device, such as a router, restores the actual address before sending the reply to the host. In some firewall applications, NAT is used to determine whether the inbound traffic from the data network should be permitted to enter the local source network.

According to a specific embodiment of the present invention, NAT is employed to modify or to translate the source address of the data traffic (i.e., of each packet) flowing out from a local source network. With a translated source address, the inbound or ingress path returning traffic back to the local source network is different that the egress path. Moreover, the current ingress path or a portion thereof, is changed to a next ingress path or a portion thereof, over time or after a route change. For example, the source address of an IP datagram is modified to return through a different NSP than the NSP associated with the outbound traffic. An NSP is referred to as a data network herein.

Figure 19:
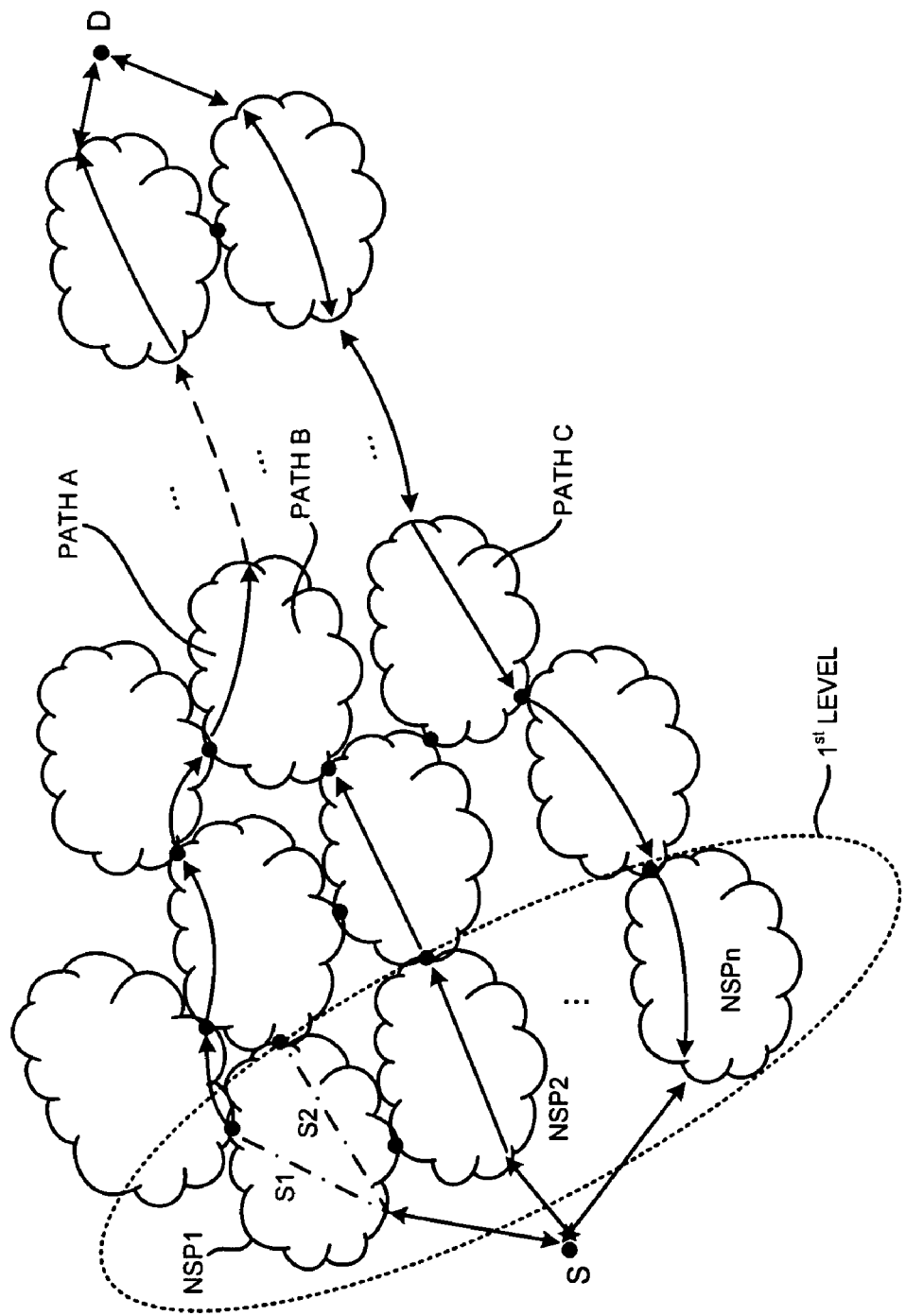
FIG. 19 shows a basic diagram of a plurality of data networks suitably adaptable for use in accordance with the present invention.

FIG. 19 shows three exemplary paths A, B, and C that illustrate possible paths that inbound and outbound traffic traverses from a local source address, S, or local network to a remote destination address D. As shown, the local source address is coupled to one or more first level NSPs (i.e., NSPs 1, 2, . . . n). These NSPs are referred as first level NSPs because they are coupled directly to the local source network containing a local source address (e.g., multi-homed configuration). Each of the first level NSPs, and other NSPs more removed for the local source network, include one or more segments, where a segment describes either a portion or a part of a path between interconnection points. Interconnection points are connections between data networks for exchanging information between data networks and network service providers.

FIG. 19 shows S1 and S2 as an example of but only two segments that is contained within an NSP or data network. Such segments are included within data networks beyond the first level of NSPs as well. One having ordinary skill in the art should appreciate that NAT is but only one way to influence the path associated with ingress data traffic back into the local source network (e.g., with a local source address) and that other suitable techniques are in accord with the present invention.

VLAN technology is typically used to associate physical network elements (e.g., routers, switches, etc.) or computing devices (e.g., a network of computers) with virtual equivalents through software rather than hardware. A corresponding tag identifies each unique network element, such as a border router coupled to a first level data network. A suitable tag associating a network element with a data flow is an IEEE 802.1q VLAN tag and is well known in the art. Such VLAN tags are used to route data traffic (e.g., packets) to at least one data network in a group of data networks. For example, a unique VLAN tag is used to forward data traffic from a source address, S, to either NSP1 or NSP2 to effectuate paths A or B, respectively, as shown in FIG. 19.

SPRE 1800 can use any suitable routing protocol, such as BGP4, to modifying the routing of local data traffic flow as described above. Although SPRE 1800 may function within an environment in which eBGP or iBGP is used, BGP is not necessary to practice the present invention. One having ordinary skill in the art should appreciate that BGP4 is but only one way to influence the path associated with egress data traffic from the local source network to a destination (e.g., remote destination address) and other suitable routing techniques are in accord with the present invention.

Exemplary SPRE 1800 can be implemented similarly as shown in FIG. 13 in which SPRE 1800 is designed to operate with BGP. That is, SPRE 1800 receives one or more default BGP4 feeds 1392 into an internal BGP4 Engine from a full set or sub-set of the local transit providers to integrate, or merge, all of the routes into a single BGP4 routing table having the best available routes. Exemplary SPRE 1800 also can maintain an iBGP session with all internal BGP capable routers rather than maintaining multiple BGP4 sessions. In operation, SPRE 1800 communicates one or more routing changes to a data director 220 of FIG. 2, or equivalent network device by using, for example, a routing protocol such as BGP.

Returning to FIG. 18, SPRE 1800 and its components and/or sub-processes is implemented in hardware, software, or a combination thereof. Each of the components of SPRE 1800 includes logic for performing its intended function and for communicating with other SPRE components. An exemplary SPRE 1800 is adapted to reside in a route server or other computing devices. Alternatively, SPRE 1800 is deployed in a router and configured to modify a route map or table in at least one of many engines in at least one data director or equivalent. Moreover, the one or more of its components and/or sub-processes associated with SPRE 1800 may be distributed over one or more servers, network elements, etc., regardless of whether such components and/or sub-processes are deployed within a local source network associated with a local source IP address. Other structural and functional configurations of SPRE 1800 and its components are within the scope and spirit of the present invention, if such structural and functional configurations are suitable to effectuate route control. Furthermore, SPRE 1800 includes other components and sub-processes known in the art of data routing and the control thereof. For example, SPRE 1800 can include packet switching hardware and/or software, an OSI layer protocol controller (i.e., for layer 2 or 3 routing control, or the like), and other components typically found in routers or other like network elements.

Exemplary SPRE 1800 includes flow inspector 1812. Flow inspector 1812 operates to determine and to indicate which of the traffic flows (i.e., local data flows) from the local source address is active or inactive. Such traffic flows generally flow out from local source network via one or more data networks to a remote destination address, especially if a multi-homed scheme is employed. Flow inspector 1812 also functions to provide a sub-set of all available flows, or alternatively, a super-set of specific individual flows (i.e., where each individual flow is denoted by a specific destination address) to one or more information bases in DIB 1813, the sub-set including one or more active flows. Moreover, flow inspector 1812 determines when a particular traffic flow is inactive, and upon doing so (or thereafter), communicates a request to withdraw inactive flows in the one or more information bases in DIB 1813. An inactive flow is withdrawn by, for example, deleting one or more inactive data flows associated with one or more remote destination addresses, thus freeing up storage locations in the information bases, among other benefits.

In one embodiment, flow inspector 1812 of SPRE 1800 determines whether a flow is active or inactive by performing stateful inspection of one or more constituent elements of an IP datagram, such as individual bits, fields, or the like (e.g., portions of an IP header). Exemplary flow inspector 1812 inspects the TCP portion of each packet in a flow associated with one or more remote destination addresses. SPRE 1800 typically initiates the process of stateful inspection upon receiving a route change request from controller 1805. Stateful inspection of data flows, such as local traffic flows, include examining one or more constituent elements of a data packet over time and comparing the state of each data packet of a data flow associated with a destination address, where the data flow is compared against one or more inspection rules. Thereafter, flow inspector 1812 is configured to initiate action in response to the result of such comparison. For example, flow inspector 1812 identifies each flow as either active or inactive according to the inspection rules tested against. Inspection rules, for example, include one or more criteria or requirements used to determine whether a flow is to be deemed active or inactive.

For example, flow inspector 1812 operates to select a specific protocol, such as TCP, and to examine TCP session-related characteristics of each packet. Such TCP characteristics include a source address, a destination address, a source port and a destination port as well as protocol, time stamps, and the like. One having ordinary skill should appreciate that such examination is performed according to other protocols, such as UDP, etc. In another exemplary flow inspector 1812, the well-known port numbers of the Internet (e.g., RP94) are used to examine (i.e., demultiplex or fragment) the packets to determine which protocol is being used based on TCP port numbers. This information can be used to determine which end of a TCP connection is the server in a TCP session. Exemplary flow inspector 1812 is designed to perform flow reconstruction, similar to flow reconstruction performed by the correlator of the above-described passive analyzer. Yet another exemplary flow inspector 1812 performs flow reconstruction with respect to layer 4.

Over time, flow inspector 1812 reconstructs the flows and stores the states (i.e., TCP characteristics) of each flow according to a key, such as a specific remote destination address or super-set thereof. The states are stored in a state database, such as a hash table, for creating an index for one or more records in a database. An exemplary hash table stores state data representing the states or values of TCP characteristics for each flow in an appropriate data structure. Such a data structure is used to associate the state data with a specific remote destination address or address super-set (i.e., key), which is designed for quick data retrieval. Hash table data structures are well known and one having ordinary skill should appreciate how to implement hash tables in accordance with the present invention.

Figure 20C:
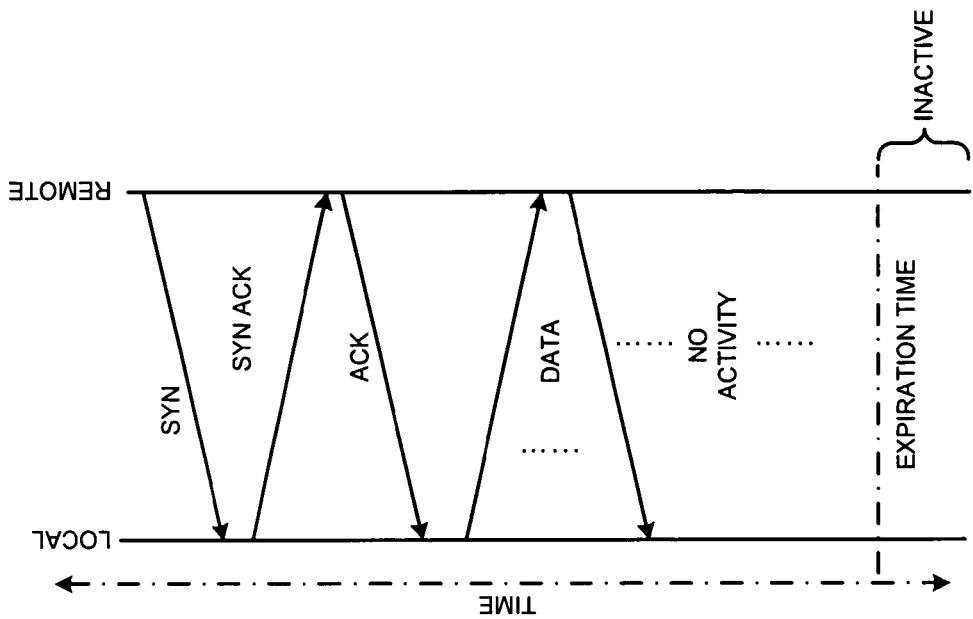
FIG. 20C is a generalized timing diagram illustrating a third exemplary technique to determine whether a flow is active according to a specific embodiment of the present invention.
Figure 20B:
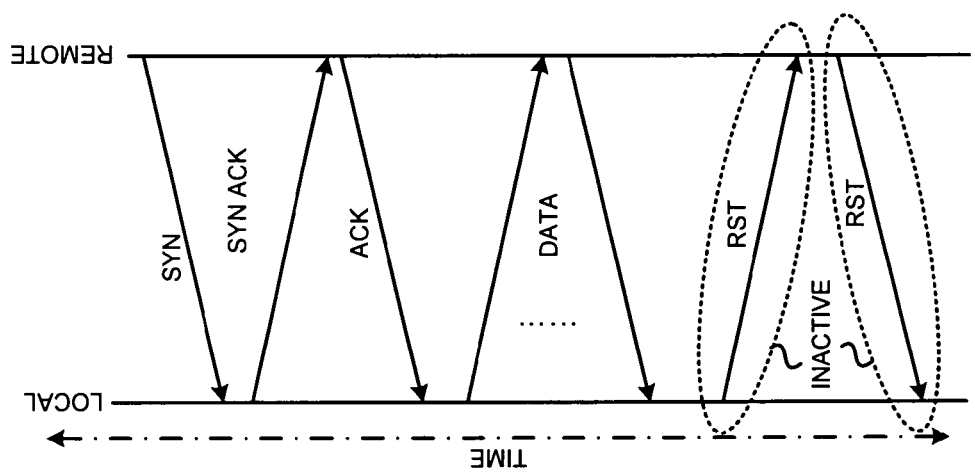
FIG. 20B is a generalized timing diagram illustrating a second exemplary technique to determine whether a flow is active according to a specific embodiment of the present invention.
Figure 20A:
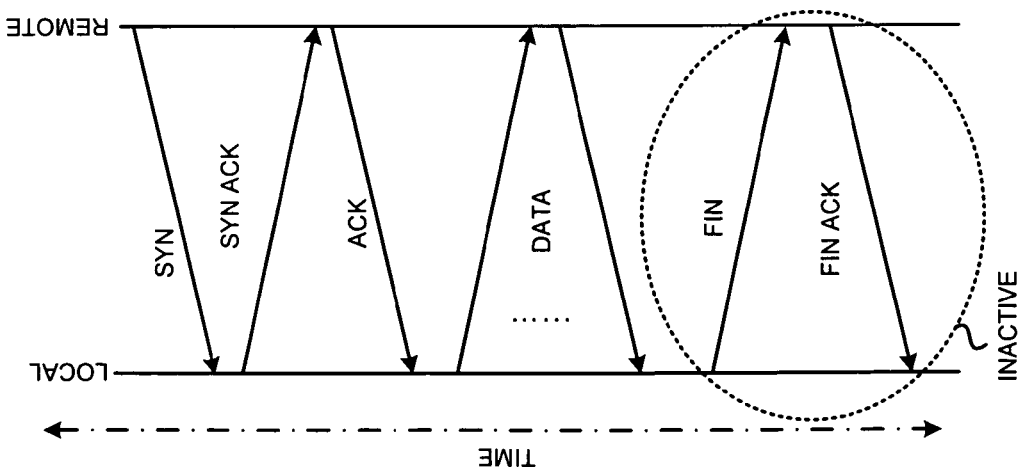
FIG. 20A is a generalized timing diagram illustrating a first exemplary technique to determine whether a flow is active according to a specific embodiment of the present invention.

FIGS. 20A, 20B and 20C depict the timing of exemplary TCP session-related characteristics used for comparison against the set of inspection rules. If an inspection rule is violated, for example, the particular flow is deemed inactive. An inactive flow is a flow where during a TCP connection both a session finish ("FIN") and an acknowledgment of the session finish ("FIN ACK") signal is received by a host at a local source address and a remote destination address, respectively, as shown in FIG. 20A. Moreover, a flow can be deemed inactive if a host at either a local address or a remote address receives a reset ("RST") signal, as illustrated in FIG. 20B. Furthermore, a flow can be determined to be inactive if a TCP session related to a remote destination address, for example, is inactive past an expiration time, as shown in FIG. 20C. Other protocol (e.g., TCP) characteristics and data packet constituent elements are compared against a set of inspection rules, and thus the above criteria are but a few of the many available flow characteristics that can be used to determine whether a flow is inactive in accordance with the present invention. For example, since synchronize ("SYN") and synchronize acknowledgement ("SYN ACK") signals generally indicate the creation of an active flow, such signals can be also used to define which of the flows are active or inactive.

Flow inspector 1812 is designed to provide DIB 1813 with a number of active flows 1816 that have been defined as active for one or more remote destination addresses. DIB 1813 and each of the information bases includes logic for communicating with flow inspector 1812 so as to receive, for example, requests to withdraw inactive flows 1815 associated with a particular information base in DIB 1813. Moreover, DIB 1813 and each of the information bases, in one embodiment, include logic for communicating with one or more engines of data director 1814. In another embodiment, some of the information bases include logic for communicating with one or more engines of data director 1814. In particular, each information base is designed to provide at least one default or current path 1825 for each packet (or data flow) associated with a specific remote destination address, typically in response to a request for a look-up 1825.

Data director 1814 and/or its constituent engines are adapted to receive one or more packets of a data flow and operate to compare the associated remote destination address of the packets to data representing an interface (e.g., physical or virtual), translated address, or other network device identifiers used to govern an ingress or egress path. Network device identifiers are associations used to govern the flows of data over varying egress and ingress paths. For example, a specific virtual router facility is associated with a VLAN tag as well as a variable stored in a data table, such as VLAN101 of FIG. 21.

Returning back to FIG. 18, data director 1814 and/or its constituent engines include additional logic to communicate with control 1805 as well as to either one or more data networks directly, or through an intermediary network element, such as a border router, a virtual router facility ("VRF"), or the equivalent. Data director 1814 includes, for example, routing engine 1826, forwarding engine 1828, NAT engine 1830, and the like, each of which are described more in detail below. In one embodiment, data director 1814 is a network element, such as a router, with one or more engines residing within and/or without the data director. In this instance, an exemplary engine is a process that performs each of its intended functions on network element hardware to either forward data to network specific element or to modify the local source address of a traffic flow.

Figure 21:
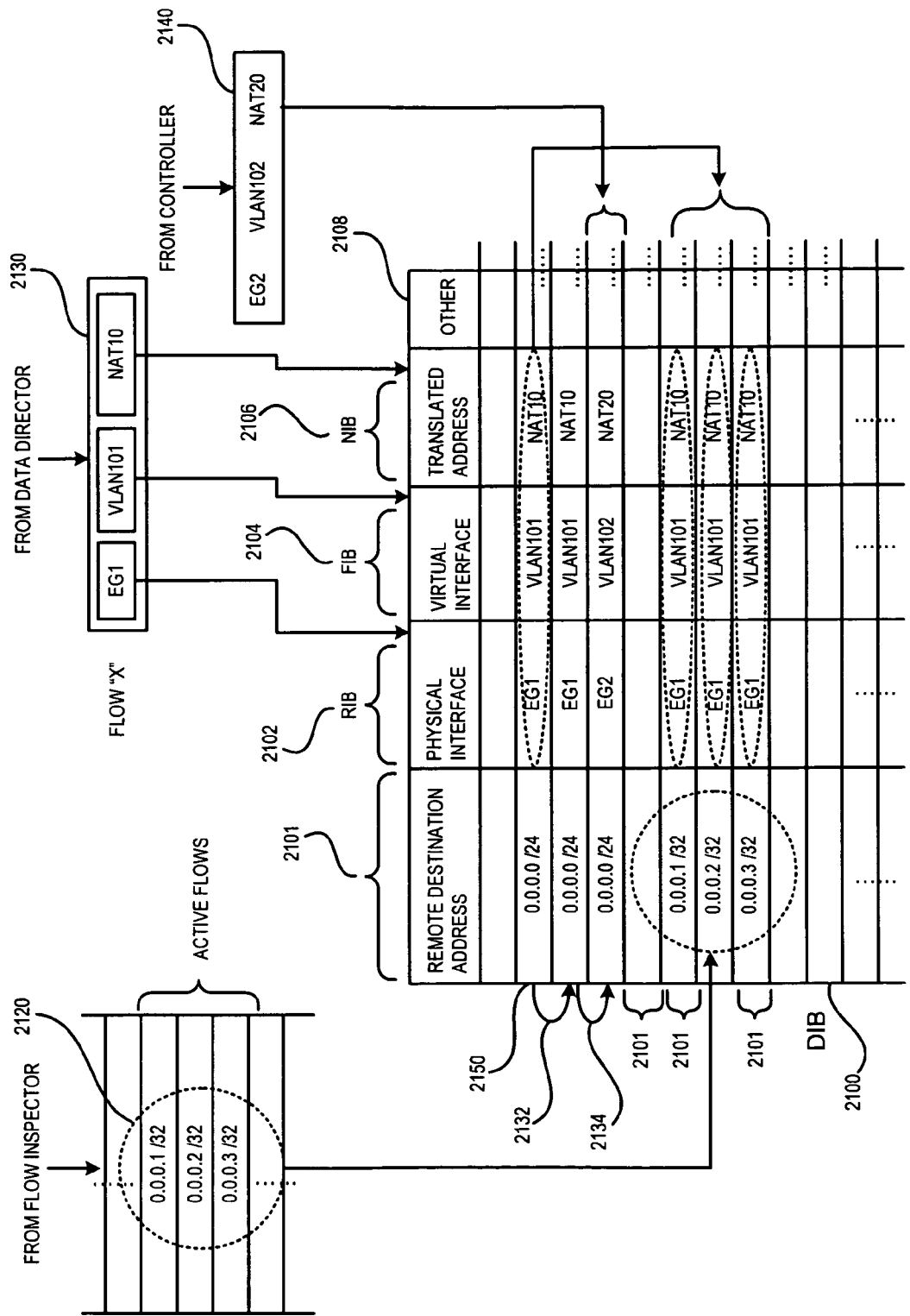
FIG. 21 illustrates a simplified information base in accordance with a specific embodiment of the present invention.

FIG. 21 illustrates but one exemplary data structures that are suitable for implementing a DIB 2100 and/or individual information bases (RIB 2102, FIB 2104, NIB 2106, and other suitable information bases 2108) in accordance to the present invention. In one example, DIB 2100 includes one or more records 2101 associated with a specific or a super-set of remote destination addresses. For example, a specific remote address is defined with its 32-bit address in the form of x.x.x.x/32, while a super-set of destination addresses can be designated by a prefix in the form of x.x.x.x/24. Prefix /24 is only an example and any degree of granularity (i.e., prefix of any size) is within the scope of the present invention.

One having ordinary skill should appreciate that DIB 2100 contains as many records and fields (e.g., RIB 2102, etc.) necessary to practice the present invention. In another example of DIB 2100, each of the information databases in DIB 2100 is separated into separate data structures or network devices such that an exemplary RIB includes remote destination addresses and physical interfaces without the FIB, NIB, and other information. Similarly, separate NIBs and FIBs can be constructed to exclude the other network device identifiers. In another exemplary DIB 2100, rather than the flow inspector being configured to include logic to perform comparisons of each flow against a set of inspection rules, DIB 2100 is adapted to include logic and a set of inspection rules for determining whether a flow is active, and how best to effect a route change by modifying one or more information bases without disrupting the associated traffic flows.

Figure 22:
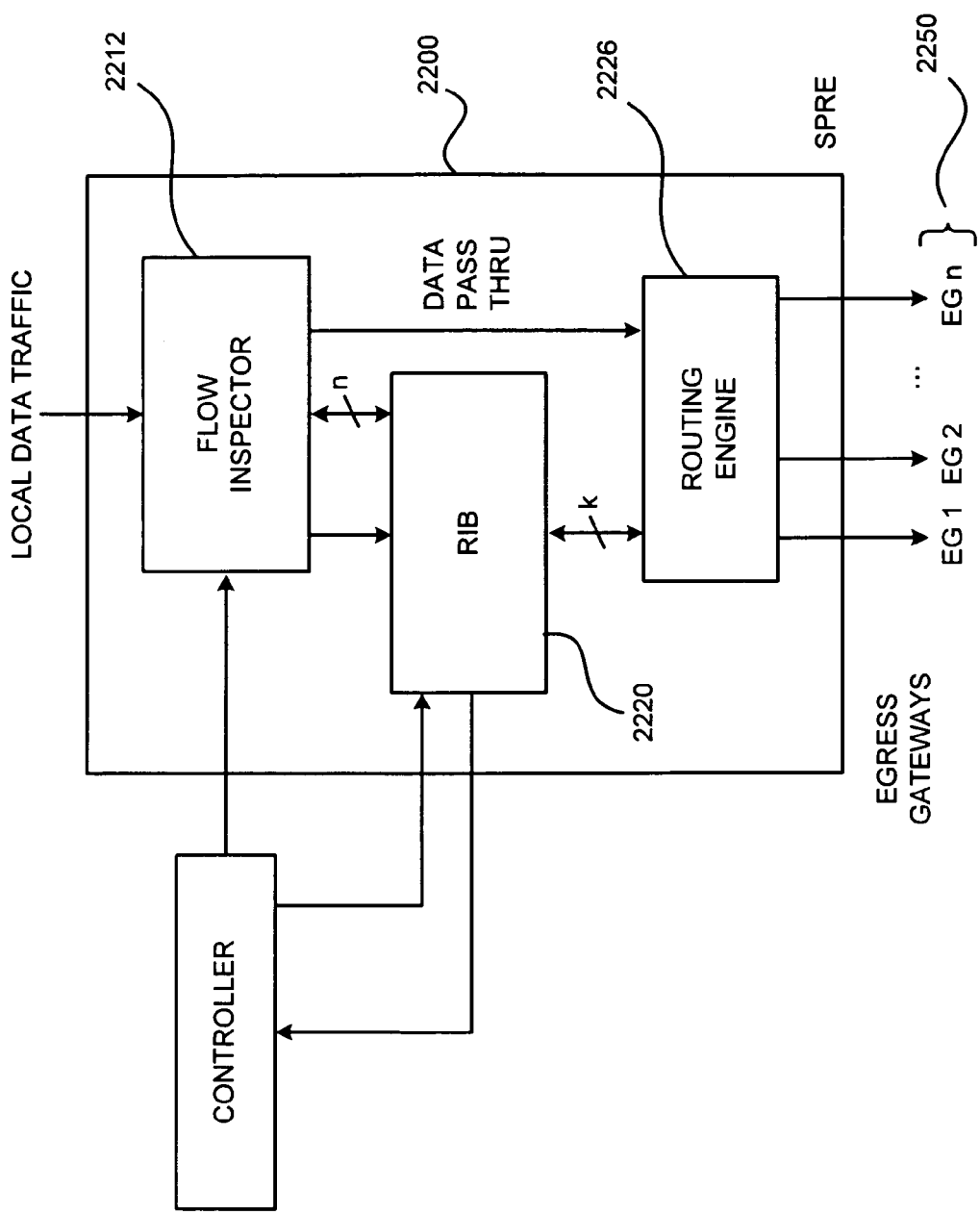
FIG. 22 depicts an exemplary configuration element employing a routing information base in accordance with a specific embodiment of the present invention.
Figure 23:
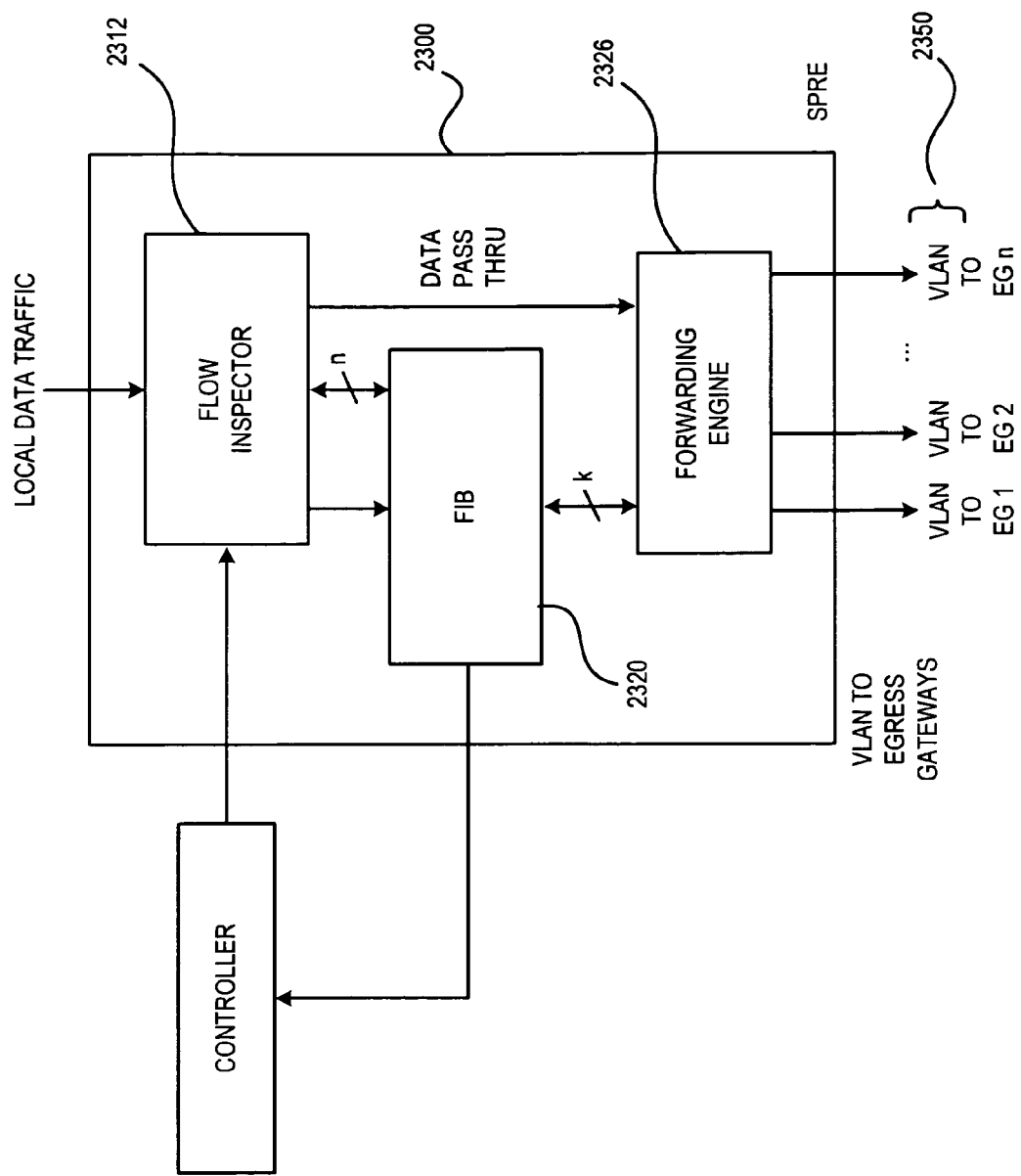
FIG. 23 depicts an exemplary configuration element employing a forwarding information base in accordance with another specific embodiment of the present invention.
Figure 24:
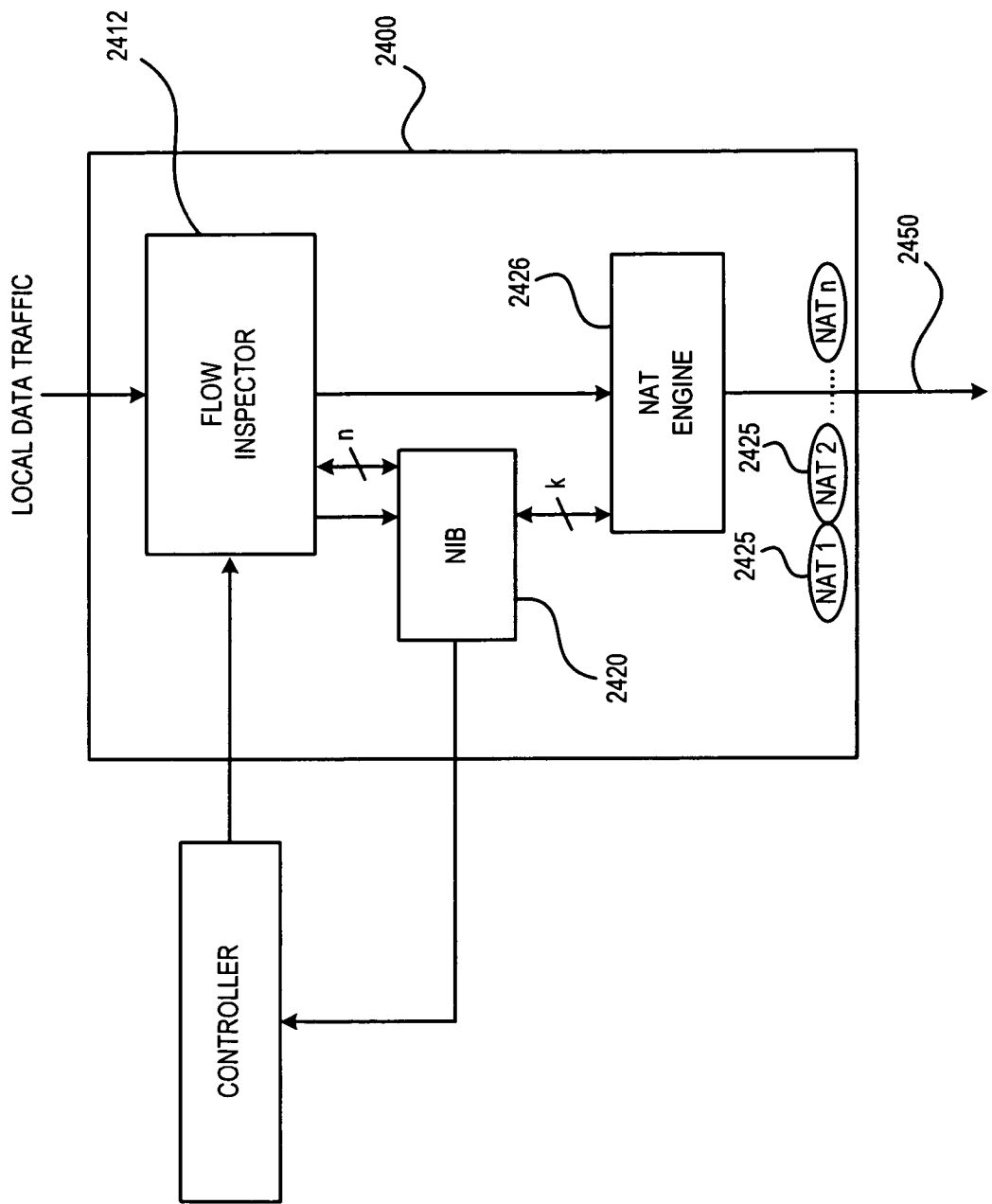
FIG. 24 depicts an exemplary configuration element employing a network addressing information base in accordance with yet another specific embodiment of the present invention.

In another example of SPRE 1800, each separate RIB, NIB, FIB, etc. is designed to provide specific network-identifier information (such as a physical interface, a virtual interface, etc., as identified by EG#, VLANxxx, NATxxx, etc.) to a specific engine residing within or without a network element. That is, routing engine 1826, forwarding engine 1828, and NAT engine 1830 is configured to communicate exclusively with RIB 1820, FIB 1822 and NIB 1824, respectively, such as depicted in FIGS. 22-24 in relation to other specific embodiments of SPRE 1800. In yet another example of SPRE 1800, a table resides in the information base for each corresponding network element that is used to forward traffic out or into a local source network. For example, for each border router there is an associated RIB in the information base. So, if there are four border routers coupled to a SPRE, for example, then there is four RIB tables within the RIB (i.e., in an one-to-one relationship). However, multiple RIB tables are not necessary to practice the present invention.

Referring back to FIG. 21, an exemplary SPRE operates to effectuate a route change using one or more information bases (collectively shown as DIB 2100), according to one specific embodiment. Prior to receiving a route change request from a controller, for example, a flow inspector determines that flows 2120 are active. Also, a data director 2130, or one or more engines, provides at least one network specific element in which the active flows are associated. Such an association effectuates modification of an ingress path and/or egress path for at least one traffic flow.

For example, flow X of FIG. 21 is actively flowing from a local source address, through a local source network, and out into a data network bound for a remote destination address. The point at which the flow enters a first level NSP, for example, is determined by either an association (i.e., assigned) relating to a physical interface of a network element, such as a router, an assigned physical interface of a VRF, or any other interface used to forward egress traffic to its destination address. Likewise, the point at which the flow enters a local source network from one or more first level NSPs, for example, is determined by the translated address of the traffic sent to the remote destination.

Prior to a route change, for instance, flow X is actively flowing out through a physical network element identified as EG1. The data director or routing engine then provides this information to the controller or the RIB 2102. If flow X, however, is actively flowing out through a virtual network element identified as VLAN101, then data director or forwarding engine provides this information to the controller or the FIB 2104. Furthermore, if flow X is actively flowing into a local source network through a physical, a virtual network element or the like, the address of such an element is identified as NAT 10. This translated address then is provided to either the controller or NIB 2106.

Upon receiving a route change request from a controller, a particular information base or DIB 2100 requests a look-up of the current or default routing related to a super-set of remote destination addresses affected by the route change, which in this example is 0.0.0.0/24. The respective engines, or alternatively the data director, then inserts 0.0.0.0/24 into DIB 2100 as record 2150.

The flow inspector inserts the active routes 2120, such as 0.0.0.1/32, 0.0.0.2/32, 0.0.0.3/32, etc., into DIB 2100 and associates those routes with the routing information (e.g., from a routing table) used by the data director 2130 to route the traffic flows. By doing so, the active flows will continue to flow according to the routes prior to a route change. As these individual active flows are deemed inactive, DIB 2100 withdraws, or deletes, the active flow record from the DIB.

In one embodiment, DIB 2100 operates to withdraw the original routes related to associated network element or translated address identifiers (e.g., EG1, VLAN101, NAT10, etc.) for one or more (i.e., a subset or super-set) of routes to be changed. In this example, routes associated with 0.0.0.0/24 are withdrawn at 2132. Then the controller provides a route update 2140 associated with the route change at 2134. Further to this example, after the update, ingress and egress traffic described by 0.0.0.1/24 is thereafter be routed out from a local source network according to EG2 or VLAN 102, or can be routed into the local source network according to NAT 20. Traffic flows will continue to be routed accordingly until the controller decides it is necessary to make another route change based upon performance and usage characteristics, as described herein. In another embodiment, a controller makes such routing changes to either the inbound or outbound traffic, or both, according to routing algorithms known in the art.

The following discussion relates to FIGS. 22 to 24 and describes alternate embodiments of a SPRE in accordance with the present invention. FIG. 22 illustrates SPRE 2200 configured to change the egress paths of data traffic from the local source address, for example. SPRE 2200 and its components and processes behave similarly to the components and processes described above in relation to SPRE 1800 of FIG. 18. In this example, SPRE 2220 of FIG. 22 is configured to communication with a controller and includes a flow inspector that operates, in part, by performing state inspection, and also includes one information base, RIB 2220. Moreover, SPRE 2220 includes routing engine 2226. According to this example, RIB 2220 includes remote addresses 2101 and RIB interface information 2102 of FIG. 21. An exemplary routing engine 2226 includes routing processes found in conventional routers known in the art and is used to forward packets related to specific traffic flows, for example, out through a physical interface, such as associated with at least one egress gateway 2250. Such gateways 2250 may include one or more intermediary physical network elements (e.g., downstream routers) coupled to NSPs, or alternatively, may be coupled directly to the NSPs.

In this example, flow inspector 2212 checks for and captures each active flow having a prefix, such as TCP layer 4 flows, that have not received a FIN or RST. These, and other similar flow types, are interpreted as being active in the TCP state machine. Thus, the source address of a flow cannot be changed without disrupting the flow. Each of the active sessions is associated with a super-set of addresses, or prefixes, and is recorded. Thereafter, flow specific routes, such as /32 entries, are inserted into RIB 2220. Flow inspector 2212 includes a set of rules for preserving active flows by, for example, storing them in a hash table before making a pending route change.

After the route change has been made, flow inspector 2212 monitors each individual active flow (i.e., TCP session) to detect whether it has terminated (i.e., become inactive). For each inactive flow, flow detector 2212 is configured to withdraw the specific routes (e.g., /32) from RIB 2220. Thereafter, flow detector 2212 continues to monitor the states until all active sessions on the previous route have ended and all specific flow routes (e.g., /32) have been withdrawn. RIB 2220 then places the update route change into a routing table at the routing engine.

Routing engine 2226 operates to maintain one or more routing tables and examines RIB 2220 to determine how best to forward the associated traffic flow according to the routing information in the information base. That is, routing engine 2226 uses RIB 2220 to forward the data traffic flows over one of a number of physical interfaces toward an associated network element (e.g., egress gateway), such as routers. An exemplary routing engine 2226 operates as a layer 2 forwarding mechanism and is configured to perform at least one route lookup into RIB 2220, where look-ups are performed to identify the current path or paths or portion thereof of an active flow.

In another exemplary SPRE 2200, a default route associated with a least-cost network service provider, for example, is installed in the routing tables as well as in the RIB 2220. SPRE 2220 is coupled to at least one of the available physical egress interfaces from the local source network, such that data traffic flows, by default through the least-cost NSP until the controller determines whether a route change is required. The default route keeps SPRE 2200 from responding and making routing decisions based upon BGP advertisements in to which it may be exposed.

In yet another exemplary SPRE 2200, SPRE 2200 is configured to communicate with its environs based on any available protocol, such as iGP (e.g., Open Shortest Path First protocol) or eGP (e.g., BGP), and is further configures to update RIB 2220 based on route advertisements that are received from those protocols as well as any other protocol known in the art.

FIG. 23 illustrates a functional block diagram of SPRE 2300 according to another specific embodiment of the present invention. Flow inspector 2312 and FIB 2320 are designed to operate similarly in nature to the flow inspector and RIB associated with FIG. 22. FIB 2320, as the at least one information base, however, is designed to associate remote destination addresses with virtual interfaces. In this instance, forwarding engine 2326 is substituted for routing engine 2226 of FIG. 22. In FIG. 23, flow inspector 2312 functions, in part, to insert forwarding entries into FIB 2320, where a FIB is a forwarding information base related to a given virtual interface.

Forwarding engine 2326 is designed to tag the outgoing data flows with specific identifier information, such as layer 2 information, and more specifically, VLAN tags. Forwarding engine 2326 examines FIB 2320 for information to determine which VRF is to be used to send the traffic out on. VLANs, according to one embodiment, logically are associated with one or more physical interfaces, where an exemplary SPRE 2300 is coupled to any one of a number of virtual routers (e.g., VRFs), where each virtual router is logically associated with a physical interface.

FIG. 24 shows another embodiment of SPRE 2400 where route control, according to a specific embodiment of the present invention, sets the return path back into a local source address rather than modifying an egress path. That is, exemplary SPRE 2400 operates to modify an ingress path back into the local source network, as determined by NAT engine 2426. NAT 2426 performs a NAT modification function to modify a source address of an IP datagram so as to modify the ingress path returning back into source network from a remote destination address. NAT engine 2426 operates to forward traffic 2450 out from a local source network by modifying the source address of each packet of the traffic flow. That is, the source address is modified to a specific address according to a flow policy, as determined by a controller. The modified address resolves at least one flow policy violation regarding the traffic that returns to a local source network. The modified address includes one of many NAT addresses 2425 used to re-route the returning traffic via a specific route back into the local source network. For example, a packet in a traffic flow that flows out from a local source network via a specific first level NSP is configured to return back to the local source network and its address by way of another first level NSP with a modified source address.

Downstream routers are implemented to route data traffic 2450 forward from SPRE 2400 onto available network service providers according to BGP, for example, or any other routing protocol. In this example, traffic flows enter the downstream routers according to a specific NAT address, as translated by NAT engine 2426, and according to an ingress route change request generated by a controller.

In another example, SPRE 2412 operates with a flow inspector 2412 that is similar in function and nature to flow inspectors 2212 and 2312 of FIGS. 22 and 23, respectively, and is coupled to a NAT engine 2426. NAT engine 2426 provides a NAT modification function that takes a source address of an IP datagram, for example, and modifies it so that it returns through another ingress path that was set as a default ingress path. NIB 2420 is an information base used to translate source paths (i.e., set of source IP addresses) for one or more destination paths (i.e., as defined by a set of destination IP address), for example, according to destination prefix information.

Structurally and functionally, FIG. 24 shows that flow inspector 2412 is coupled to NIB 2420. In operation, exemplary flow inspector 2412 performs layer 4 flow reconstruction and initiates dynamic route entries stored at NIB 2420, as described above. Similar to other engines discusses herein, NAT engine 2426 is designed to query NIB 2420 for each packet for which NAT engine 2426 receives and applies NAT by translating the source address according to resolving the flow policy.

Exemplary NIB 2420 includes one or more NAT addresses to be applied in a similar fashion as described herein in connection with a routing information base (i.e., RIB). Flow inspector 2412 also monitors all active flows for a specific prefix change stored in a network address translation information base, or NIB 2420. NAT engine 2426 inserts temporary, but specific route entries, to maintain a current flow policy while one or more flows are still active.

A typical application for NAT is where the originating source address in a private IP address space is translated into an address for use in public routable space. In this instance, NAT is used to significantly change the way that traffic is sent toward the originating network. NAT is acceptable for most applications and the policy that enforces NAT to prevent NAT from breaking the data packets of the relevant applications for which NAT is unacceptable. NAT, however, maybe overridden, and thus not useable, in some applications on the Internet. Such applications include Voice over IP (i.e., H.323 protocol), and security protocols, such as IPSec (IP Security Protocol) used to protect client information over IP. These applications might be denied the ingress path diversity provided and thus be forced onto a sub-optimal network path. Hence, according to yet another embodiment of the present invention, a specific router or network element is reserved to serve route-sensitive data packets and their attendant applications. For example, a single router may be reserved, using NAT, for example, to receive ingress data traffic into a local source network, if it is crucial that the data packets not be routed according to route control techniques described herein.

Additionally, changing the source address in the middle of an active flow might disrupt that flow. Other embodiments of the present invention described herein are implemented to overcome the NAT's disruption of active flows. For example, an exemplary controller might be implemented to verify that no active flows to that destination are in progress before the controller initiates a route change where NAT is applied to a traffic flow to affect its return path back into the source network.

Figure 25:
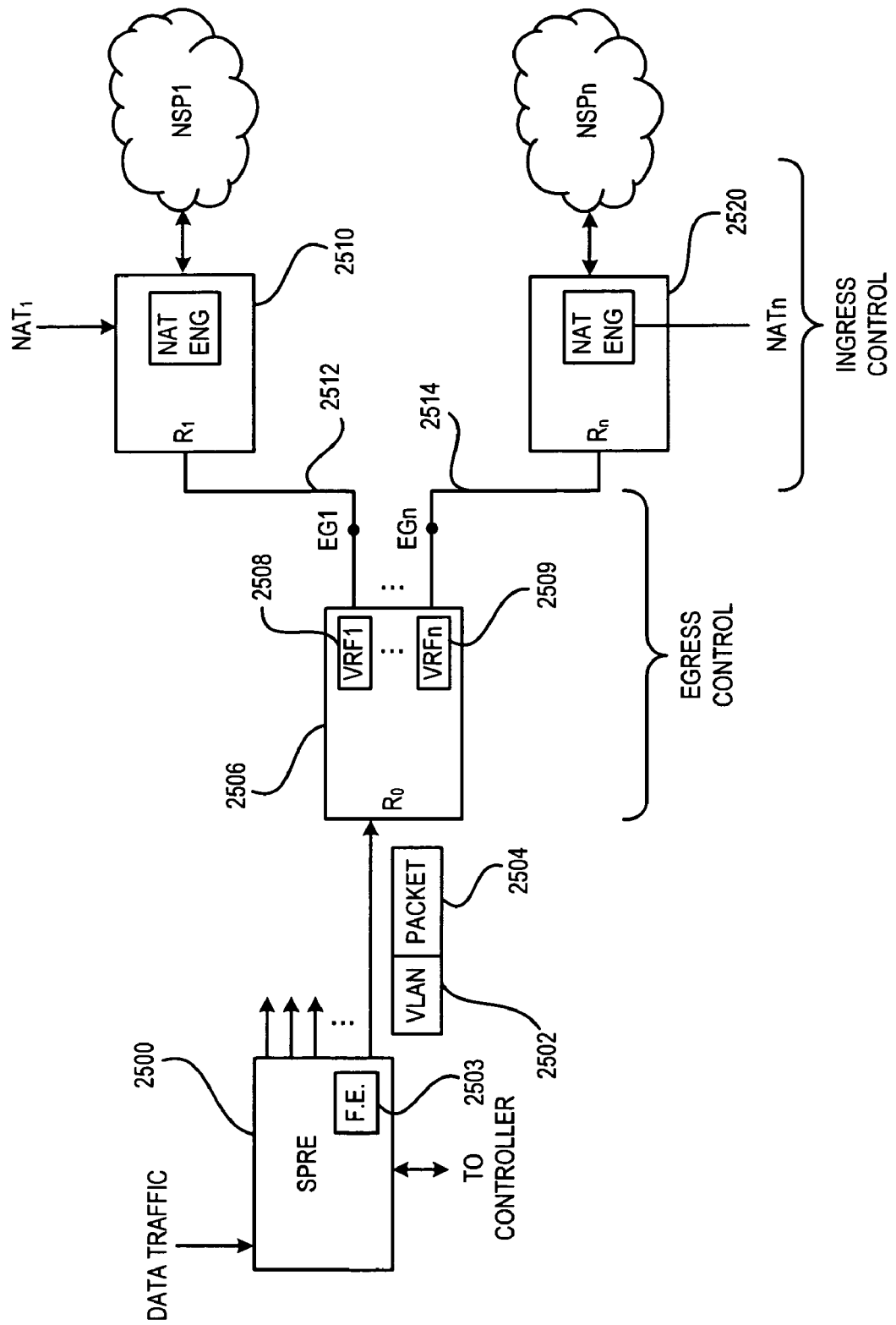
FIG. 25 is a block diagram a configuration element with engines distributed in one or more network devices in accordance to a specific embodiment of the present invention.
Figure 26:
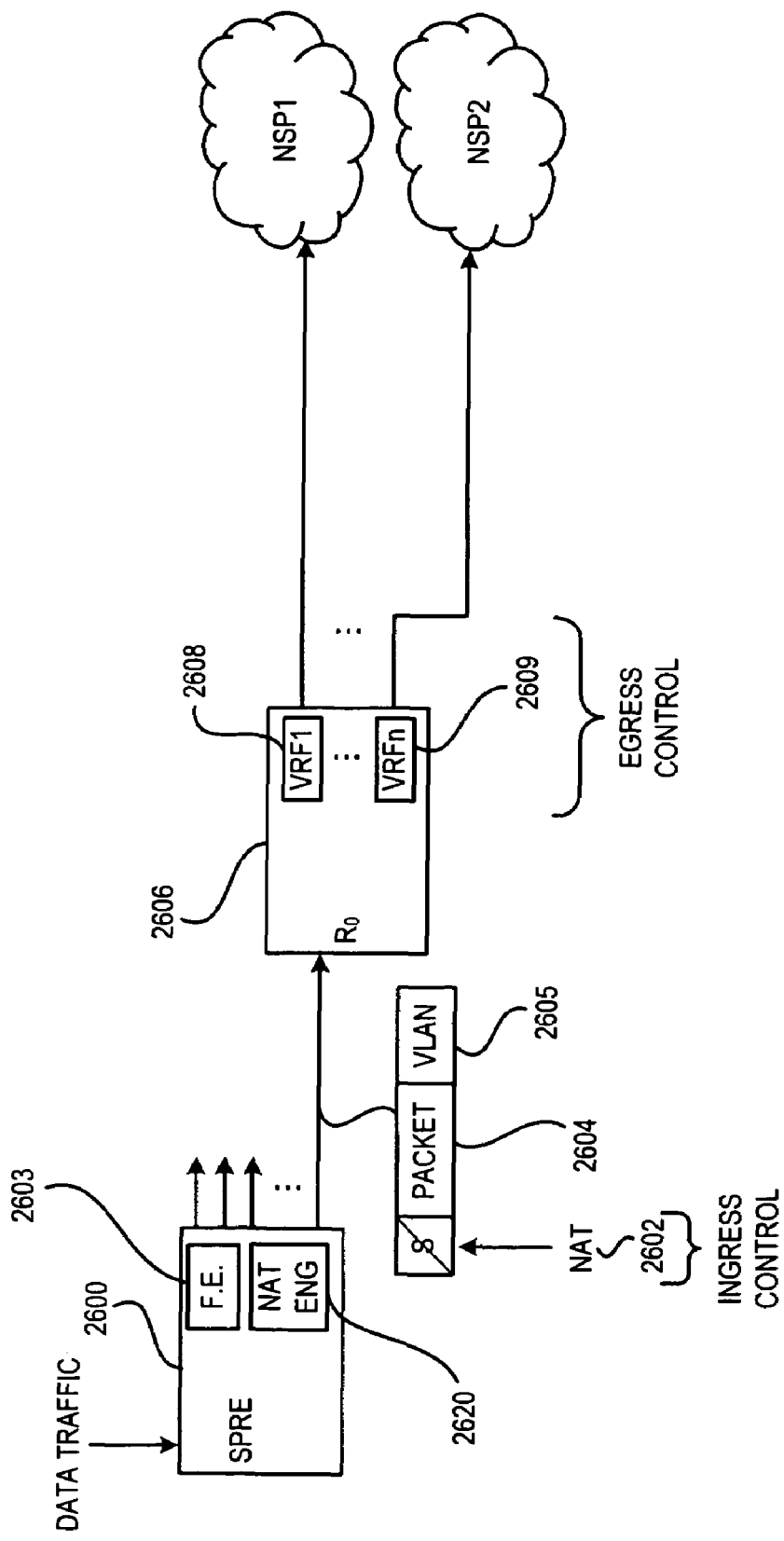
FIG. 26 is a block diagram a configuration element coupled to network device in accordance to another specific embodiment of the present invention.
Figure 27:
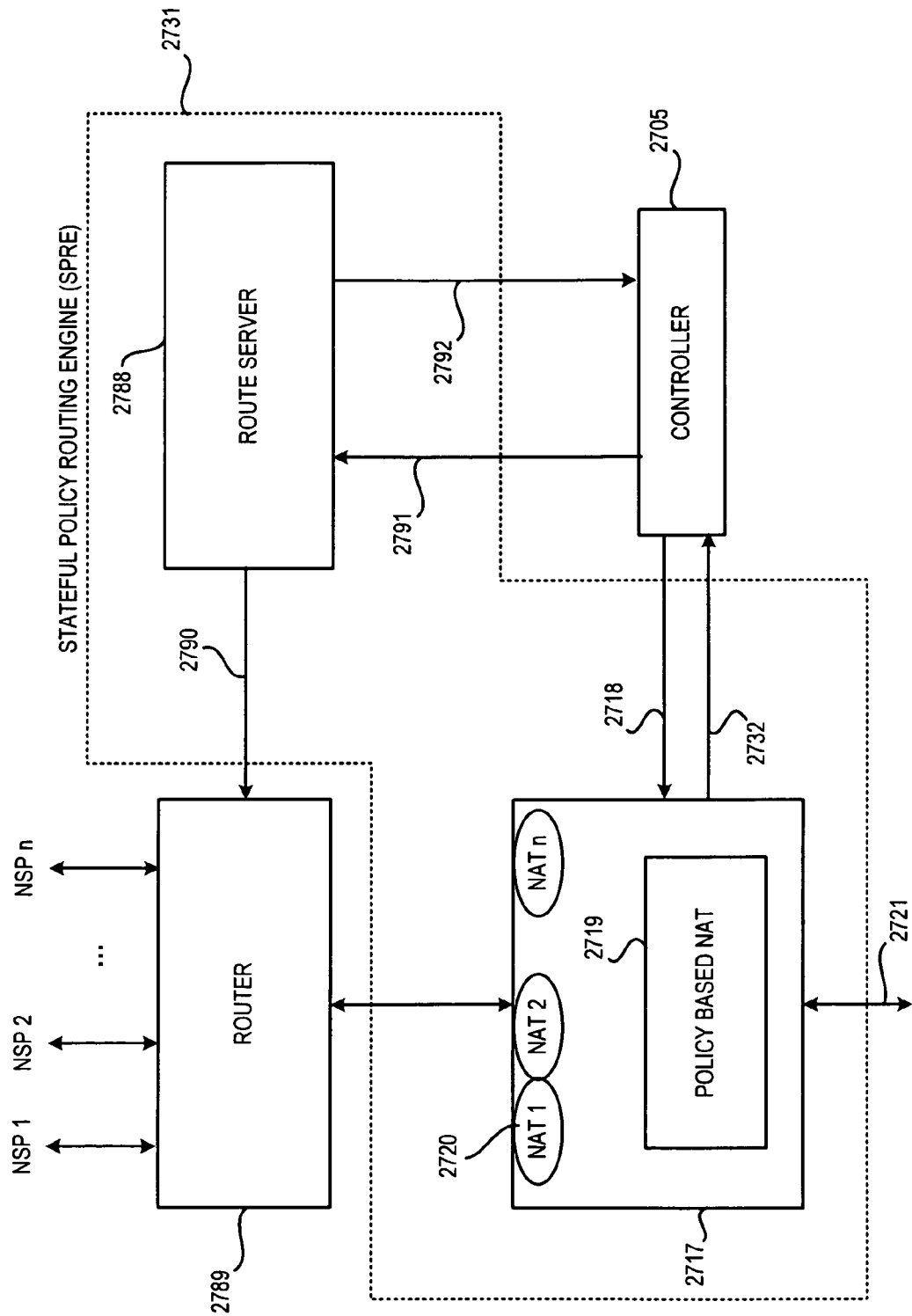
FIG. 27 depicts an exemplary configuration element employing a route server and a NAT-related information base in accordance with still yet another specific embodiment of the present invention.

FIGS. 25 to 27 show at least a few additional alternative embodiment of SPRE as deployed in exemplary route control applications, according to the present invention. FIG. 25 illustrates an exemplary configuration for SPRE 2500. According to this example, SPRE 2500 is designed to cooperate with data director elements distributed over one or more network elements, such as routers (physical or otherwise) 2506, 2510, and 2520. First, SPRE 2500 is configured to associate, or tag, each packet 2504 flowing out from a local source address with VLAN tag 2502. Forwarding engine 2503 generates such an association and tags each packet. VLAN tag 2502 functions to alert router R0 2506 that the packet 2505 is to be forwarded according to attached VLAN tag 2502. For example, if VLAN tag 2502 is associated with a virtual interface corresponding to VLAN1, such as VRF 1 2508, then the corresponding tagged packet 2504 will be forwarded, for example, via egress gateway 1 (e.g., EG1) to router R1 2510, rather than being forwarded out from router Rn 2520 associated with VFRn 2509. Thus, VRFn 2509 is not used in this example.

Further to the specific embodiment of SPRE 2500, an associated traffic flow packet flows to router R1 2510 via interconnection 2512. At R1, a NAT engine distributed within the router functions to modify the source address of the data packet such that the ingress traffic flow back into the local source network may enter through any other NSP, such as NSPn, instead of through NSP1. A similar NAT engine is disposed in Rn to provide the same routing control of the ingress path if a data flow enters the Internet, for example, via NSP2.

FIG. 26 illustrates another exemplary configuration for SPRE 2600. According to this example, SPRE 2600 is also designed to cooperate with data director elements distributed over one or more network elements, such as routers (physical or otherwise) 2606. First, a traffic flow packet flows that passes through SPRE 2600. This packed is passed through a NAT engine 2620. SPRE 2600, NAT engine 2620 is configured within SPRE 2600 to modify a source address of the data packet flowing through it so that the ingress traffic flow back into the local source network may enter through any other NSP, such as NSPn, instead of through NSP 1. In operation, the source address of a data packet 2604 flowing out to a NSP is modified and consequently includes a translated network address 2602. Additionally, SPRE 2600 includes a forwarding engine 2603 and is designed to control the routing of the egress path or portion of the egress path of the outbound data flow. Forwarding engine 2603 tags the packet 2604, which has a translated source address 2602.

Such a data packet then flows to router 2606. Router R0 2606 is configured to tag the NAT-altered data packet 2604 with a VLAN tag 2605 such that the data packet will enter NSP1 or NSP2 or another NSP) according to the information within the VLAN tag. For example, consider VLAN tag 2605 is associated with a virtual interface linked to NSP1. That is, VLAN 2605 is designed to forward data flows out from R0 2605 via VRF1 2608. VRFn 2609 need not be used if VLAN tag 2605 is associated with VRFn 2609 of R0 2606. The packet 2604 flows out of the local source network via R0 and into NSP1. The packet, however, may return on an ingress path different from the egress path. Control over both egress and ingress routes for each data flow are but one aspect of the present invention, as embodied within an exemplary SPRE.

FIG. 27 illustrates another exemplary configuration element, or SPRE 2731, designed to maintain independent ingress and egress control variables according to the present invention. In FIG. 27, SPRE 2731 uses a route server to control egress traffic out from a local source network to any of the NSPs via router 2789. Furthermore, SPRE 2731 is designed to modify the ingress data traffic by using NAT to modify the source address such that data from the remote destination address is directed to a path defined by the modified source address. Modification of ingress and egress paths are determined, in part, by the particular traffic flow performance and usage characteristics, and whether such characteristics at least meet a particular flow policy.

SPRE 2731 is configured to accept ingress route change information 2718 from the controller 2705 and uses a NAT engine 2717 to modify one or more NAT addresses 2720 on a per prefix basis. NAT engine 2717 reports on the prefix per provider information from the NIB with a prefix list by ingress NSP message 2732, for example, when requested by controller 2705

Additionally, SPRE 2731 accepts egress route change information 2791 from controller 2705 and uses route server 2788 operating with BGP, as described in FIG. 13, for example, to change a BGP routing table in router 2789 with a BGP update message 2790. Route server 2788 reports on the prefix per provider information from the local BGP routing table with a prefix list by egress NSP message 2792 when requested by controller 2705.

Although the present invention has been discussed with respect to specific embodiments, one of ordinary skill in the art will realize that these embodiments are merely illustrative, and not restrictive, of the invention. For example, although the above description describes the network communication data as Internet traffic, it should be understood that the present invention relates to networks in general and need not be restricted to Internet data. The scope of the invention is to be determined solely by the appended claims.

In the foregoing specification, the invention is described with reference to specific embodiments thereof, but those skilled in the art will recognize that while the invention is not limited thereto. For example, other network topologies and protocols, such as ATM, UDP, PVC, or any other communications protocol where information is transported in one or more packets, can be utilized in conjunction with some embodiments according to the present invention.

Various features and aspects of the above-described invention may be used individually or jointly. Further, although the invention has been described in the context of its implementation in a particular environment and for particular applications, its usefulness is not limited thereto and it can be utilized in any number of environments and applications without departing from the broader spirit and scope thereof. The specification and drawings are, accordingly, to be regarded as illustrative rather than restrictive.

What is claimed is:

1. A method for routing data in a network, the method comprising:
    tagging a data packet with identifier information that specifies a network element to control an egress path for the data packet, wherein the egress path is from a first point to a second point;
    routing the data packet according to the identifier information;
    modifying a source address of the data packet using network address translation (NAT) to create a translated network source address to control an ingress path through a network service provider (NSP) associated with the translated source address, wherein the ingress path is from the second point to the first point;
    routing the data packet via the egress path, wherein the source address is associated with a second NSP and the egress path includes the second NSP; and
    receiving a return data packet via the ingress path, wherein the ingress path includes the NSP.

2. The method of claim 1, wherein tagging a data packet or modifying a source address is based on a flow policy.

3. The method of claim 1, wherein the first point is directly coupled to the NSP and the second NSP.

4. The method of claim 1, wherein tagging a data packet with identifier information that specifies a network element to control an egress path for the data packet comprises selecting the identifier information based on a policy based routing statement.

5. The method of claim 1, wherein the identifier information comprises a virtual local network (VLAN) tag and the network element comprises a virtual router facility (VRF).

6. A method for routing data in a network, the method comprising:
    modifying a source address of a data packet using network address translation (NAT) to create a translated network source address to control an ingress path through a network service provider (NSP), wherein the ingress path is from a second point to a first point;
    tagging the data packet with identifier information that specifies a network element to control an egress path for the data packet, wherein the egress path is from the first point to the second point;
    routing the data packet along the egress path according to the network element, wherein the egress path includes a second NSP; and
    receiving a return data packet via the ingress path, wherein the ingress path includes the NSP.

7. The method of claim 6, wherein tagging a data packet or modifying a source address is based on a flow policy.

8. The method of claim 6, wherein the first point is directly coupled to the NSP and the second NSP.

9. The method of claim 6, wherein tagging the data packet with identifier information that specifies a network element to control an egress path for the data packet comprises selecting the identifier information based on a policy based routing statement.

10. The method of claim 6, wherein the identifier information comprises a virtual local network (VLAN) tag and the network element comprises a virtual router facility (VRF).

11. A system for routing data in a network via an egress path from a first point to a second point and an ingress path from the second point to the first point, the system comprising:
    a controller for providing ingress path change information and egress path change information, wherein the ingress path and the egress path differ;
    a network address translation (NAT) engine for modifying a NAT address to control the ingress path;
    a route server for modifying a routing table to control the egress path; and
    a router for routing a data packet via the egress path, wherein the egress path includes a first network service provider (NSP) and for receiving a return data packet via the ingress path, wherein the ingress path includes a second NSP that is distinct from the first NSP.

12. The system of claim 11, wherein the NAT engine modifies a NAT address on a per prefix basis.

13. The system of claim 11, wherein the first point is directly coupled to the first NSP and the second NSP.

14. The system of claim 11, wherein the route server modifies the routing table by sending a BGP update message to the router.

15. A method for managing routes in a network, comprising:
    determining an activity status of a first data flow along a first data path, wherein the first data path is associated with a destination address and at least one network element;
    if the activity status of the first data flow is active, then preserving a record associated with the first data path in a routing data structure;
    once the activity status of the first data flow becomes inactive, then withdrawing the first path from the routing data structure;

receiving a route update, wherein the route update identifies a second path associated with the destination address and at least a second network element; and updating the routing data structure by creating a record associated with the second data path, so that a second data flow directed to the destination address is routed via the second path.

16. The method of claim 15, wherein the at least second network element specified by the route update changes an egress path from a first point associated with a source address to a point associated with the destination address.

17. The method of claim 15, wherein the at least second network element specified by the route update changes an ingress path from a point associated with the destination address to a first point associated with a source address.

18. The method of claim 15, wherein determining an activity status of a first data flow comprises performing a stateful inspection of the first data flow by comparing the first data flow to at least one inspection rule.

* * * * *